(12) United States Patent
Michiwaki

(10) Patent No.: US 10,125,808 B2
(45) Date of Patent: Nov. 13, 2018

(54) DOUBLE-END THREADED BODY AND INTERNALLY-THREADED BODY

(71) Applicant: NEJILAW INC., Tokyo (JP)

(72) Inventor: Hiroshi Michiwaki, Tokyo (JP)

(73) Assignee: NEJILAW INC., Tokyo (JP)

( * ) Notice: Subject to any disclaimer, the term of this patent is extended or adjusted under 35 U.S.C. 154(b) by 84 days.

(21) Appl. No.: 14/735,141

(22) Filed: Jun. 10, 2015

(65) Prior Publication Data

US 2015/0308487 A1    Oct. 29, 2015

Related U.S. Application Data

(62) Division of application No. 14/024,635, filed on Sep. 12, 2013, which is a division of application No.
(Continued)

(30) Foreign Application Priority Data

Feb. 20, 2008 (JP) .................................. 2008-039362

(51) Int. Cl.
*F16B 39/26* (2006.01)
*F16B 39/30* (2006.01)
(Continued)

(52) U.S. Cl.
CPC ............ *F16B 39/30* (2013.01); *F16B 33/006* (2013.01); *F16B 33/02* (2013.01); *F16B 35/00* (2013.01);
(Continued)

(58) Field of Classification Search
CPC ........... F16B 39/16; F16B 39/14; F16B 39/26
(Continued)

(56) References Cited

U.S. PATENT DOCUMENTS

| 244,510 A | 7/1881 | Abernathy |
|---|---|---|
| 522,888 A | 7/1894 | French |

(Continued)

FOREIGN PATENT DOCUMENTS

| DE | 3600497 A1 | 9/1986 |
|---|---|---|
| EP | 0 166 223 | 1/1986 |

(Continued)

OTHER PUBLICATIONS

Office action from the Canadian Intellectual Property Office for Appln No. 2,752,087 dated Mar. 3, 2016, 6 pages.
(Continued)

*Primary Examiner* — Flemming Saether
(74) *Attorney, Agent, or Firm* — Kilpatrick Townsend & Stockton LLP

(57) ABSTRACT

A duplex threaded body having a right-handed and left-handed thread on the circumferential surface of a single solid member. A single-nut or double-nut type internally-threaded body demonstrates a locking effect at an intermediate position without substantially loosening by using a combination of a duplex externally-threaded body and one or more internally-threaded bodies. Moreover, a screw structure in which a pair of internally-threaded bodies can only be removed once they are mutually coupled when screwed onto a duplex externally-threaded body, making it possible to impart tamper-proof characteristics and a locking effect. The duplex externally-threaded body has, on the outer circumferential surface, an overlapping region with a clockwise spiral right-handed thread and a counter-clockwise spiral left-handed thread in an overlapping manner. A right-handed internally-threaded body in which a right-handed thread is formed, and a left-handed internally-threaded body in which a left-handed thread is formed, that are screwed onto a duplex externally-threaded body.

6 Claims, 79 Drawing Sheets

Related U.S. Application Data

12/918,736, filed as application No. PCT/JP2009/053092 on Feb. 20, 2009.

(51) Int. Cl.

| | |
|---|---|
| *F16B 33/00* | (2006.01) |
| *F16B 33/02* | (2006.01) |
| *F16B 35/00* | (2006.01) |
| *F16B 37/00* | (2006.01) |
| *F16B 39/12* | (2006.01) |
| *F16B 39/282* | (2006.01) |
| *F16B 39/32* | (2006.01) |
| *F16B 39/38* | (2006.01) |
| *F16H 1/16* | (2006.01) |
| *F16H 25/24* | (2006.01) |

(52) U.S. Cl.
CPC ............. *F16B 37/00* (2013.01); *F16B 39/12* (2013.01); *F16B 39/26* (2013.01); *F16B 39/282* (2013.01); *F16B 39/32* (2013.01); *F16B 39/38* (2013.01); *F16B 2033/025* (2013.01); *F16H 1/16* (2013.01); *F16H 25/24* (2013.01)

(58) Field of Classification Search
USPC .................................................. 411/244–247
See application file for complete search history.

(56) References Cited

U.S. PATENT DOCUMENTS

| | | | |
|---|---|---|---|
| 600,748 A | 3/1898 | Smart | |
| 629,093 A | 7/1899 | Scalf | |
| 738,598 A | 9/1903 | Berry | |
| 829,363 A * | 8/1906 | Berry | F16B 39/16 411/233 |
| 986,255 A * | 3/1911 | Whitney | F16B 39/12 411/222 |
| 1,093,050 A | 4/1914 | Heckel | |
| 1,123,531 A | 1/1915 | Herzberg | |
| 1,127,559 A * | 2/1915 | Willison | F16B 39/16 411/243 |
| 1,452,367 A | 4/1923 | Ellingson | |
| 1,850,659 A * | 3/1932 | Condit | F16B 39/16 411/244 |
| 2,313,763 A | 3/1943 | Olsen | |
| 2,432,805 A * | 12/1947 | Robertson | F16B 39/38 411/246 |
| 2,445,602 A | 7/1948 | Casaroll | |
| 2,460,131 A * | 1/1949 | Kendrick | F16B 39/14 411/198 |
| 2,799,587 A | 7/1957 | Schwartz | |
| 3,053,357 A | 9/1962 | Stanger | |
| 3,854,350 A | 12/1974 | Bauer et al. | |
| 4,046,051 A | 9/1977 | Lovisek | |
| 4,248,285 A * | 2/1981 | Flaig | F16B 39/34 411/222 |
| D321,560 S | 11/1991 | Miller | |
| 5,094,618 A | 3/1992 | Sullivan | |
| D366,115 S | 1/1996 | Sullivan | |
| 5,616,052 A | 4/1997 | Pan et al. | |
| D427,683 S | 7/2000 | Pettersen | |
| 7,217,195 B2 | 5/2007 | Matsubayashi | |
| 8,292,243 B2 | 10/2012 | Shaffer | |
| 8,348,576 B1 | 1/2013 | Gaw | |
| 2003/0031531 A1 | 2/2003 | Aldridge | |
| 2010/0154600 A1 | 6/2010 | Gui et al. | |
| 2011/0262245 A1 | 10/2011 | Michiwaki | |
| 2014/0017035 A1 | 1/2014 | Michiwaki | |
| 2015/0308487 A1 | 10/2015 | Michiwaki | |

FOREIGN PATENT DOCUMENTS

| | | |
|---|---|---|
| GB | 488805 | 7/1938 |
| GB | 621673 A | 4/1949 |
| JP | 48-030758 | 4/1973 |
| JP | 48075966 A | 10/1973 |
| JP | 57080717 U1 | 11/1980 |
| JP | 59-106753 | 6/1984 |
| JP | 61103616 U1 | 7/1986 |
| JP | 19850249718 A | 5/1987 |
| JP | 02024120 U1 | 2/1990 |
| JP | 5001010 U | 1/1993 |
| JP | 55648/1991 | 10/1993 |
| JP | 19930001010 U | 8/1994 |
| JP | 06-307427 | 11/1994 |
| JP | 19940307427 A | 11/1994 |
| JP | 06084017 U | 12/1994 |
| JP | 08-014241 | 1/1996 |
| JP | 08-166054 | 6/1996 |
| JP | 19960166054 A | 6/1996 |
| JP | 1999351226 A | 12/1999 |
| JP | 2004225806 A | 8/2004 |
| JP | 2006189056 A | 7/2006 |
| JP | 2007-040344 | 2/2007 |
| JP | 2007-147008 | 6/2007 |
| JP | 3946752 B1 | 7/2017 |
| WO | 2006-028327 A1 | 3/2006 |

OTHER PUBLICATIONS

European Search Report for EP 09 71 3143 dated Sep. 10, 2013, 8 pages.
European Search Report for EP 14165166 dated May 24, 2016, 7 pages.
The first Office Action issued by the Canadian Patent Office on Jul. 13, 2015 for the corresponding CA Patent Application No. 2,752,087.

\* cited by examiner

DOUBLE-END THREADED BODY AND INTERNALLY-THREADED BODY

This application is a divisional application of U.S. patent application Ser. No. 14/024,635, filed on Sep. 12, 2013, entitled "DOUBLE-END THREADED BODY AND INTERNALLY-THREADED BODY", which is a divisional application of U.S. patent application Ser. No. 12/918,736, filed on Nov. 5, 2010, entitled "DOUBLE-END THREADED BODY AND INTERNALLY-THREADED BODY", which claims priority to PCT/JP2009/053092 filed Feb. 20, 2009 which claims priority to Japanese Patent Application No. 2008-039362 filed Feb. 20, 2008 entitled "DOUBLE-END THREADED BODY AND INTERNALLY-THREADED BODY", incorporated by reference for all purposes.

TECHNICAL FIELD

The present invention relates to a threaded body having spiral threads formed in the outer circumferential surface or inner circumferential surface of a fixing member, and more particularly, to a duplex threaded body having a right-handed thread and a left-handed thread in which the spiral threads are composed of a clockwise spiral thread and a counter-clockwise spiral thread.

BACKGROUND ART

So-called screws, which are comprised by forming a thread along spiral path, namely a helix, depicted on the outer circumferential surface of rod by moving the center of a circular path along the central axis of the rod, have proliferated extensively as fundamental components used in industry. When broadly categorized according to the direction in which their threads are wound, screws are classified into right-handed screws, in which the thread extends clockwise in the positive axial direction, and left-handed screws, in which the thread extends counter-clockwise in the positive axial direction.

The main applications of these screws include fastening applications for tightening mechanical parts and the like, transfer applications and movement applications for transmitting motive power or movement, as well as other applications such as measurement and adjustment applications for measuring dimensions or adjusting position by utilizing the correlation between screw rotation and distance moved in the axial direction.

There have conventionally been various types of screws respectively designed to be suitable for each application. For example, triangular threaded screws, in which the shape of the thread is triangular, are mainly used for fastening, measurement and adjustment. An example of a screw typically used for fastening mechanical parts is a metric coarse threaded screw, while fine threaded screws having a narrow pitch are used for fastening precision mechanical parts in particular. In addition, pipe screws, in which threads are formed in a pipe material, are used to connect pipes materials and the like. Rectangular threaded and trapezoidal threaded screws, in which the threads are formed into a rectangular shape or trapezoidal shape, are used for transmission of motive power or movement such as in presses or jacks. Round threaded screws, in which the threads are formed to have a rounded shape, are used for light bulb bases and locations requiring ease of installation and removal such as connectors susceptible to infiltration of foreign objects. In addition, an example of a special type of screw is a ball screw, in which a large number of holes are formed along helical spiral grooves, and which is designed so as to reduce frictional resistance during thread meshing by incorporating steel balls in the holes while allowing to rotate freely.

Fastening screws are composed of a combination of an external thread, comprised by forming a helical spiral groove in the outer circumferential surface of a rod, and an internal thread, comprised by forming a helical spiral groove in the cylindrical inner circumferential surface of a cylindrical material, and at the time of use, the external thread is inserted into a threaded hole formed in the material to be fastened, after which the internal thread is screwed onto this external thread, and the material to be fastened into which the external thread has been previously inserted is tightened with the external thread to achieve fastening. Examples of such fastening screws that have been designed to be able to be used easily include combinations of so-called bolts, comprised by forming a head portion in the form of a hexagonal column on one end of an external thread and so-called nuts, in which the outer circumferential surface that screws onto the bolt is formed in the shape of a hexagonal column.

Right-handed screws have been nearly exclusively used in conventional screw applications including bolts and nuts used for fastening, while left-handed screws have been limited to special applications such as turnbuckles in which internal threads are formed rotating in different directions along the same axis on both ends thereof.

In addition, there are also applications for fasteners comprising the combination of bolts and nuts that require that the nut screwed onto the bolt not become loose. A fastener that has been designed to accommodate such applications is referred to as an anti-loosening nut. This type of fastener is composed so that it is difficult for a nut screwed onto a bolt to become loose by making suitable design contrivances to the nut.

Conventional anti-loosening nuts can be broadly classified into so-called single-nut types, which are composed so that locking effects are demonstrated with a single nut, and double-nut types, which are composed so that locking effects are demonstrated by a combination of two nuts.

As disclosed in Patent Document 1, a typical conventional single-nut type anti-loosening nut is composed by incorporating a mechanism that fulfills a role similar to that of a washer in the nut, and when screwed onto a bolt, a washer-like plate piece attached to one end of the nut inhibits loosening of the nut by demonstrating an urging force between the bolt thread and the nut.

As disclosed in Patent Document 2, a typical conventional double-nut type anti-loosening nut is composed of a first nut that has a reduced-diameter end composed to as to be able to be reduced in diameter, and a second nut that reduces the diameter of the reduced-diameter end by screwing onto the outer circumference of the reduced-diameter end of the first nut, and is composed so as to inhibit loosening of the nut by the second nut being screwed onto the first nut, which is first screwed onto the bolt towards the reduced-diameter end facing backward in the direction of travel, the reduced-diameter end of the first nut being reduced in diameter, and the inner circumferential surface thereof being firmly pressed by the thread of the bolt.

Patent Document 1: Japanese Patent No. 3946752
Patent Document 2: Japanese Utility Model Registration No. 3018706

Such conventional externally-threaded screws consisted only of right-handed screws, in which helical threads are formed in the clockwise direction, or left-handed screws, in which helical threads are formed in the counter-clockwise direction, and there has yet to exist a duplex threaded body, which is both a right-handed screw and a left-handed screw, in which a clockwise helical spiral groove and counter-clockwise helical spiral groove are formed in the outer circumferential surface of a single rod-like member. In particular, there has been none whatsoever of a duplex threaded body having a region in which a right-handed portion, which is a region provided with a right-handed thread, and a region in which a left-handed portion, which is a region provided with a left-handed thread, overlap.

In addition, in the case of conventional single-nut type anti-loosening nuts, although a certain degree of locking effects can be obtained with a single nut, since urging force is simply generated with a washer-like plate piece to tighten meshing of the bolt and nut in a single spiral groove on the outer circumferential surface of the bolt, loosening of the nut is not substantially prevented, while in the case of a double-nut type, which is ultimately similar to the case of a single-nut type, since a reduced-diameter end of a first nut is reduced in diameter by a second nut, and the inner circumferential surface provided with irregularities on the reduced-diameter end is simply pressed to tighten meshing between the nut and bolt in a single spiral groove of the outer circumferential surface of the bolt causing loosening to be inhibited by frictional force between the outer circumferential surface of the bolt and the inner circumferential surface of the nut, both of these cases had the problem of the nut ending up loosening gradually due to vibrations and the like.

DISCLOSURE OF THE INVENTION

With the foregoing in view, an object of the present invention is to provide a duplex threaded body having right-handed thread and a left-handed thread on the outer circumferential surface or inner circumferential surface of a single rod-like member.

In addition, an object of the present invention is to provide a single-nut type internally-threaded body that does not loosen substantially even as a single nut and demonstrates locking effects even at an arbitrary intermediate position by combining the use of a duplex threaded body having a right-handed thread and a left-handed thread on the outer circumferential surface of a rod-like member, namely a bolt, and one or more internally-threaded bodies, namely nuts, or a double-nut type internally-threaded body that does not loosen substantially and demonstrates locking effects even at an arbitrary intermediate position by combining the use of two or more nuts.

Moreover, an object of the present invention is to provide a screw structure, in which a pair of internally-threaded bodies can only be removed by destruction once they are mutually coupled when screwed onto the above-mentioned duplex threaded body, thereby making it possible to impart so-called evidence of tampering or evidence of non-tampering as a result of demonstrating tamper-proofing effects in addition to locking effects.

Means employed in the duplex threaded body of the present invention in order to achieve the above-mentioned objects is a threaded body in which spiral grooves are formed in the circumferential surface of a solid member having a solid form, wherein the grooves are composed of a clockwise spiral groove and a counter-clockwise spiral groove, and a right-handed threaded portion in which the clockwise spiral groove is formed and a left-handed threaded portion in which the counter-clockwise spiral groove is formed are provided overlapping within the same region.

The solid member is a shaft body having a roughly columnar or roughly cylindrical shape.

A plurality of lines, in which ridgeline-like center lines are set perpendicular to an axial direction of the shaft body, are formed intermittently at different levels relative to the axial direction, alternately with respect to the direction of diameter, and in the shape of a roughly arc along the outer circumferential surface of the shaft body, and the clockwise spiral groove and the counter-clockwise spiral groove are formed on the same region as a result of forming these plurality of lines.

When viewed in the axial direction of the shaft body, the external shape of the end portion of the shaft body is roughly circular, the ridgeline-like center lines serving as the distal ends of the plurality of lines formed in the shape of a roughly arc are roughly semi-elliptical, and the overall external shape when viewed in the axial direction is roughly elliptical.

The outer diameter of the apices of the lines when viewed from a normal direction perpendicular to the axial direction is set to be larger than the outer diameter of the apices of the lines when viewed from a normal perpendicular to the above normal direction, and the diameter at the apices of the lines on the single duplex threaded body has a long diameter portion and a short diameter portion.

The height of the lines when viewed in the direction of the short diameter portion is set to be roughly twice the height of the lines when viewed in the direction of the long diameter portion.

The number of the lines per unit length in the axial direction of the shaft body when viewed in the direction of the long diameter portion is set to be roughly twice the number of the lines per unit length in the axial direction of the shaft body when viewed in the direction of the short diameter portion.

The shaft body has a roughly conical shape.

The solid member has, on one end thereof, a non-circular end portion in the shape of a non-circular hole or non-circular column.

The planar shape of the non-circular hole of the non-circular end portion formed in the shape of a non-circular hole is selected from a roughly letter "hyphen" shape, a roughly inverted "Y" shape, a roughly cross shape, a roughly polygonal shape, or a composite shape thereof.

The external shape of the non-circular column of the non-circular end portion formed in the shape of a non-circular column is selected from a roughly square shape and a roughly hexagonal shape.

The pitch of the clockwise spiral groove and the pitch of the counter-clockwise spiral groove are substantially equal.

The pitch of the clockwise spiral groove and the pitch of the counter-clockwise spiral groove are different from each other.

In addition, means employed in the internally-threaded body of the present invention is an internally-threaded body that is screwed onto a duplex externally-threaded body in which the lines are formed on the outer circumferential surface of the solid member, wherein a clockwise spiral thread and a counter-clockwise spiral thread are provided as a pair.

The internally-threaded body has a clockwise or counter-clockwise intermittent or continuous spiral thread formed on the inner circumferential surface of a tubular member having a roughly tubular shape, and has, on one end in the tubular direction of the tubular member, reverse rotation preventing means for preventing reverse rotation relative to the direction of rotation when screwed onto the duplex externally-threaded body.

The reverse rotation preventing means has one or more plate pieces, the plate piece is arranged protruding from the inner circumferential surface of the tubular member towards the axis of rotation of the internally-threaded body, the end portion of the plate piece serves as a clockwise or counter-clockwise spiral thread, and the thread formed by the end of the plate piece has a finite inclination angle relative to a lead angle of the thread formed on the inner circumferential surface of the tubular member.

When a lead angle of the spiral thread formed on the inner circumferential surface of the internally-threaded body is defined as θ, the thread formed by the end of the plate piece is inclined by $(165-2θ)°$ to $(195-2θ)°$ relative to this lead angle.

The reverse rotation preventing means has a spiral slope portion centered about the axis of rotation of the internally-threaded body formed on one end of the tubular member, and one or more plate pieces arranged on this slope portion, and when a lead angle of the thread formed on the inner circumferential surface of the internally-threaded body is defined as θ, the inclination angle of the slope portion is $(165-2θ)°$ to $(195-2θ)°$ relative to this lead angle.

The plate piece has a roughly arc-shaped end centered about the axis of rotation of the internally-threaded body.

In addition, means employed in the internally-threaded body of the present invention includes that provided with a right-handed internally-threaded body in which a clockwise spiral thread is formed on the inner circumferential surface of a first tubular member having a roughly tubular shape, and a left-handed internally-threaded body in which a counter-clockwise spiral thread is formed on the inner circumferential surface of a second tubular member having a roughly tubular shape, and the right-handed internally-threaded body and the left-handed internally-threaded body are respectively screwed onto the duplex threaded body and are mutually and integrally coupled.

Coupling means for coupling the right-handed internally-threaded body and the left-handed internally-threaded body by causing the right-handed internally-threaded body and the left-handed internally-threaded body to approach each other is provided in one or both of the right-handed internally-threaded body and the left-handed internally-threaded body.

The coupling means is constituted by an inserting portion, which is provided on one of the right-hand internally-threaded body and the left-handed internally-threaded body, and a receiving portion that is provided on the other internally-threaded body and receives the inserting portion, and when the right-handed internally-threaded body and the left-handed internally-threaded body are mutually pressed together, the inserting portion is received by the receiving portion and the inserting portion and the receiving portion are mutually engaged.

A slit roughly parallel to the axial direction is formed in one or both of the inserting portion and the receiving portion.

A slit roughly perpendicular to the axial direction is formed in one or both of the inserting portion and the receiving portion.

In addition, the coupling means of the present invention includes that having reverse rotation preventing means for preventing reverse rotation relative to the direction of rotation when one of the right-handed internally-threaded body and the left-handed internally-threaded body is screwed onto the duplex threaded body.

The reverse rotation preventing means has a first gear-like portion in which teeth, which are formed on the outer circumferential surface of the inserting portion provided on one end in the axial direction of one of the internally-threaded bodies among the right-handed internally-threaded body and the left-handed internally-threaded body, are composed of a plurality of serrated portions, and a second gear-like portion in which teeth, which are formed on the inner circumferential surface of the receiving portion provided on one end in the axial direction of the other internally-threaded body, are composed of a plurality of asymmetrical serrated portions, and reverse rotation relative to the direction of rotation of one of the right-handed internally-threaded body or the left-handed internally-threaded body during the course of meshing is prevented by meshing of the first gear-like portion and the second gear-like portion.

In the reverse rotation preventing means, the outer circumferential surface of one of the internally-threaded bodies among the right-handed internally-threaded body and the left-handed internally-threaded body is formed as the inserting portion, this inserting portion has a first gear-like portion in which teeth are composed of a plurality asymmetrical serrated portions, and a second gear-like portion in which teeth are composed of a plurality of asymmetrical serrated portions is provided on the inner circumferential surface of the receiving portion provided on one end in the axial direction of the other internally-threaded body, and reverse rotation relative to the direction of rotation of one of the right-handed internally-threaded body or the left-handed internally-threaded body during meshing is prevented by meshing of the first gear-like portion and the second gear-like portion.

The reverse rotation preventing means has the inserting portion which is composed of one or more spring portions peripherally provided in the shape of a spring on one end of one of the internally-threaded bodies among the right-handed internally-threaded body and the left-handed internally-threaded body and centered about the axis of rotation of the internally-threaded body, and the receiving portion which contains one or more undulating portions peripherally provided in the form of rotationally asymmetrical irregularities or undulations and centered about the axis of rotation on one end of the other internally-threaded body, and is composed to prevent reverse rotation relative to the direction of rotation of one of the right-handed internally-threaded body or the left-handed internally-threaded body during the course of meshing by meshing of the spring portion and the undulating portion during coupling of the right-handed internally-threaded body and the left-handed internally-threaded body.

The reverse rotation preventing means has the inserting portion which is arranged on one end of one of the internally-threaded bodies among the right-handed internally-threaded body and the left-handed internally-threaded body, is provided separately from the internally-threaded body, and composed of one or more spring portions peripherally provided in the shape of a spring and centered about the axis of rotation of the internally-threaded body, and the receiving portion which contains one or more undulating portions peripherally provided in the form of rotationally asymmetrical irregularities or undulations and centered about the axis of rotation on one end of the other internally-threaded body, and is composed to prevent reverse rotation relative to the direction of rotation of one of the right-handed internally-threaded body or the left-handed internally-threaded body during the course of meshing by meshing of the spring portion and the undulating portion during coupling of the right-handed internally-threaded body and the left-handed internally-threaded body.

In addition, the coupling means of the present invention includes rotatable retaining means for rotatably coupling together one end of the right-handed internally-threaded body and one end of the left-handed internally-threaded body, and preventing separation of the right-handed internally-threaded body and the left-handed internally-threaded body in the axial direction.

The rotatable retaining means has a large diameter portion in which the vicinity of the distal end of the inserting portion is set to have a larger diameter than the outer diameter of the proximal end of the inserting portion, and a small diameter portion in which the distal end of the receiving portion is set to have a smaller diameter than the inner diameter of the proximal end, and the outer diameter of the proximal end of the inserting portion and the inner diameter of the small diameter portion of the distal end of the receiving portion are set to be substantially equal.

The inserting portion has the large diameter portion on the outer circumference in the vicinity of the distal end of the inserting portion, the inserting portion is preliminarily inserted into the receiving portion, and the right-handed internally-threaded body and the left-handed internally-threaded body are mutually rotatably and inseparably integrated.

The inserting portion has the large diameter portion on the outer circumference in the vicinity of the distal end of the inserting portion, the receiving portion has the small diameter portion at a location corresponding to a site where the large diameter portion is not provided, and the right-handed internally-threaded body and the left-handed internally-threaded body are removably and rotatably retained and coupled by inserting the inserting portion into the receiving portion while the large diameter portion and the small diameter portion are at mutually unaligned positions.

In addition, the coupling means of the present invention is constituted by a first magnetic pole provided on one end of one of the right-handed internally-threaded body and the left-handed internally-threaded body, and a second magnetic pole expressed or provided on one end of the other internally-threaded body, the first magnetic pole and the second magnetic pole are mutually different magnetic poles, and the right-handed internally-threaded body and the left-handed internally-threaded body are coupled by magnetically coupling these magnetic poles.

The planar shape of the right-handed internally-threaded body or the left-handed internally-threaded body, or the planar shape of the right-handed internally-threaded body and the left-handed internally-threaded body, is non-circular.

The non-circular planar shape is selected from a roughly square shape, a roughly hexagonal shape and a roughly polygonal shape.

The maximum diameter of the outer diameter of one of the internally-threaded bodies among the right-handed internally-threaded body and the left-handed internally-threaded body is set to be equal to or less than the minimum diameter of the outer diameter of the other internally-threaded body.

According to the present invention, a duplex threaded body can be obtained comprising the formation of a right-handed thread and a left-handed thread overlapping in the same region on one or both surfaces of an inner circumferential surface and outer circumferential surface.

Thus, by combining the use of the internally-threaded body of the present invention, on which is arranged a plate piece having a spiral thread corresponding to a spiral groove of the opposite orientation of the spiral thread of the internally-threaded body, and the duplex threaded body of the present invention, a locking effect that inhibits loosening structurally instead of inhibiting loosening by frictional force can be obtained even in the case of a so-called single nut type, and a bolt and nut can be obtained that enable their positions to be fixed even at an arbitrary intermediate position on the duplex threaded body.

In addition, by using a combination of a right-handed internally-threaded body comprised by forming a clockwise spiral thread, a left-handed internally-threaded body comprised by forming a counter-clockwise spiral thread, and the duplex threaded body of the present invention as an externally-threaded body, and coupling the right-handed internally-threaded body and the left-handed internally-threaded body by a suitable method such as welding or coupling means, a locking effect that inhibits loosening structurally instead of inhibiting loosening by frictional force can be obtained even in the case of a so-called double nut type, and an externally-threaded body and internally-threaded body pair or a bolt and nut pair can be obtained that enable their positions to be fixed even at an arbitrary intermediate position on the duplex threaded body. Here, an externally-threaded body can be external thread formed on the outer circumferential surface of the openings of a bolt, and an internally-threaded body can be an internal thread formed on the inner circumferential surface of a screw-on cap that blocks the openings.

In addition, by employing a suitable structure for the coupling structure of the two internally-threaded bodies, when the pair of internally-threaded bodies are screwed onto the duplex threaded body, once the internally-threaded bodies are mutually coupled, they can only be uncoupled by destruction, thereby making it possible to impart so-called evidence of tampering or evidence of non-tampering as a result of demonstrating tamper-proofing effects in addition to locking effects.

EXPLANATION OF REFERENCE NUMERALS

Figure 1:
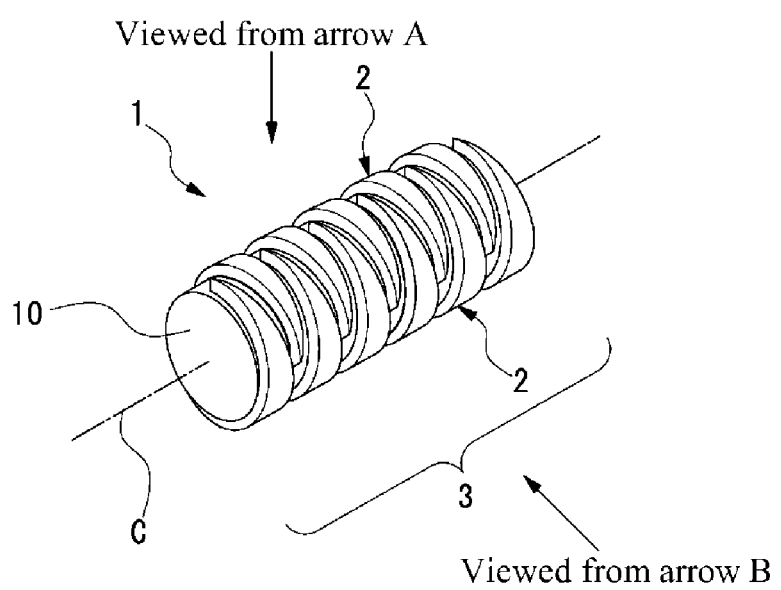
FIG. 1 is a perspective view of an overlapping region of a right-handed threaded portion and a left-handed threaded portion in a duplex externally-threaded body of a first embodiment.

1 Duplex threaded body
2 Thread ridge
3 Overlapping region
10 Rod-like member
20 Right-handed thread
21 Right-handed threaded portion
22 Clockwise spiral groove
30 Left-handed thread
31 Left-handed threaded portion
32 Counter-clockwise spiral groove
40 Zigzag groove
41 Inverted triangular ridge portion
42 Triangular ridge portion
43 Rhombic ridge portion
44 Rhombic ridge portion
45 Intersecting point
50 Non-threaded portion
51 Non-threaded portion
52 Non-threaded portion
53 Non-threaded portion
C Central axis
PR Right-handed thread pitch
PL Left-handed thread pitch
$\phi 1$ Threaded portion outer diameter
$\phi 2$ Core diameter
$\phi 3$ Non-threaded portion outer diameter
$\phi 4$ Non-threaded portion outer diameter
$\phi 11$ Threaded portion outer diameter
$\phi 12$ Core diameter
$\phi 13$ Non-threaded portion outer diameter φ14 Non-threaded portion outer diameter
10a Shaft body
11 Duplex externally-threaded body
12 Line
12a Apex
12b Apex
14 Clockwise spiral groove
15 Counter-clockwise spiral groove
φ5 Diameter
φ6 Outer diameter
φ7 Outer diameter
H Line height
h Line height
CB Center line
60 First gear
61 Second gear
62 First axial rod
63 Second axial rod
70 Inter-multi-shaft power transmission mechanism
71 Inter-shaft power transmission mechanism
80 Right-handed internally-threaded body
81 Threaded hole
82 Clockwise spiral groove
83 Clockwise spiral thread
90 Left-handed internally-threaded body
91 Threaded hole
92 Counter-clockwise spiral groove
93 Counter-clockwise spiral thread
100 Weld
PR1 Pitch
PL1 Pitch
φ21 Inner diameter
φ22 Core diameter
φ31 Inner diameter
φ32 Core diameter
104 Coupling means
180 Right-handed internally-threaded body
181 Threaded hole
182 Clockwise spiral groove
183 Clockwise spiral thread
184 Receiving portion
185 Through hole
186 Engagement receiving portion
187 Tapered portion
190 Left-handed internally-threaded body
191 Threaded hole
192 Counter-clockwise spiral groove
193 Counter-clockwise spiral thread
194 Inserting portion
195 Through hole
196 Locking portion
197 Tapered portion
198 Hexagonal tubular portion
199 Upright portion
199a Slit
199b Vertical portion
φ123 Inner diameter
φ132 Core diameter
φ133 Inner diameter
204 Coupling means
280 Right-handed internally-threaded body
281 Threaded hole
282 Clockwise spiral groove
283 Clockwise spiral thread
284 Receiving portion
285 Through hole
286 Engagement receiving portion
287 Tapered portion
289 Slit
290 Left-handed internally-threaded body
291 Threaded hole
292 Counter-clockwise spiral groove
293 Counter-clockwise spiral thread
294 Inserting portion
295 Through hole
296 Locking portion
297 Tapered portion
298 Hexagonal tubular portion
299 Upright portion
299b Vertical portion
φ223 Inner diameter
φ232 Core diameter
304 Coupling means
380 Right-handed internally-threaded body
381 Threaded hole
382 Clockwise spiral groove
383 Clockwise spiral thread
384 Receiving portion
385 Through hole
386 Engagement receiving portion
387 Notch
388 Large diameter space
389 Opening
390 Left-handed internally-threaded body
391 Threaded hole
392 Counter-clockwise spiral groove
393 Counter-clockwise spiral thread
394 Inserting portion
395 Through hole
396 Locking portion
398 Hexagonal tubular portion
399 Upright portion
404 Coupling means
480 Right-handed internally-threaded portion
481 Threaded hole
482 Clockwise spiral groove
483 Clockwise spiral thread
484 Receiving portion
485 Through hole
486 Engagement receiving portion
487 Retaining spiral groove
488 Large diameter space
490 Left-handed internally-threaded body
491 Threaded hole
492 Counter-clockwise spiral groove
493 Counter-clockwise spiral thread
494 Inserting portion
495 Through hole
496 Locking portion
497 Retaining spiral thread
498 Hexagonal tubular portion
499 Upright portion
504 Coupling means
580 Right-handed internally-threaded body
581 Threaded hole
582 Clockwise spiral groove
583 Clockwise spiral thread
584 Receiving portion
585 Through hole
586 Serrated portion
589 Circular serrated hole
590 Left-handed internally-threaded body
591 Threaded hole
592 Counter-clockwise spiral groove 593 Counter-clockwise spiral thread
594 Inserting portion
595 Through hole
596 Serrated portion
598 Hexagonal tubular portion
599 Upright portion
599a Slit
ϕ522 Core diameter
ϕ523 Diameter
ϕ532 Core diameter
ϕ533 Inner diameter
604 Coupling means
680 Right-handed internally-threaded body
681 Threaded hole
682 Clockwise spiral groove
683 Clockwise spiral thread
684 Receiving portion
685 Through hole
686 Serrated portion
689 Circular serrated hole
689a Slit
690 Left-handed internally-threaded body
691 Threaded hole
692 Counter-clockwise spiral groove
693 Counter-clockwise spiral thread
694 Inserting portion
695 Through hole
696 Serrated portion
698 Hexagonal tubular portion
699 Upright portion
ϕ622 Core diameter
ϕ623 Diameter
ϕ632 Core diameter
ϕ633 Outer diameter
704 Coupling means
780 Right-handed internally-threaded body
781 Threaded hole
782 Clockwise spiral groove
783 Clockwise spiral thread
784 Receiving portion
785 Through hole
786 Serrated portion
789 Circular serrated hole
790 Left-handed internally-threaded body
791 Threaded hole
792 Counter-clockwise spiral groove
793 Counter-clockwise spiral thread
794 Inserting portion
795 Through hole
796 Serrated portion
798 Round serrated tubular portion
ϕ722 Core diameter
ϕ723 Diameter
804 Coupling means
880 Right-handed internally-threaded body
881 Threaded hole
882 Clockwise spiral groove
883 Clockwise spiral thread
884 Receiving portion
885 Through hole
886 Serrated portion
886a Tooth
886b Apex
886c Side
886d Oblique side
886e Vertical plane
889 Embankment portion 890 Left-handed internally-threaded body
891 Threaded hole
892 Counter-clockwise spiral groove
893 Counter-clockwise spiral thread
894 Inserting portion
895 Through hole
896 Serrated portion
896a Tooth
896b Apex
896c Side
896d Oblique side
896e Vertical plane
897 Flexible toothed portion
898 Hexagonal tubular portion
899 Embankment portion
ϕ832 Core diameter
ϕ833 Inner diameter
ϕ834 Outer diameter
904 Coupling means
980 Right-handed internally-threaded body
981 Threaded hole
982 Clockwise spiral groove
983 Clockwise spiral thread
984 Receiving portion
985 Through hole
986 Serrated portion
986a Tooth
986b Apex
986c Side
986d Oblique side
986e Vertical plane
989 Embankment portion
990 Left-handed internally-threaded body
991 Threaded hole
992 Counter-clockwise spiral groove
993 Counter-clockwise spiral thread
994 Inserting portion
995 Through hole
996 Serrated portion
996a Tooth
996b Apex
996c Side
996d Oblique side
996e Vertical plane
997 Flexible toothed portion
997a Rotation stopping portion
997b Stoppage receiving portion
998 Hexagonal tubular portion
999 Embankment portion
1080 Right-handed internally-threaded body
1090 Left-handed internally threaded body
1101 Duplex externally-threaded body
1103 Overlapping region
1120 Right-handed thread
1121 Right-handed threaded portion
1122 Spiral groove
1130 Left-handed thread
1131 Left-handed threaded portion
1132 Spiral groove
1143 Right-handed ridge portion
1144 Left-handed ridge portion
1180 Right-handed internally-threaded body
1181 Threaded hole
1182 Clockwise spiral groove
1183 Clockwise spiral thread
1186 Plate piece
1187 Plate piece 1188 Hexagonal tubular portion
1189 Upright portion
PR10 Pitch
PL10 Pitch
PR11 Pitch
$\phi$1101 Outer diameter
$\phi$1102 Core diameter
$\phi$1103 Outer diameter
$\phi$1104 Core diameter
$\phi$1122 Inner diameter
$\phi$1123 Core diameter
$\phi$1140 Diameter
$\phi$1141 Diameter
S Starting end
E Ending end

BEST MODE FOR CARRYING OUT THE INVENTION

In a first aspect thereof, a first preferred embodiment of the duplex threaded body of the present invention is explained in detail with reference to the attached drawings (FIGS. 1 to 6) using the example of a duplex threaded body 1 comprised by forming a right-handed thread 20 and a left-handed thread 30 overlapping in the same region on the outer circumferential surface of a rod-like member 10.

Furthermore, a non-circular end portion (not shown) in the shape of a non-circular hole or non-circular column or non-circular tube may be formed on one end or both ends of the duplex threaded body 1. This non-circular end portion can be formed into the shape of a hexagonal column or hexagonal tube having a hexagonal transverse cross section having an inscribed circle of a diameter equal to or greater than the diameter of the rod-like member 10, or can be in the form of a hexagonal hole and the like provided in the shape of a hexagon on one end of the rod-like member 10 at a prescribed depth from the end surface, and overall, can be in the form of a so-called bolt. In addition, a non-circular hole in which the planar shape thereof is roughly in the shape of the letter "hyphen", roughly in the shape of an inverted "Y", roughly in the shape of a cross, roughly in the shape of a polygon, or a composite shape thereof may be formed on the non-circular end portion, and may be allowed to be rotated with a screw turning tool referred to as a so-called regular screwdriver or Phillips screwdriver.

The duplex threaded body in the present embodiment has a right-handed thread 20 in the form of a clockwise spiral groove formed along a spiral path, namely a clockwise helical line, depicted by moving the center of a clockwise circular path at a constant speed along a central axis C of the rod-like member 10, and a left-handed thread 30 in the form of a counter-clockwise spiral groove formed along a spiral path, namely a counter-clockwise helical line, depicted by moving the center of a counter-clockwise circular path at a constant speed along the central axis C of the rod-like member 10, on the outer circumferential surface of the rod-like member 10.

Although the right-handed thread 20 and the left-handed thread 30 can be formed by forming spiral grooves recessed from the surface of the rod-like member 10, a clockwise helical right-handed spiral groove and a counter-clockwise helical left-handed spiral groove may be provided on the same region on the outer circumferential surface in the axial direction of the rod-like member 10 by providing a plurality of non-helical lines in which ridgeline-like center lines are set perpendicular to the axial direction of the rod-like member 10 and which protrude from the surface of the rod-like member 10, and are formed intermittently at different levels relative to the axial direction, alternately with respect to the direction of diameter, and in the shape of a roughly arc along the outer circumferential surface of the rod-like member 10.

The rod-like member 10 is composed of a suitable material that enables it to have a solid form selected from, for example, inorganic materials such as metals composed of a single element or a combination of a plurality of elements or ceramics such as porcelain, cement or glass, organic materials such as synthetic resins including thermoplastic resins or thermosetting resins, natural resins, plastics such as rubber-based resins, paper or wood, and composite materials thereof.

The outer circumferential surface of the rod-like member 10 has a right-handed threaded portion 21, which is the region in which the right-handed thread 20 is formed, and a left-handed threaded portion 31, which is the region where the left-handed thread is formed, and is provided with a region in which the right-handed threaded portion 21 and the left-handed threaded portion 31 overlap. FIG. 1 is a perspective view of this overlapping region 3 in which the right-handed threaded portion 21 and the left-handed threaded portion 31 overlap. Furthermore, although the duplex threaded body 1 shown in the drawing is a trapezoidal threaded screw having a trapezoidal thread ridge 2, this is naturally not limited to a trapezoidal threaded screw, but rather may be a rectangular threaded screw as well as a jagged threaded screw, round threaded screw or ball screw.

Here, although a pitch PR of the right-handed thread 20 and a pitch PL of the left-handed thread 30 in the duplex threaded body shown in FIG. 1 are set to mutually equal, the pitch PR of the right-handed thread 20 and the pitch PL of the left-handed thread 30 are naturally not required to be set to be equal, but rather each may be respectively set to a suitable pitch. Furthermore, in the case of setting the pitch PR of the right-handed thread 20 and the pitch PL of the left-handed thread 30 to be mutually equal, in addition to improving appearance, so-called play accompanying pitch when internally-threaded bodies to be described later are screwed on as well as looseness caused by differences therein are completely prevented.

Figure 2:
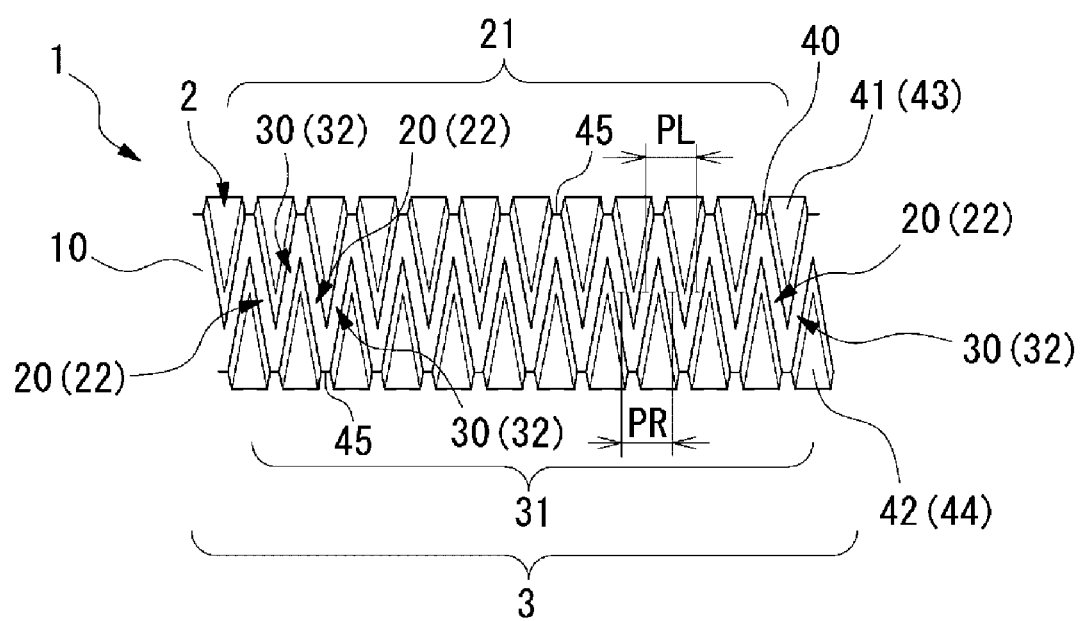
FIG. 2 is a side view showing a lateral surface of the duplex externally-threaded body of FIG. 1 when viewed from arrow A.

A side view of the duplex threaded body 1 of the present embodiment is shown in FIG. 2. As shown in FIG. 2, in the case of having set the pitch PR of the right-handed thread 20 and the pitch PL of the left-handed thread 30 to be equal, a clockwise spiral groove 22, which appears in the form of a plurality of mutually parallel grooves oriented diagonally downward to the right, and a counter-clockwise spiral groove 32, which appears in the form of a plurality of mutually parallel grooves oriented diagonally downward to the left, overlap forming a zigzag groove 40. An inverted triangular ridge portion 41 positioned on the upper side and a triangular ridge portion 42 positioned on the lower side are respectively composed to fulfill the role of guides that simultaneously guide a right-handed internally-threaded body (not shown), which is screwed on corresponding to right-handed thread 20, and a left-handed internally-threaded body (not shown), which is screwed on corresponding to the left-handed thread 30, so as so surround this zigzag groove 40.

Figure 3:
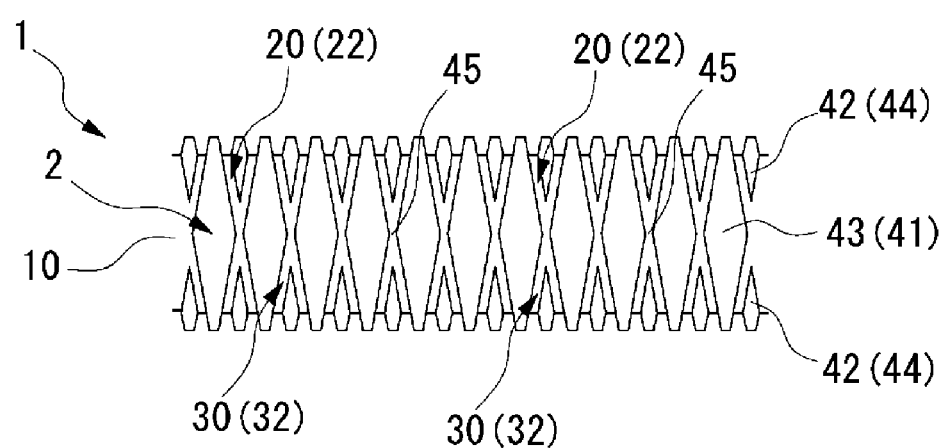
FIG. 3 is a drawing showing a lateral surface of the duplex externally-threaded body of FIG. 1 when viewed from arrow B that is perpendicular to the lateral surface of FIG. 2.

As shown in FIG. 3, the clockwise spiral groove 22 and the counter-clockwise spiral groove 32 form an intersecting point 45 on a lateral surface perpendicular to the lateral surface shown in FIG. 2. As can be understood from a comparison of FIGS. 1, 2 and 3, the inverted triangular ridge portion 41 and triangular ridge portion 42 visible in FIG. 2 actually have a roughly rhombic shape when developed into a plane, and rhombic ridge portions 43 and 44, which are mutually opposed at the location of diameter, are composed by being alternately formed at different levels in the axial direction of the duplex threaded body 1. It goes without saying that the shape of the ridge portions naturally differ from that explained above if the pitch PR of the left-handed thread 20 and the pitch PL of the right-handed thread 30 are different from each other.

Figure 4:
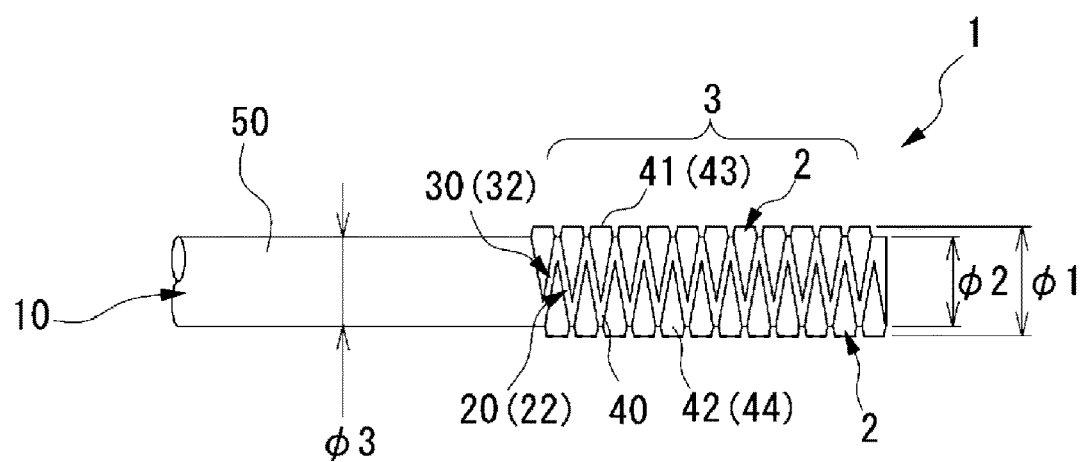
FIG. 4 is a side view showing a state in which a rod-like non-threaded portion having an outer diameter equal to a core diameter is extending from one end of the duplex externally-threaded body of FIG. 1.
Figure 5:
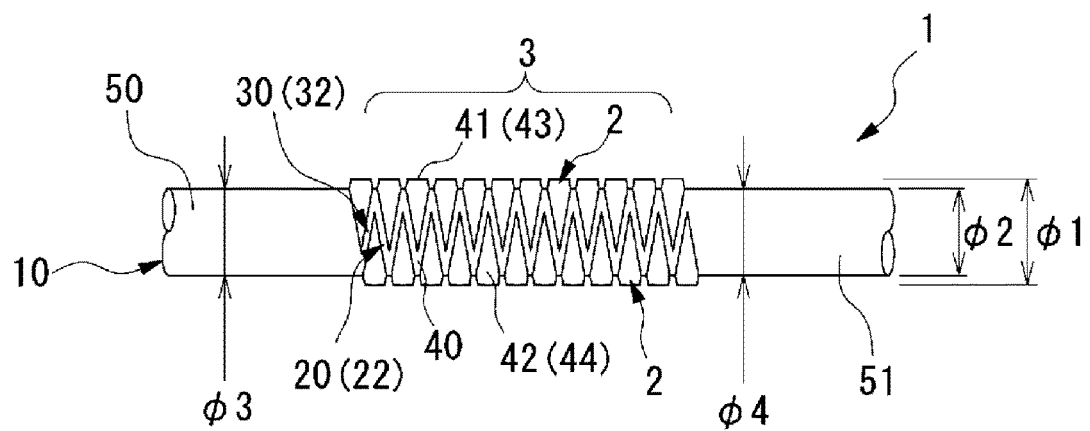
FIG. 5 is a side view showing a state in which rod-like non-threaded portions having an outer diameter equal to a core diameter are respectively extending from both ends of the duplex externally-threaded body of FIG. 1.

The overlapping region of the right-handed threaded portion 21 and the left-handed threaded portion 31 in the duplex threaded body 1 of the present embodiment can form a region from one end of the rod-like member 10 to a suitable intermediate position as shown in FIG. 4, or be formed at a suitable intermediate site of the rod-like member 10 and respectively forms non-threaded portions 50 and 51 on both ends of the overlapping region 3 as shown in FIG. 5, and can be formed at a suitable site of the rod-like member 10. In addition, although not shown in the drawings, a region in which only one of the right-handed threaded portion 21 and the left-handed threaded portion 31 is formed can also be formed on one or both ends of the overlapping region 3 of the right-handed threaded portion 21 and the left-handed threaded portion 31.

Figure 6:
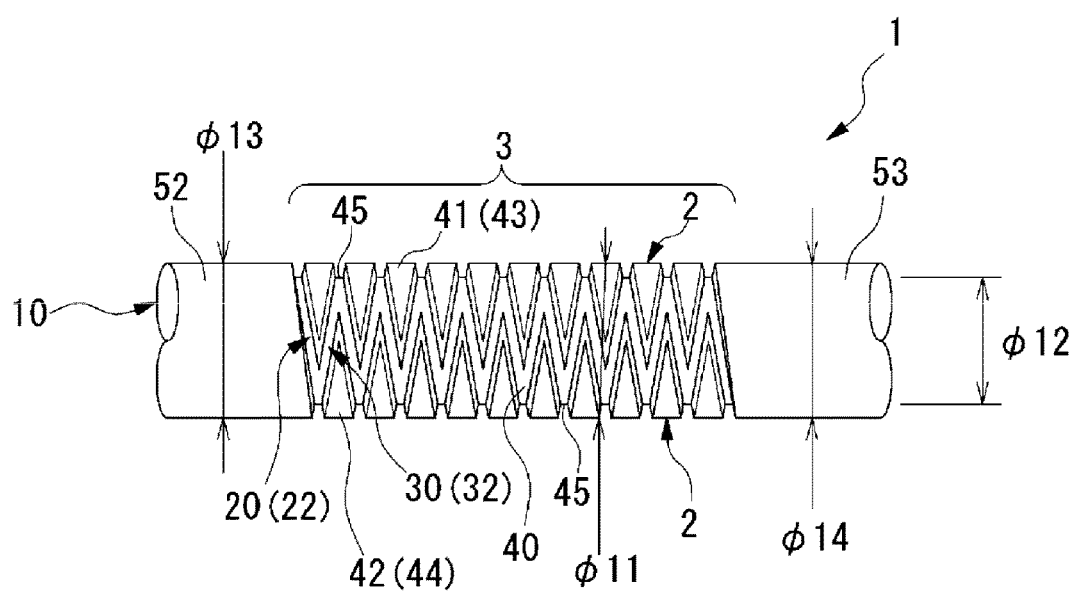
FIG. 6 is a side view showing a state in which rod-like non-threaded portions having an outer diameter equal to the outer diameter of a threaded portion are respectively extending from both ends of the duplex externally-threaded body of FIG. 1.

Furthermore, in the duplex threaded body 1 shown in FIG. 4 or FIG. 5, although the outer diameter of the ridge portion, namely an outer diameter $\phi 1$, is larger than outer diameters $\phi 3$ and $\phi 4$ of the non-threaded portions 50 and 51, a core diameter $\phi 2$ is equal to the outer diameters $\phi 3$ and $\phi 4$ of the non-threaded portions 50 and 51, and the bottom of the spiral groove is composed to be of the same height as the non-threaded portions 50 and 51, the outer diameter $\phi 1$ or the core diameter $\phi 2$ of the threaded portion, or the outer diameters $\phi 3$ and $\phi 4$ of the non-threaded portions 50 and 51 can be set as is suitable. For example, as shown in FIG. 6, these diameters may be set such that an outer diameter $\phi 11$ of the threaded portion is equal to outer diameters $\phi 13$ and $\phi 14$ of the non-threaded portions 52 and 53 and a core diameter $\phi 12$ is smaller in comparison thereto, and the clockwise spiral groove 22 and the counter-clockwise spiral groove 32 are formed to be overlapping in the same region on the outer circumferential surface of the rod-like member 10 so as to form a groove in the rod-like member 10.

Figure 7A:
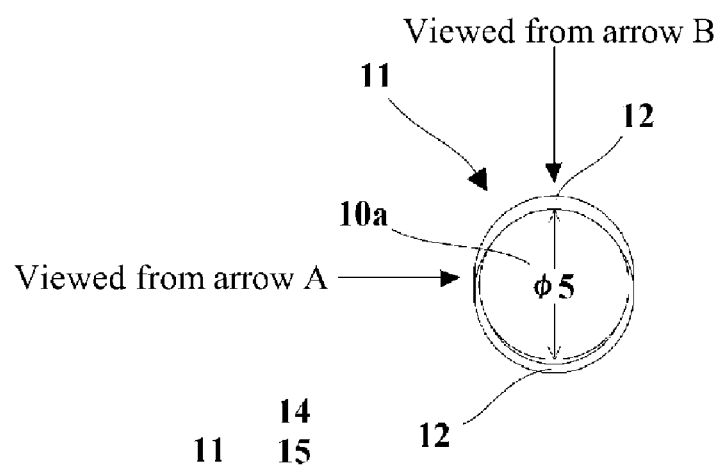
FIG. 7A is a end view showing the structure of a duplex externally-threaded body of a second embodiment.
Figure 7B:
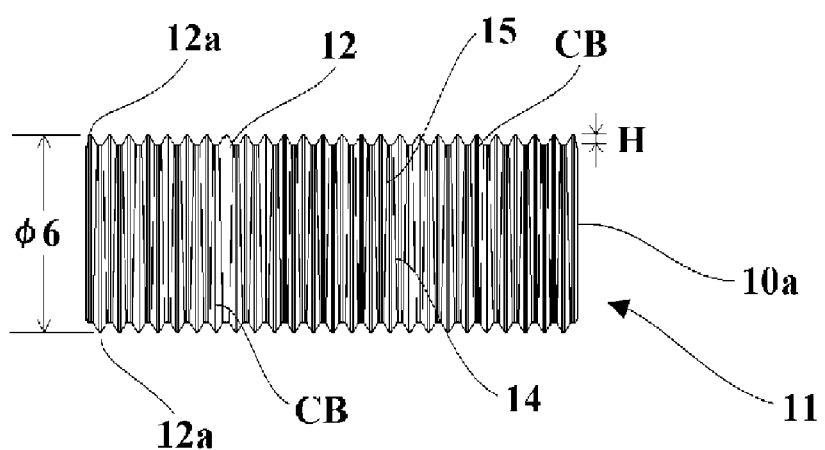
FIG. 7B is a side view of a short diameter portion of the duplex externally-threaded body of FIG. 7A, namely the duplex externally-threaded body when viewed from arrow A.
Figure 7C:
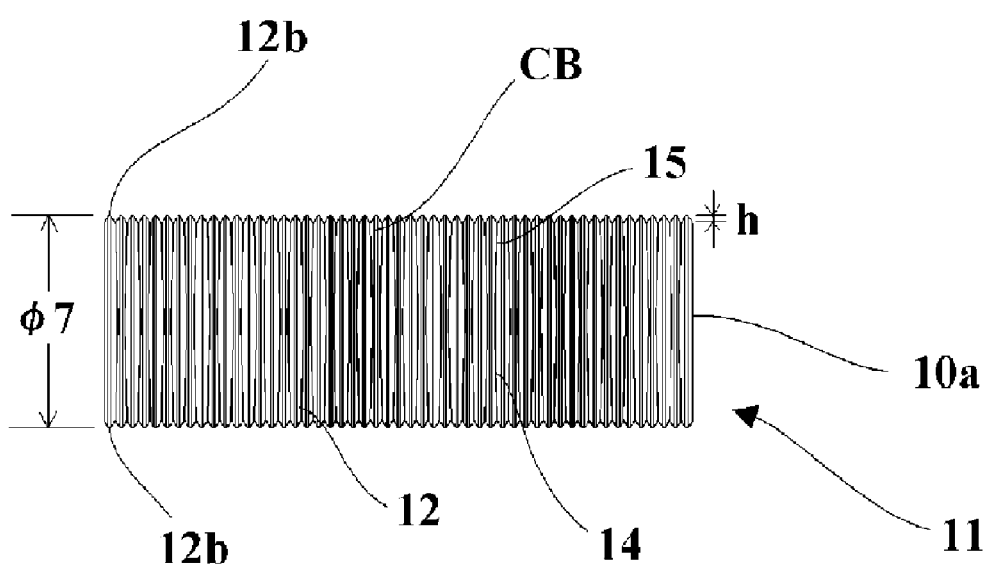
FIG. 7C is a side view of a long diameter portion of the duplex externally-threaded body of FIG. 7A, namely the duplex externally-threaded body when viewed from arrow B.

Although the duplex threaded body 1 as explained above is set to a fixed diameter at all locations on a distal end in the direction of diameter of the overlapping region 3, as an example of another structure, as shown in FIGS. 7A to 7C, in a duplex threaded body 11, a plurality of lines 12, in which strip-like center lines CB serving as ridgelines are set perpendicular to the axial direction of a rod-like shaft body 10a having a diameter $\phi 5$, are provided protruding from the outer circumferential surface of the shaft body 10a, and formed intermittently at different levels relative to the axial direction, alternately with respect to the direction of diameter, and in the shape of a roughly arc along the outer circumferential surface of the shaft body 10a, and as a result of forming these plurality of lines 12, a clockwise spiral groove 14 and a counter-clockwise spiral groove 15 are created in the same region in the axial direction of the shaft body 10a, or in other words, compose an overlapping region 13.

As shown in FIG. 7A, the outer shape of an end portion of the shaft body 10a when viewed in the axial direction of the shaft body 10a of this duplex threaded body 11 is roughly circular. The strip-like center lines CB serving as ridgelines at the distal ends of the plurality of lines 12 formed roughly into the shape of arcs on the outer circumferential surface of the shaft body 10a respectively have opposing semi-elliptical shapes when viewed in the axial direction, and despite the shaft body having a columnar shape, the overall outer shape when viewed in the axial direction is roughly elliptical.

In this duplex threaded body 11, as shown in FIG. 7B, an outer diameter $\phi 6$ of an apex 12a of the lines 12 when viewed from the direction of a normal line to the outer circumferential surface of the shaft body 10a is set to be larger than an outer diameter $\phi 7$ of an apex 12b of the lines 12 when viewed from the direction of a normal line shown in FIG. 7C that is perpendicular to the above normal line. In other words, in the duplex threaded body 11, the diameters of the apices 12a and 12b of the lines 12 have a long diameter portion and a short diameter portion.

Furthermore, a height H of the lines 12 when viewed from the direction of the short axis shown in FIG. 7B is set to be roughly twice a height h of the lines 12 when viewed from the direction of the long axis shown in FIG. 7C. The number of lines 12 per unit length in the axial direction of the shaft body 10a when viewed from the direction of the long axis portion is set to be roughly twice the number of lines 12 per unit length in the axial direction of the shaft body 10a when viewed from the direction of the short axis portion.

Naturally, although not shown in the drawings, the duplex threaded body 1 and the duplex threaded body 11 can be composed in the manner of a tapered screw or wood screw by forming the rod-like member 10 and the shaft body 10a into a roughly conical shape.

The duplex threaded body 1 as explained above can be used in transfer or movement applications for transmitting motive power or movement, in fastening applications for tightening mechanical parts and the like, as well as in measurement or adjustment applications for measuring dimensions or adjusting position by utilizing the correlation between screw rotation and distance moved in the axial direction.

Figure 8A:
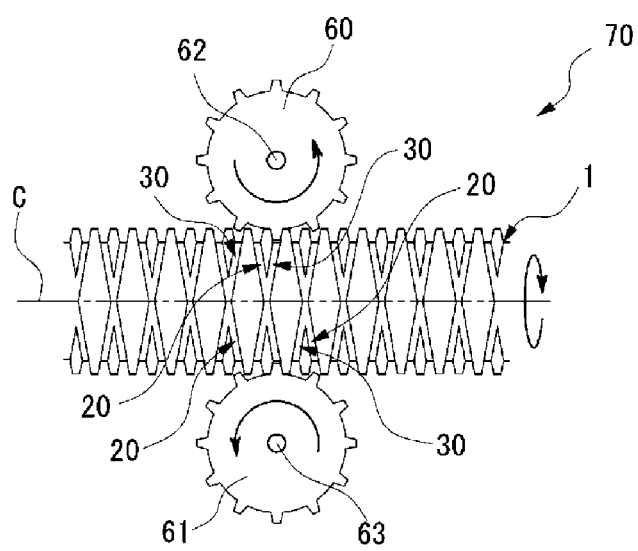
FIG. 8A is a side view showing the composition of an inter-multi-shaft power transmission mechanism composed by combining a single duplex externally-threaded body of FIG. 3 and two gears.

For example, in the case of combining the use of a single duplex threaded body 1 and two gears 60 and 61, as shown in FIG. 8A, rotational movement in mutually the same direction perpendicular to rotation centering on the central axis C of the duplex threaded body 1 can be created at target positions with the central axis C of the duplex threaded body 1 interposed therebetween.

This is an inter-multi-shaft power transmission mechanism 70 that demonstrates operation that is impossible with a combination of a single duplex threaded body of the prior art (not shown in the drawings) and two gears 60 and 61, and is composed by the duplex threaded body 1, a first gear 60 axially supported by meshing with the left-handed thread 30 of the duplex threaded body 1, and a second gear 61 axially supported by meshing with the right-handed thread 20 of the duplex threaded body 1. A first axial rod 62, which axially supports the first gear 60, and a second axial rod 63, which axially supports the second gear 61, are arranged perpendicularly to the central axis C of the duplex threaded body 1 with the duplex threaded body 1 interposed there between.

When the inter-multi-shaft power transmission mechanism 70 composed in this manner is rotated in a fixed direction without being accompanied by advancing movement of the duplex threaded body 1, the first gear 60 rotates in a fixed direction centering about the first axial rod 62 by rotation of the left-handed thread 30 of the duplex threaded body 1 in coordination therewith. In response, the second gear 61 rotates in the same direction as the first gear 60 centering about the second axial rod 63 by rotation of the right-handed thread 20 of the duplex threaded body 1.

Figure 8B:
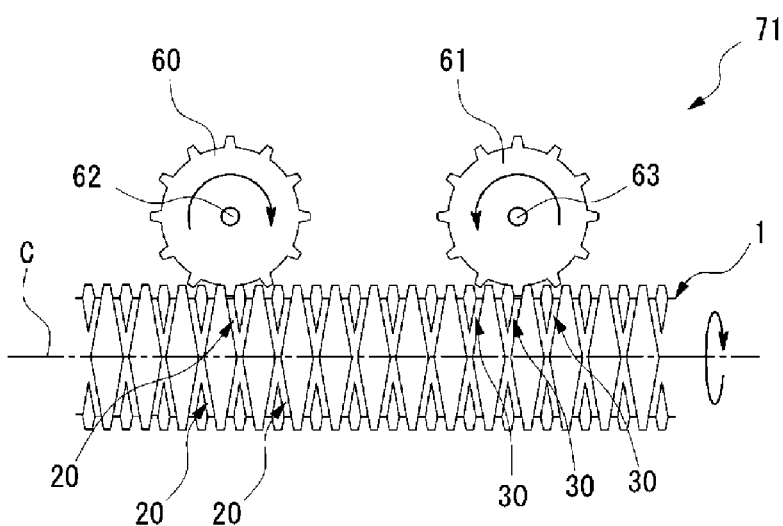
FIG. 8B is a side view of a different inter-multi-shaft power transmission mechanism composed by combining a single duplex externally-threaded body of FIG. 3 and two gears.

In addition, as shown in FIG. 8B, as a different multi-shaft power transmission mechanism 71, which is composed by combining a single duplex threaded body 1 and two gears 60 and 61, rotational movement in the opposite directions and perpendicular to rotation centering about the central axis C of the duplex threaded body 1 is generated at locations not lying on opposite sides of the central axis C of the duplex threaded body 1. As a result, the right-handed thread becomes a free end in the overlapping region of the duplex threaded body.

This inter-multi-shaft power transmission mechanism 71 is composed of the duplex threaded body 1, the first gear 60 axially supported by meshing with the right-hand thread 20 of the duplex threaded body 1, and the second gear 61 axially supported by meshing with the left-handed thread 30 of the duplex threaded body 1. The first axial rod 62, which axially supports the first gear 60, and the second axial rod 63, which axially supports the second gear 61, are respectively arranged perpendicular to the central axis C of the duplex threaded body 1 at an interval greater than the distance obtained by adding the radius of the first gear 60 and the radius of the second gear 61 on a straight line parallel to the central axis C of the duplex threaded body 1 on the outer circumferential surface of the duplex threaded body 1.

When the inter-multi-shaft power transmission mechanism 71 composed in this manner is rotated in a fixed direction without being accompanied by advancing movement of the duplex threaded body 1, the first gear 60 rotates in a fixed direction centering about the first axial rod 62 by rotation of the right-handed thread 20 of the duplex threaded body 1 in coordination therewith. In response thereto, the second gear 61 rotates in the opposite direction of the first gear 60 centering about the second axial rod 63 by rotation of the left-handed thread 30 of the duplex threaded body 1.

Although the above-mentioned explanation described the example of the use of pinion gears for the gears used in combination with the duplex threaded body, the present embodiment is naturally not limited thereto, but rather it goes without saying that various other types of gears, such as rack gears or bevel gears, may also be used in combination with the duplex threaded body. In addition, the duplex threaded body 1 of the present invention can also be used for fastening by combining with an internally-threaded body such as a nut.

In the case of combining the use of an internally-threaded body with a single duplex threaded body 1 of the present embodiment, one or more of one of, or one or more of both of a right-handed internally-threaded body 80 which is able to screw onto the right-handed thread 20 of the duplex threaded body 1, and a left-handed internally-threaded body 90 which is able to screw onto the left-handed thread 30 of the duplex threaded body 1, can be used alone or in combination as an internally-threaded body.

Figure 9:
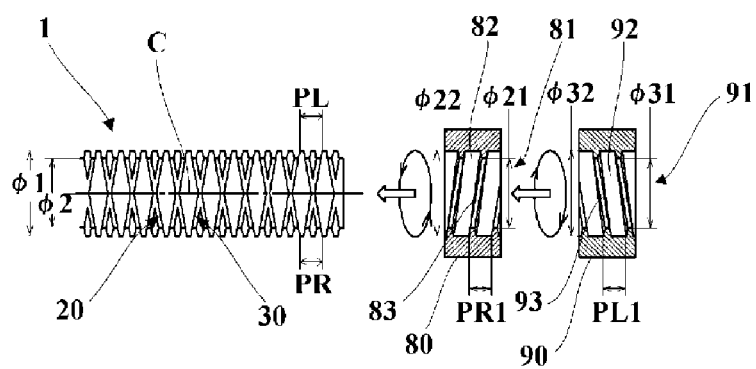
FIG. 9 is a partial cross-sectional view schematically showing the process of screwing a right-handed internally-threaded body and a left-handed internally-threaded body onto the duplex externally-threaded body of FIG. 3.

For example, as shown in FIG. 9, in the case of using a single right-handed internally-threaded body 80 and a single left-handed internally-threaded body 90 in combination with a single duplex threaded body 1 in which the right-handed thread 20 and the left-handed thread 30 are provided overlapping from one end to the other end, the right-handed internally-threaded body 80 and the left-handed internally-threaded body 90 are sequentially screwed onto the duplex threaded body 1 from one end of the duplex threaded body 1.

The right-handed internally-threaded body 80 has a roughly circular threaded hole 81 penetrating from one end to the other end in the axial direction thereof. A clockwise spiral groove 82 or spiral thread 83 formed so as to be able to screw onto the right-handed thread 20 formed on the duplex threaded body 1 is formed on the inner circumferential surface of the threaded hole 81. Namely, the clockwise spiral thread 83 formed on the inner circumferential surface of the threaded hole 81 of the right-handed internally-threaded body 80 has a trapezoidal cross-section, a pitch PR1 thereof is substantially equal to the pitch PR of the right-handed thread 20 of the duplex threaded body 1, an inner diameter $\phi 21$ thereof corresponds to the core diameter $\phi 2$ of the duplex threaded body 1, and a core diameter $\phi 22$ thereof is set to as to correspond to the outer diameter $\phi 1$ of the duplex threaded body 1, and is composed so as to be able to screw onto the clockwise spiral groove 22 formed in the outer circumferential surface of the duplex threaded body 1. Although there are no particular limitations on the outer shape of the right-handed internally-threaded body 80, the planar shape from the axial direction is preferably a polygon such as a square or hexagon in consideration of ease of grasping from the outside and ease when applying rotational force.

The left-handed internally-threaded body 90 is composed of a solid material, and has a roughly circular threaded hole 91 penetrating from one end to the other end in the axial direction thereof. A counter-clockwise spiral groove 92 or spiral thread 93 formed so as to be able to screw onto the left-handed thread 30 formed on the duplex threaded body 1 is formed on the inner circumferential surface of the threaded hole 91. Namely, the counter-clockwise spiral thread 93 formed on the inner circumferential surface of the threaded hole 91 of the left-handed internally-threaded body 90 has a trapezoidal cross-section, a pitch PL1 thereof is substantially equal to the pitch PL of the left-handed thread 30 of the duplex threaded body 1, an inner diameter $\phi 31$ thereof corresponds to the core diameter $\phi 2$ of the duplex threaded body 1, and a core diameter $\phi 32$ thereof is set to as to correspond to the outer diameter $\phi 1$ of the duplex threaded body 1, and is composed so as to be able to screw onto the counter-clockwise spiral groove 32 formed in the outer circumferential surface of the duplex threaded body 1. Although there are no particular limitations on the outer shape of the left-handed internally-threaded body 90, the planar shape from the axial direction is preferably a polygon such as a square or hexagon in consideration of ease of grasping from the outside and ease when applying rotational force.

Figure 10A:
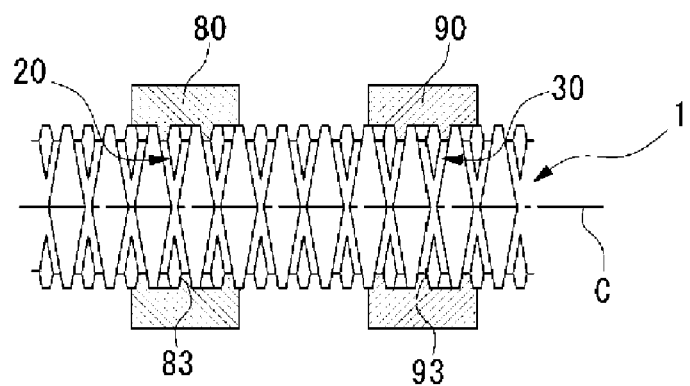
FIG. 10A is a partial cross-sectional view showing a state in which a right-handed internally-threaded body and a left-handed internally-threaded body are respectively screwed onto the duplex externally-threaded body of FIG. 3 with the right-handed internally-threaded body and the left-handed internally-threaded body separated.

In the case of screwing the right-handed internally-threaded body 80 and the left-handed internally threaded body 90 onto the duplex threaded body 1, as shown in FIG. 10A, the right-handed internally-threaded body 80 is first screwed from one end of the duplex threaded body 1 to a suitable position by rotating clockwise on the central axis C of the duplex threaded body 1. Next, the left-handed internally-threaded body 90 is screws from one end of the duplex threaded body 1 to a suitable position in front of the right-handed internally-threaded body 80 while rotating counter-clockwise on the central axis C of the duplex threaded body 1. Naturally, it goes without saying that the order in which the right-handed internally-threaded body 80 and the left-handed internally-threaded body 90 are screwed on can be interchanged.

Figure 10B:
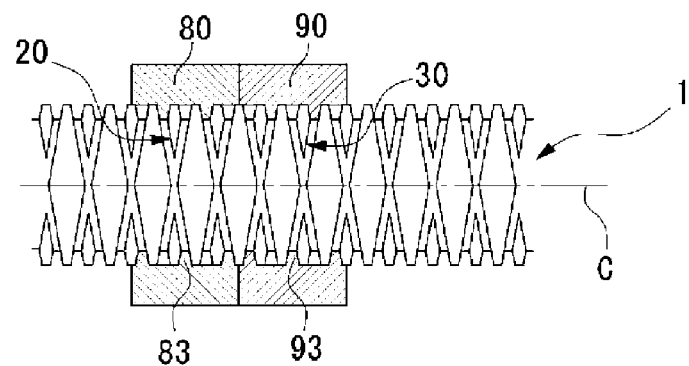
FIG. 10B is a partial cross-sectional view showing a state in which a right-handed internally-threaded body and a left-handed internally-threaded body are in contact on the duplex externally-threaded body.

In addition, as shown in FIG. 10B, the position at which the left-handed internally-threaded body 90 is screwed on may be a position at which it is pressed against the right-handed internally-threaded body 80. In this case, if the left-handed internally-threaded body 90 is further rotated counter-clockwise so as to advance towards the right-handed internally-threaded body 80, frictional force occurs between the front end of the left-handed internally-threaded body 90 and the rear end of the right-handed internally-threaded body 80 in contact therewith, rotational force of counter-clockwise rotation is imparted to the right-handed internally-threaded body 80 by this frictional force, and force occurs in the right-handed internally-threaded body 80 that attempts to cause it to regress along the path of the right-handed thread 20. Here, since the pitch PR1 of the right-handed internally-threaded body 80 and the pitch PL1 of the left-handed internally-threaded body 90 are equal, mutually opposing forces act between the right-handed internally-threaded body 80 and the left-handed internally-threaded body 90, and as a result of these forces working against each other, the right-handed internally-threaded body 80 and the left-handed internally-threaded body 90 respectively remain motionless at their respective positions.

Conversely, if clockwise rotational force is imparted to the left-handed internally-threaded body 90 while pressed against the right-handed internally-threaded body 80, the left-handed internally-threaded body 90 regresses along the path of the left-handed thread 30 formed on the outer circumferential surface of the duplex threaded body 1. However, the right-handed internally-threaded body 80 and the left-handed internally-threaded body 90 can be prevented from mutually rotating by devising some form of means for preventing their rotation while allowing them to approach each other.

Figure 10C:
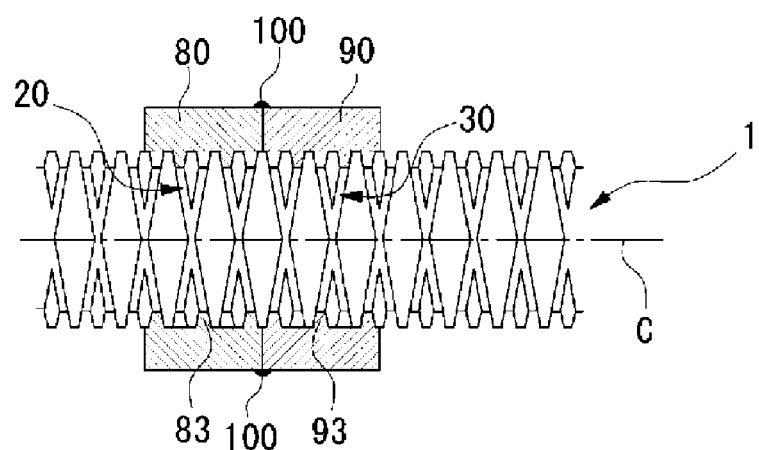
FIG. 10C is a partial cross-sectional view showing a state in which a right-handed internally-threaded body and a left-handed internally-threaded body are coupled by welding.

For example, as shown in FIG. 10C, in an overlapping region 3, in which the right-handed thread 21 and the left-handed thread 31 of the duplex threaded body 1 overlap, or in a boundary region between the right-handed thread 21 and the left-handed thread 31, the right-handed internally-threaded body 80 and the left-handed internally-threaded body 90 are pressed together and mutually coupled as a result of applying a weld 100, thereby making it possible to prevent rotation of the right-handed internally-threaded body 80 and the left-handed internally-threaded body 90 relative to the duplex threaded body 1.

In this case, if counter-clockwise rotational force is applied to the left-handed internally-threaded body 90, when the left-handed internally-threaded body 90 attempts to advance towards the right-handed internally-threaded body 80, the right-handed internally-threaded body 80 attempts to regress towards the left-handed internally-threaded body 90, their forces work against each other and both the right-handed internally-threaded body 80 and the left-handed internally-threaded body 90 remain motionless. Conversely, if clockwise rotational force is applied to the left-handed internally-threaded body 90, although a force acts on the left-handed internally-threaded body 90 that causes it to regress along the path of the left-handed thread 30, clockwise rotational force is applied to the right-handed internally-threaded body 80 coupled to the left-handed internally-threaded body 90, a force acts on the right-handed internally-threaded body 80 that causes it to advance along the path of the right-handed thread 20, and these oppositely oriented forces work against each other causing the right-handed internally-threaded body 80 and the left-handed internally-threaded body 90 to both remain motionless.

Thus, according to this method, by combining a single duplex threaded body 1, the right-handed internally-threaded body 80 and the left-handed internally-threaded body 90, a locking effect can be demonstrated at an arbitrary intermediate position on the duplex threaded body 1 by mutually coupling the right-handed internally-threaded body 80 and the left-handed internally-threaded body 90 in the duplex threaded body 1.

In the above-mentioned explanation, although the right-handed internally-threaded body 80 and the left-handed internally-threaded body 90 are conventionally known threaded bodies and their coupling is achieved by means of welding, the internally-threaded bodies are not necessarily required to be welded, but rather a configuration can be employed in which coupling means is respectively provided on a right-handed internally-threaded body and a left-handed internally-threaded body and the right-handed internally-threaded body and the left-handed internally-threaded body are coupled by utilizing that coupling means, such as a configuration in which the internally-threaded bodies are coupled with an adhesive, or a configuration in which a first magnetic pole is provided on one end of one of the left-handed internally-threaded body and right-handed internally-threaded body and one end of the other internally-threaded body is composed of a ferromagnetic body to allow a magnetic pole corresponding to the first magnetic pole to be generated thereby and cause mutual magnetic coupling, or a configuration in which a first magnetic pole is provided on one end of the right-handed internally-threaded body, a second magnetic pole is provided on one end of the left-handed internally-threaded body, the right-handed internally-threaded body and the left-handed internally-threaded body can be made to approach each other by making the first magnetic pole and the second magnetic pole mutually different magnetic poles, and these magnetic poles allowing these magnetic couples to magnetically couple so that the right-handed internally-threaded body and the left-handed internally-threaded body are coupled.

An example of coupling means provided in advance in an internally-threaded body is composed of an inserting portion which is provided on one of a right-handed internally-threaded body or a left-handed internally-threaded body, and a receiving portion that is provided on the other internally-threaded body and receives the inserting portion, and when mutually pressing together the right-handed internally-threaded body and the left-handed internally-threaded body, the inserting portion is received by the receiving portion and the inserting portion and the receiving portion are mutually engaged. A detailed explanation of internally-threaded bodies of such a configuration is provided below with reference to the drawings.

Figure 12A:
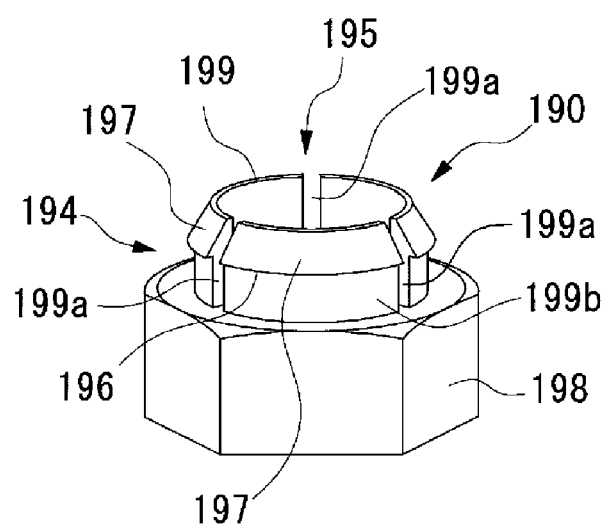
FIG. 12A is a perspective view of a left-handed internally-threaded body that forms a pair with the right-handed internally-threaded body shown in FIG. 11.
Figure 12B:
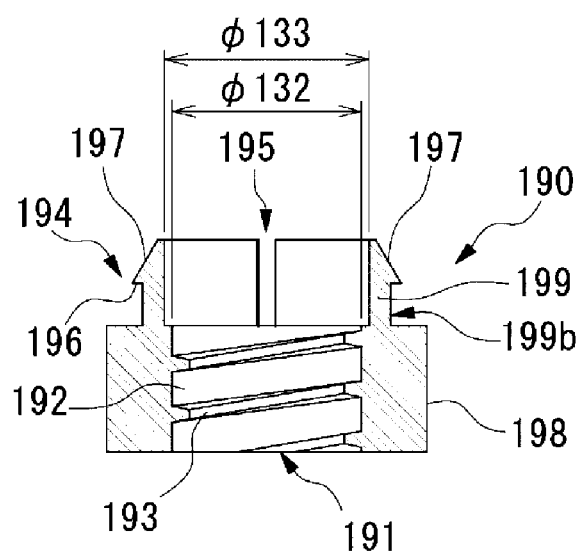
FIG. 12B is a cross-sectional view of that left-handed internally-threaded body.
Figure 13:
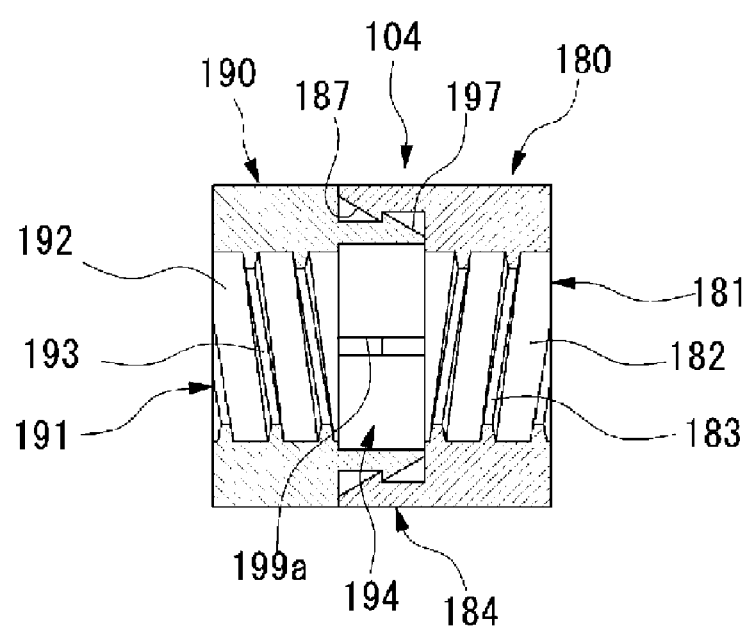
FIG. 13 is a cross-sectional view showing a state in which the right-handed internally-threaded body and left-handed internally-threaded body shown in FIGS. 11 and 12 are mutually coupled.

Coupling means 104 of embodiments shown in FIGS. 11 to 13 is composed of a receiving portion 184 formed in a right-handed internally-threaded body 180 and an inserting portion 194 formed in a left-handed internally-threaded body 190.

Figure 11A:
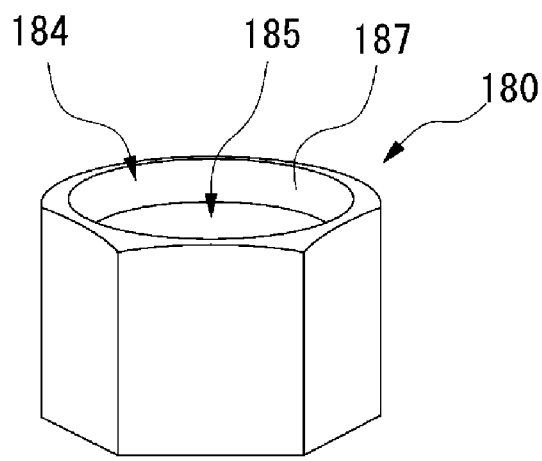
FIG. 11A is a perspective view of a right-handed internally-threaded body of a right-handed internally-threaded body and left-handed internally-threaded body pair provided with coupling means in which rotational coupling is achieved by a retaining mechanism.
Figure 11B:
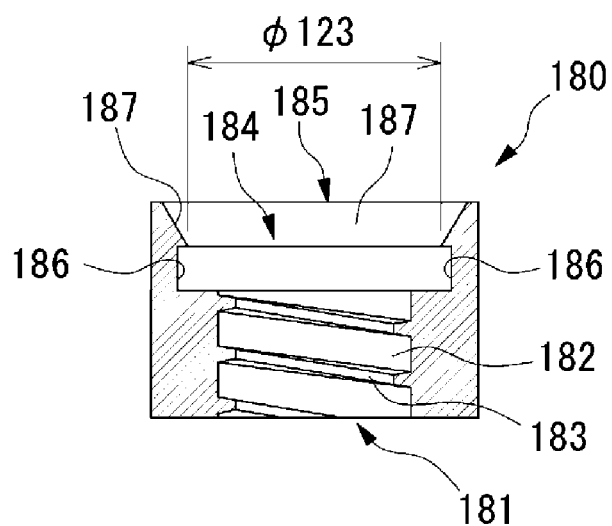
FIG. 11B is a cross-sectional view of that right-handed internally-threaded body.

The right-handed internally-threaded body 180 is composed of a solid material, and as shown in FIG. 11A, the outer shape thereof has a roughly hexagonal shape, and as shown in FIG. 11B, has a roughly circular through hole 185 penetrating in the axial direction thereof in a central portion. A suitably shaped tapered portion 187 is formed facing from the lower end towards the upper end of the through hole 185, and a threaded hole 181, which is composed of a clockwise spiral groove 182 and a clockwise spiral thread 183, is formed on the inner circumferential surface of the through hole 185 to an intermediate receiving position formed in the left-handed internally-threaded body so as to be able to be screwed onto the right-handed thread 20 of the duplex threaded body 1.

The receiving portion 184 is formed from the upper end of this threaded hole 181 to the upper end of the through hole 185. An engagement receiving portion 186 is formed by narrowing the receiving portion 184 from the inner circumferential surface of the through hole 185 towards the outside in the radial direction at a suitable height of the portion directly above the through hole 181. The tapered portion 187, which spreads in the manner of a tapered shape from the portion directly above the engagement receiving portion 186 to the upper end of the through hole 185, is formed from directly above the engagement receiving portion 186 to the upper end of the through hole 185, and is composed to facilitate insertion of the inserting portion 194 formed in the left-handed internally-threaded body 190.

The left-handed internally-threaded body 190 of the present embodiment is composed of a solid material, and as shown in FIG. 12A, has a hexagonal tubular portion 198, which extends to a suitable height in the axial direction, and an inserting portion 194, which is formed on the upper end of this hexagonal tubular portion 198. As shown in FIG. 12B, the central portion of the left-handed internally-threaded body 190 has a roughly circular through hole 195 penetrating in the axial direction thereof. A threaded hole 191, which is composed by a counter-clockwise spiral groove 192 and a counter-clockwise spiral thread 193 so as to be able to screw onto the left-handed thread 30 of the duplex threaded body 1, is formed on the inner circumferential surface of the through hole 195.

The inserting portion 194 is formed on the upper end of the hexagonal tubular portion 198. The inserting portion 194 has an upright portion 199 rising roughly in the shape of a tube at an inner diameter $\phi 133$ slightly larger than a core diameter $\phi 132$ of the threaded hole 191 of the hexagonal tubular portion 198. The upright portion 199 has three slits 199a at suitable sites formed mutually in parallel at equal intervals from the upper end towards the lower end of the upright portion 199. Naturally, the number of the slits 199a is not necessarily required to be three, but rather may be less than three or more than three, and the intervals between the slits are not required to be equal.

The maximum wall thickness of this upright portion 199 is set to be equal to or less than half a value determined by subtracting the core diameter $\phi 132$ of the threaded hole 191 from the inner diameter $\phi 123$ of the thick-walled portion of the engagement receiving portion 186 in the receiving portion 184 of the right-handed internally-threaded body 180. In addition, the height from the lower end to the upper end of the upright portion 199 is set to be equal to or less than the depth of the receiving portion 184 of the right-handed internally-threaded body 180. The outer circumferential surface of the upright portion 199 has a vertical portion 199b that rises nearly parallel to the axial direction from the lower end of the upright portion 199 to a suitable intermediate position in the direction of height of the upright portion 199. The upper end of this vertical portion 199b has a locking portion 196 that temporarily spreads slightly to the outside in the radial direction, a tapered portion 197, which is drawn to a tapered shape so as to narrow the radius, is subsequently formed to the upper end of the upright portion 199, and is composed so as to facilitate insertion into the receiving portion 184 formed in the right-handed internally-threaded body 180.

In the case of coupling the receiving portion 184 formed in the right-handed internally-threaded body 180 composed in the manner explained above by engaging with the inserting portion 194 formed in the left-handed internally-threaded body 190, the right-handed internally-threaded body 180 is screwed clockwise towards the rear in the direction of advance of the receiving portion 184 to a desired position on the duplex threaded body 1. Next, the left-handed internally-threaded body 190 is screwed counter-clockwise from the rear of the right-handed internally-threaded body 180 towards the front in the direction of advance of the inserting portion 194 to a position where it couples with the right-handed internally-threaded body 180.

The inserting portion 194 of the left-handed internally-threaded body 190 that has approached the right-handed internally-threaded body 180 is composed so that the left-handed internally-threaded body 190 is further rotated counter-clockwise while holding the right-handed internally-threaded body 180 motionless, the tapered portion 197 of the inserting portion 194 is slid along the tapered portion 187 of the receiving portion 184, the inserting portion 194 is inserted into the receiving portion 184 while being deflected, and the locking portion 196 is engaged with the engagement receiving portion 186 of the receiving portion 184 to prevent the inserting portion 194 from coming out as shown in FIG. 13.

Furthermore, although the right-handed internally-threaded body 180 and the left-handed internally-threaded body 190 composed in the manner explained above are coupled by the inserting portion 194 being preliminarily inserted into the receiving portion 184 on the duplex threaded body, the present embodiment is not limited thereto, but rather an integrated internally-threaded body can be configured that is composed of a pair of the right-handed internally-threaded body 180 and the left-handed internally-threaded body 190 by preliminarily inserting the inserting portion 194 into the receiving portion 184, coupling the right-handed internally-threaded body 180 and the left-handed internally-threaded body 190, and locking the right-handed internally-threaded body 180 and the left-handed internally-threaded body 190 so that they are mutually allowed to rotate while also being prevented from separating.

As described above, in the case of locking the right-handed internally-threaded body 180 and the left-handed internally-threaded body 190 in which thread pitch has been set to be equal in a mutually rotatable manner in an internally-threaded body, when clockwise rotation is applied to the right-handed internally-threaded body 180 at a prescribed angular velocity while simultaneously applying counter-clockwise rotation to the left-handed internally-threaded body 190 at an angular velocity equal to that applied to the right-handed internally-threaded body 180 in the duplex externally-threaded body 1, this internally-threaded body can advance over the duplex threaded body 1 in the positive axial direction, while conversely, when counter-clockwise rotation is applied to the right-handed internally-threaded body 180 at a prescribed angular velocity while simultaneously applying clockwise rotation to the left-handed internally-threaded body 190 at an angular velocity equal to that applied to the right-handed internally-threaded body 180, this internally-threaded body can regress over the duplex threaded body 1 in the negative axial direction.

In other words, in an internally-threaded body employing such a configuration, an action and effect in which movement in the axial direction over the duplex threaded body 1 is only possible when rotation in the opposite direction and of an equal angular velocity to the right-handed internally-threaded body 180 and the left-handed internally-threaded body 190, respectively, is applied, while this internally-threaded body cannot be moved by another method. Thus, the internally-threaded body can be fixed without loosening at an arbitrary position on the duplex threaded body 1 even having to tighten, while also demonstrating the effect of being to screw on and off the internally-threaded body without requiring large rotational force.

Figure 14:
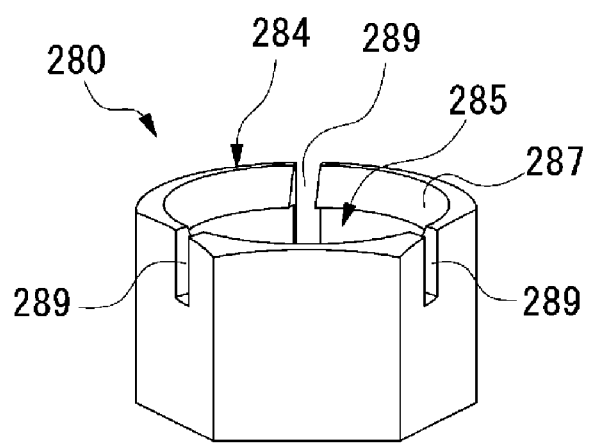
FIG. 14A is a perspective view of a right-handed internally-threaded body of a right-handed internally-threaded body and left-handed internally-threaded body pair provided with different coupling means in which rotational coupling is achieved by a retaining mechanism.
FIG. 14B is a cross-sectional view of that right-handed internally-threaded body.
Figure 14:
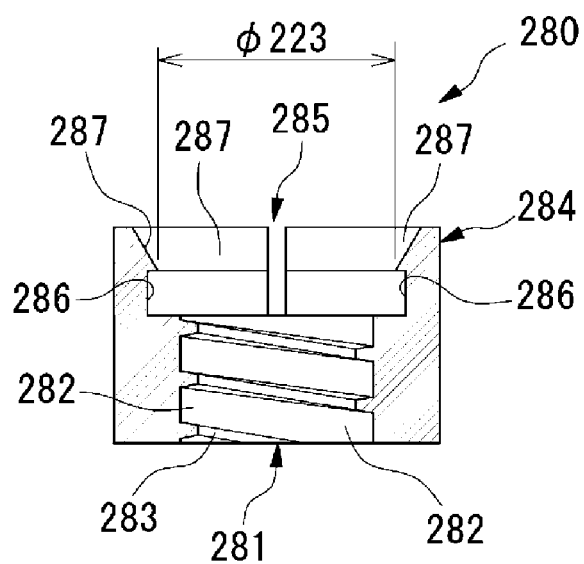
Figure 15:
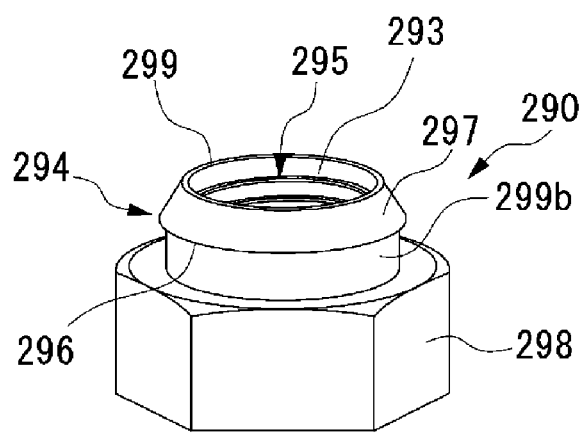
FIG. 15A is a perspective view of a left-handed internally-threaded body that forms a pair with the right-handed internally-threaded body shown in FIG. 14.
FIG. 15B is a cross-sectional view of that left-handed internally-threaded body.
Figure 15:
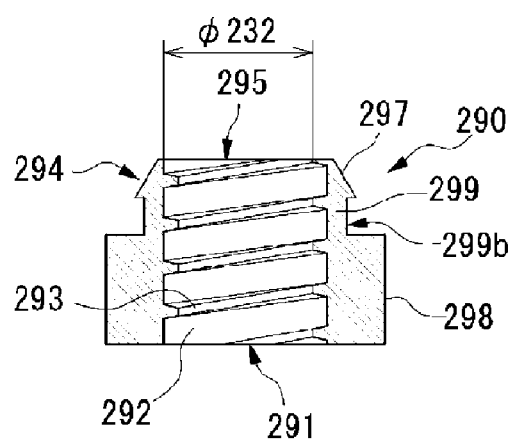
Figure 16:
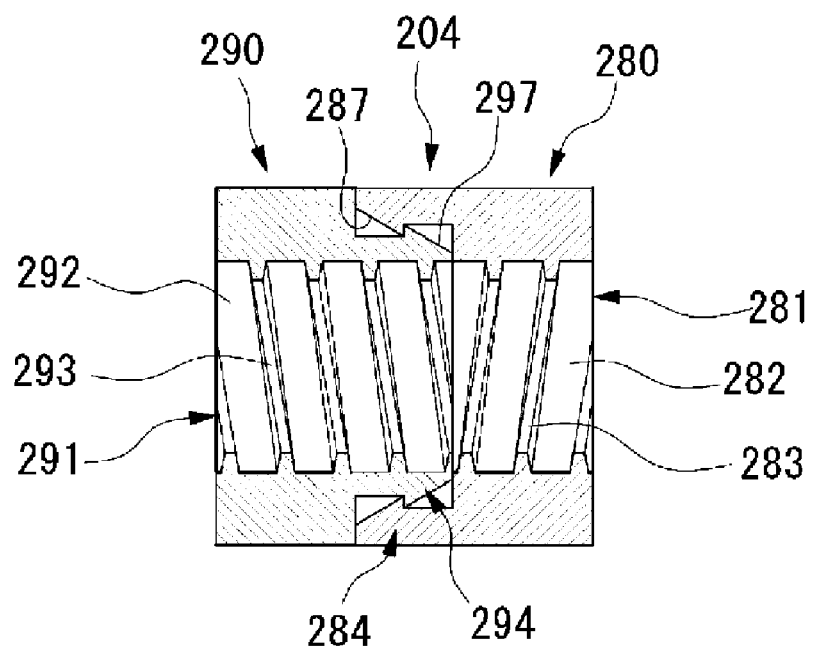
FIG. 16 is a cross-sectional view showing a state in which the left-handed internally-threaded body and left-handed internally-threaded body shown in FIGS. 14 and 15 are mutually coupled.

Here, in the coupling means 104 of the present embodiment, although the slits 199a are provided in upright portion 199 serving as the inserting portion 194, the slits 199a do not necessarily have to be provided on the side of the inserting portion 194, but rather as shown in FIGS. 14 to 16, may also be provided on the side of the receiving portion 184. The following provides a detailed explanation of an example of coupling means 204 having a configuration in which such slits 289 are formed in a receiving portion 284.

The coupling means 204 of the embodiments shown in FIGS. 14 to 16 is composed of the receiving portion 284 formed in a right-handed internally-threaded body 280 and an inserting portion 294 formed in a left-handed internally-threaded body 290.

The right-handed internally-threaded body 280 is composed of a solid material, and as shown in FIG. 14A, the outer shape thereof has a roughly hexagonal tubular shape, and as shown in FIG. 14B, has a roughly circular through hole 285 penetrating in the axial direction thereof in a central portion. A suitably shaped tapered portion 287 is formed facing from the lower end towards the upper end of the through hole 285, and a threaded hole 281, which is composed of a clockwise spiral groove 282 and a clockwise spiral thread 283, is formed on the inner circumferential surface of the through hole 285 to an intermediate receiving position formed in the left-handed internally-threaded body so as to be able to be screwed onto the right-handed thread 20 of the duplex threaded body 1.

The receiving portion 284 is formed from the upper end of this threaded hole 281 to the upper end of the through hole 285. An engagement receiving portion 286 is formed by narrowing the receiving portion 284 from the inner circumferential surface of the through hole 285 towards the outside in the radial direction at a suitable height of the portion directly above the through hole 281. The tapered portion 287, which spreads in the manner of a tapered shape from the portion directly above the engagement receiving portion 286 to the upper end of the through hole 285, is formed from directly above the engagement receiving portion 286 to the upper end of the through hole 285, and is composed to facilitate insertion of the inserting portion 294 formed in the left-handed internally-threaded body 290.

The receiving portion 284 has three slits 289 formed mutually in parallel and at equal intervals from the upper end towards the lower end of the receiving portion 284. Naturally, the number of the slits 289 does not necessarily have to be three, but rather may be less than three or more than three, and the intervals between the slits 289 are not required to be equal.

The left-handed internally-threaded body 290 of the present embodiment is composed of a solid material, and as shown in FIG. 15A, has a hexagonal tubular portion 298, which extends to a suitable height in the axial direction, and the inserting portion 294, which is formed on the upper end of this hexagonal tubular portion 298. As shown in FIG. 15B, the central portion of the left-handed internally-threaded body 290 has a roughly circular through hole 295 penetrating in the axial direction thereof. A threaded hole 291, which is composed by a counter-clockwise spiral groove 292 and a counter-clockwise spiral thread 293 so as to be able to screw onto the left-handed thread 30 of the duplex threaded body 1, is formed on the inner circumferential surface of the through hole 295.

The inserting portion 294 is formed on the upper end of the hexagonal tubular portion 298. The inserting portion 294 has an upright portion 299 rising roughly in the shape of a tube so as to extend the threaded hole 291 of the hexagonal tubular portion 298. Namely, the threaded hole 291 formed on the inner circumferential surface of the hexagonal tubular portion 298 is formed continuously in the inner circumferential surface of the upright portion.

The maximum wall thickness of this upright portion 299 is set to be equal to or less than half a value determined by subtracting a core diameter ϕ232 of the threaded hole 291 from an inner diameter ϕ223 of the thick-walled portion of the engagement receiving portion 286 in the receiving portion 284 of the right-handed internally-threaded body 280. In addition, the height from the lower end to the upper end of the upright portion 299 is set to be equal to or less than the depth of the receiving portion 284 of the right-handed internally-threaded body 280. The outer circumferential surface of the upright portion 299 has a vertical portion 299b that rises nearly parallel to the axial direction from the lower end of the upright portion 299 to a suitable intermediate position in the direction of height of the upright portion 299. The upper end of this vertical portion 299b has a locking portion 296 that temporarily spreads slightly to the outside in the radial direction, a tapered portion 297, which is drawn to a tapered shape so as to narrow the radius, is subsequently formed to the upper end of the upright portion 299, and is composed so as to facilitate insertion into the receiving portion 284 formed in the right-handed internally-threaded body 280.

In the case of rotationally coupling the receiving portion 284 formed in the right-handed internally-threaded body 280 composed in the manner explained above by engaging with the inserting portion 294 formed in the left-handed internally-threaded body 290, the right-handed internally-threaded body 280 is screwed clockwise towards the rear in the direction of advance of the receiving portion 284 to a desired position on the duplex threaded body 1. Next, the left-handed internally-threaded body 290 is screwed counter-clockwise from the rear of the right-handed internally-threaded body 280 towards the front in the direction of advance of the inserting portion 294 to a position where it couples with the right-handed internally-threaded body 280.

The inserting portion 294 of the left-handed internally-threaded body 290 that has approached the right-handed internally-threaded body 280 is composed so that the left-handed internally-threaded body 290 is further rotated counter-clockwise while holding the right-handed internally-threaded body 280 motionless, the tapered portion 297 of the inserting portion 294 is slid along the tapered portion 287 of the receiving portion 284, the inserting portion 294 is inserted into the receiving portion 284 while being deflected, and the locking portion 296 is engaged with the engagement receiving portion 286 of the receiving portion 284 to prevent the inserting portion 294 from coming out as shown in FIG. 16.

Similar to the case of an internally-threaded body composed by rotatable locking of a pair of the right-handed internally-threaded body 180 and the left-handed internally-threaded body 190, the right-handed internally-threaded body 280 and the left-handed internally-threaded body 290 can naturally be coupled prior to screwing onto the duplex threaded body 1 so that they are mutually allowed to rotate while also being prevented from separating.

The coupling means 104 and the coupling means 204 explained above are based on a locking mechanism in which coupling of a right-handed internally-threaded body and a left-handed internally-threaded body on the central axis of a duplex threaded body demonstrates a locking effect. In another locking mechanism, coupling means can be composed that has a removable locking mechanism in which, although a right-handed internally-threaded body and a left-handed internally-threaded body can be mutually removed when in a state of not being screwed onto a duplex threaded body, when screwed onto the duplex threaded body, the left-handed internally-threaded body and the right-handed internally-threaded body cannot be separated even though they are able to mutually rotate. The following provides a detailed explanation of an internally-threaded body employing such a configuration with reference to the drawings.

Coupling means 304 of embodiments shown in FIGS. 17 to 19 is composed of a receiving portion 384 formed in a right-handed internally-threaded body 380 and an inserting portion 394 formed in a left-handed internally-threaded body 390.

Figure 17A:
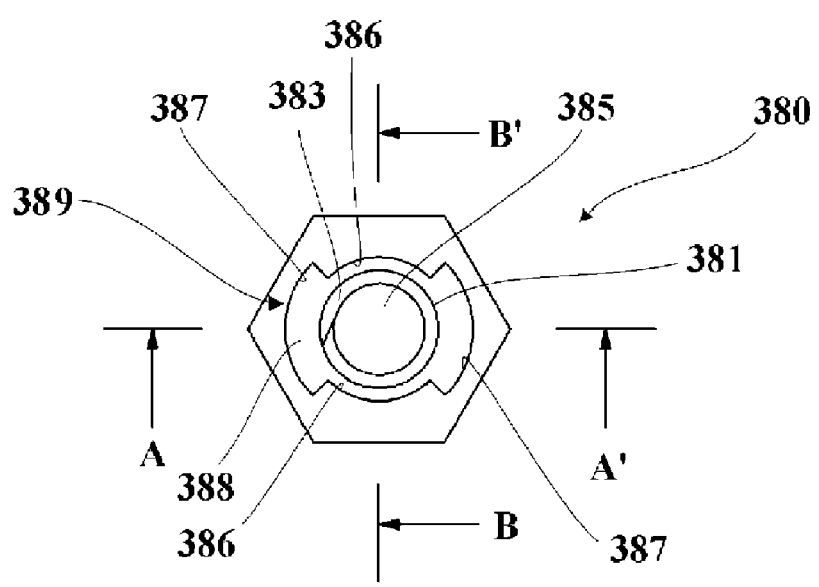
FIG. 17A is an overhead view of right-handed internally-threaded body in a right-handed internally-threaded body and left-handed internally-threaded body pair provided with coupling means in which rotational coupling is achieved by a different retaining mechanism.
Figure 17B:
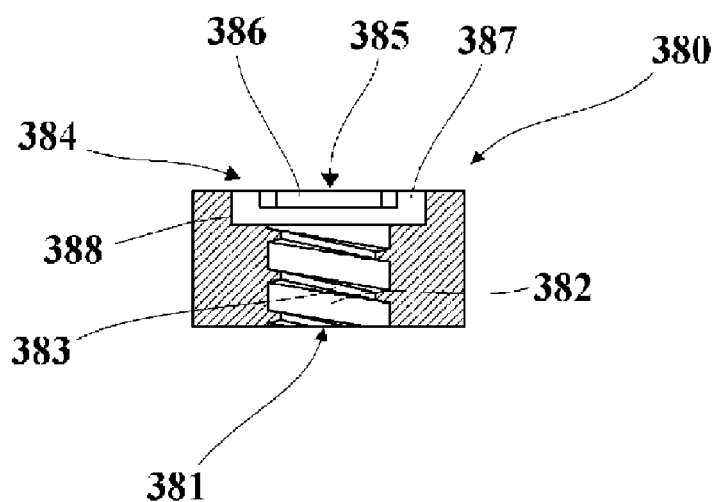
FIG. 17B is a cross-sectional view showing a cross-section taken along line A-A' of FIG. 17A.
Figure 17C:
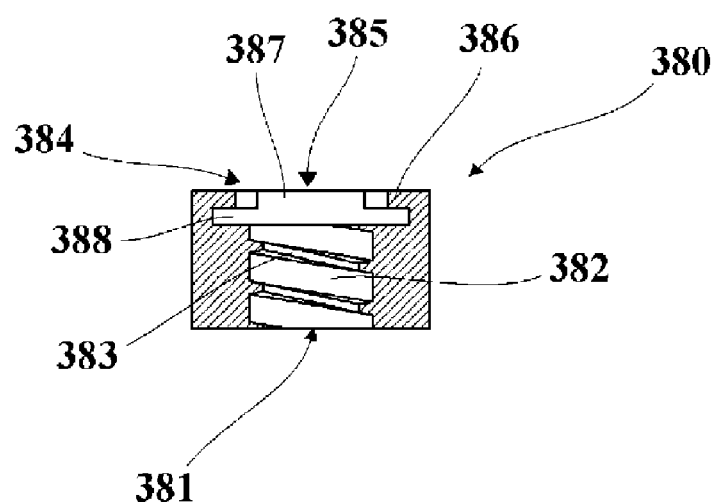
FIG. 17C is a cross-sectional view showing a cross-sectional taken along line B-B.

The right-handed internally-threaded body 380 is composed of a solid material, and as shown in FIG. 17A, the outer shape thereof has a roughly hexagonal tubular shape, and as shown in FIGS. 17B and 17C, has a roughly circular through hole 385 penetrating in the axial direction thereof in a central portion. A suitably shaped tapered portion is formed facing from the lower end towards the upper end of the through hole 385, and a threaded hole 381, which is composed of a clockwise spiral groove 382 and a clockwise spiral thread 383, is formed on the inner circumferential surface of the through hole 385 to an intermediate receiving position formed in the left-handed internally-threaded body so as to be able to be screwed onto the right-handed thread 20 of the duplex threaded body 1.

The receiving portion 384 is formed from the upper end of this threaded hole 381 to the upper end of the through hole 385. In the receiving portion 384, a large diameter space 388, which spreads in the form of a large diameter circle from the inner circumferential surface of the through hole 385, and engagement receiving portions 386, which are formed by a prescribed portion of the upper portion of this large diameter space 388 being formed to a small diameter and cover a portion of the large diameter space 388, are formed at a suitable height of the portion directly above the through hole 381.

In other words, a large diameter notch 387, which respectively spreads outward in the radial direction in the shape of a fan at site on the diameter and at a fixed thickness, and a non-circular opening 389 of a prescribed surface area, which is composed of the two engagement receiving portions 386 opened to a small diameter, are formed in an end surface of the receiving portion 384, and the receiving portion 384 is composed roughly in the manner of a keyhole by having the large diameter space 388 spread out in a circular shape from the portion immediately below the opening 389 to the upper portion of the threaded hole 381. Naturally, the planar shape of the opening 389 formed in the end surface of the receiving portion 384 is not limited thereto.

Figure 18A:
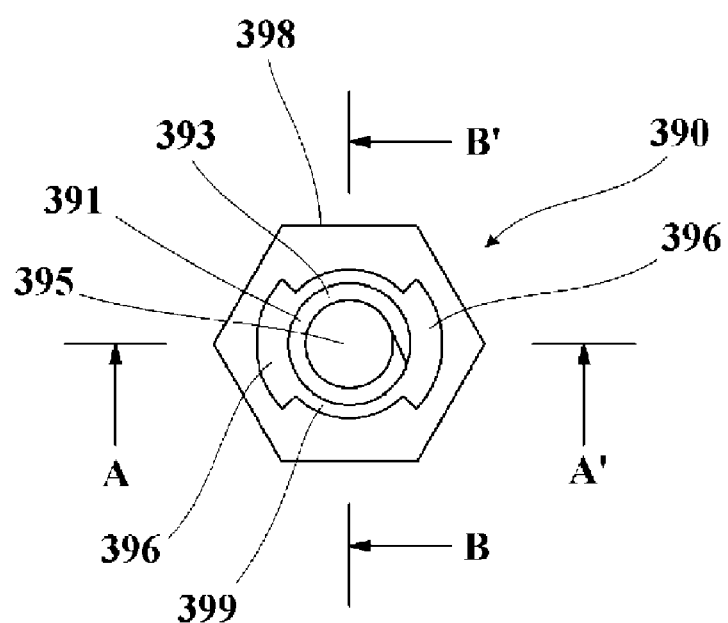
FIG. 18A is an overhead view of a left-handed internally-threaded body that forms a pair with the right-handed internally-threaded body of FIG. 17.
Figure 18B:
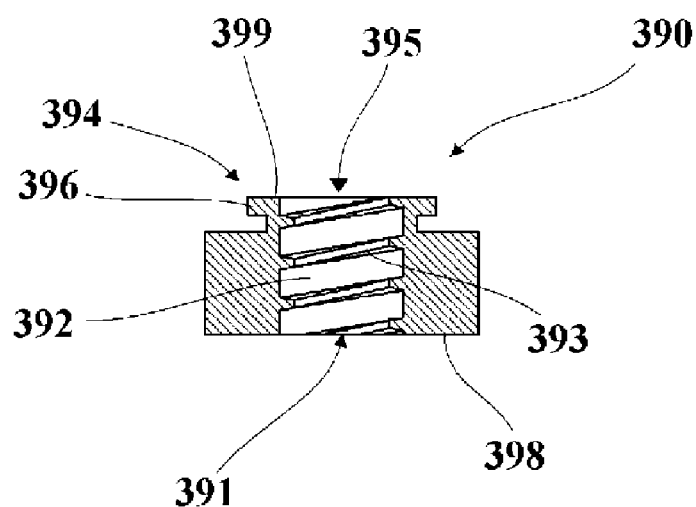
FIG. 18B is a cross-sectional view showing a cross-section taken along line A-A' of FIG. 18A.
Figure 18C:
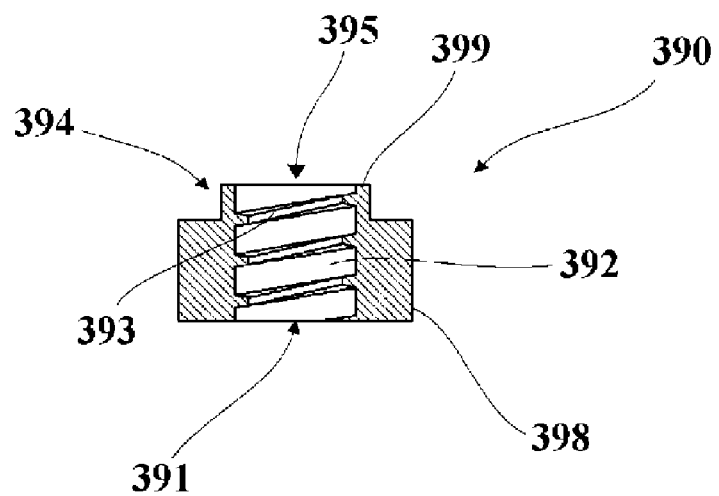
FIG. 18C is a cross-sectional view showing a cross-section taken along line B-B' of FIG. 18A.

The left-handed internally-threaded body 390 of the present embodiment is composed of a solid material, and as shown in FIG. 18A, has a hexagonal tubular portion 398, which extends to a suitable height in the axial direction, and an inserting portion 394, which is formed on the upper end of this hexagonal tubular portion 398. As shown in FIGS. 18B and 18C, the central portion of the left-handed internally-threaded body 390 has a roughly circular through hole 395 penetrating in the axial direction thereof. A threaded hole 391, which is composed by a counter-clockwise spiral groove 392 and a counter-clockwise spiral thread 393 so as to be able to screw onto the left-handed thread 30 of the duplex threaded body 1, is formed on the inner circumferential surface of the through hole 395.

The inserting portion 394 has an upright portion 399 rising roughly in the shape of a cylinder in which the threaded hole 391 of the hexagonal tubular portion 398 is extending on the inner circumferential surface. Large diameter locking portions 396, which respectively spread towards the outside in the radial direction in the shape of a fan at a fixed thickness, are formed at sites on a diameter of the upper portion of the outer circumferential surface of the upright portion 399, the proximal end of the inserting portion 394 has a tubular shape, the distal end is formed to a diameter larger than the proximal end, and the inserting portion 394 is composed roughly in the manner of a key. Naturally, the planar shape of the distal end of the inserting portion 394 is not limited thereto, and for example, may have a shape that spreads to a large diameter in three or more directions centering about a cylindrical portion, the inserting portion 394 is in the form of a key, the receiving portion 384 is in the form of a keyhole, and together with the inserting portion 394 being able to be inserted into and removed from the receiving portion 384, the locking portions 396 are composed to engage with the engagement receiving portions 386 to demonstrate a retaining effect.

Figure 19A:
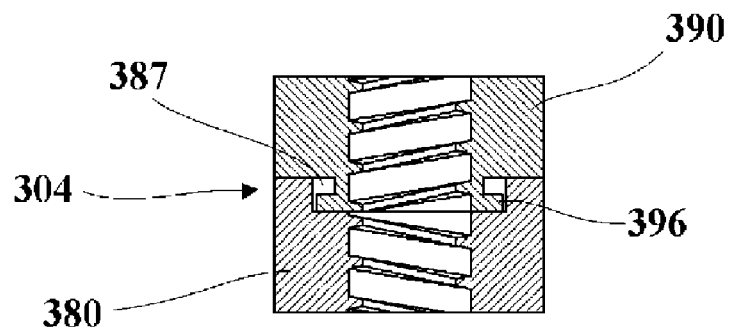
FIG. 19A is a cross-sectional view showing a state in which an inserting portion of the left-handed internally-threaded body of FIG. 18 is inserted into a receiving portion of the right-handed internally-threaded body of FIG. 17 when viewed from the direction of the short axis.
Figure 19B:
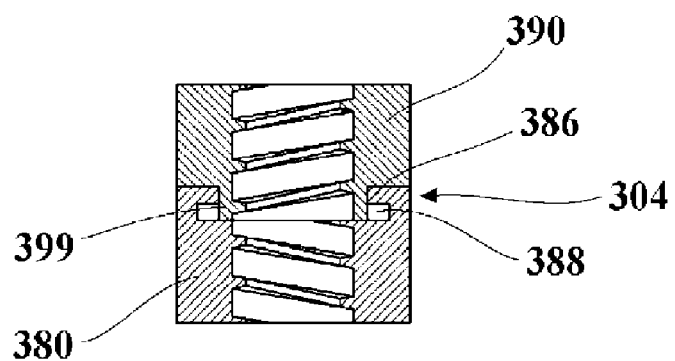
FIG. 19B is a cross-sectional view depicting a cross-section as viewed from the direction of the long axis perpendicular to the viewpoint of FIG. 19A.

In the case the receiving portion 384 formed in the right-handed internally-threaded body 380 composed as explained above is coupled with the inserting portion 394 formed on the left-handed internally-threaded body 390 by engaging therewith, the inserting portion 394 and the receiving portion 384 can be put in a semi-coupled state as shown in FIGS. 19A and 19B prior to screwing onto the duplex threaded body 1 by aligning the position of the locking portions 396 of the inserting portion 394 of the left-handed internally-threaded body 390 with the hole shape of the opening 389 in end surface of the receiving portion 384 of the right-handed internally-threaded body 380 and inserting the inserting portion 394 into the receiving portion 384.

Either the right-handed internally-threaded body 380 or the left-handed internally-threaded body 390 is then first screwed onto the duplex threaded body 1 while in this state. When either internally-threaded body is screwed on, the right-handed internally-threaded body 380 is rotated clockwise at a required angular velocity and screwed onto the duplex threaded body 1 while simultaneously rotating the left-handed internally-threaded body 390 counter-clockwise at a required angular velocity. In the case the right-handed internally-threaded body 380 and the left-handed internally-threaded body 390 are located on the overlapping region 3 of the duplex threaded body 1, they can be fixed in position at an arbitrary position.

Figure 19C:
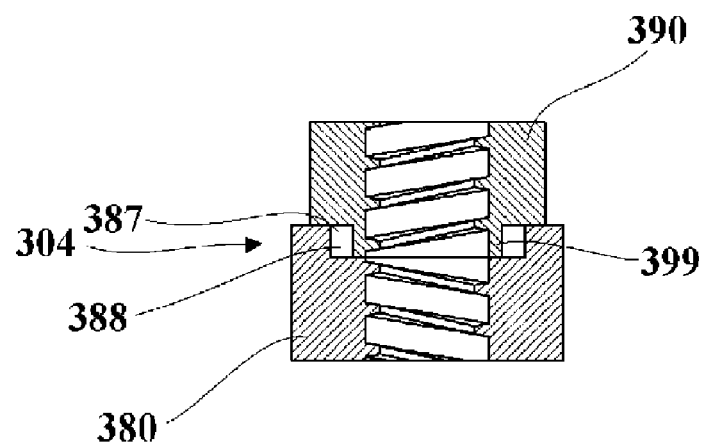
FIG. 19C is a cross-sectional view showing a cross-section of a state in which the inserting portion and the receiving portion are in a positional relationship in which they do not mutually overlap.
Figure 19D:
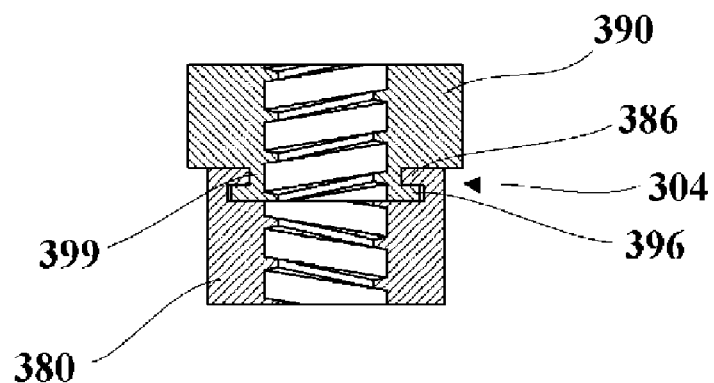
FIG. 19D is a cross-sectional view depicting a cross-sectional as viewed from the direction perpendicular to the viewpoint of FIG. 19C.

In the case the position of the engagement receiving portions 386 of the receiving portion 384 of the right-handed internally-threaded body 380 and the position of the locking portions 396 of the inserting portion 394 of the left-handed internally-threaded body 390 are in the positional relationship shown in FIGS. 19C and 19D, namely in the case the engagement receiving portions 386 and the locking portions 396 are at mutually overlapping positions, although it goes without saying that a retaining effect is also demonstrated on the duplex threaded body 1, in the case the internally-threaded bodies are at a position on the duplex threaded body 1 where they cannot not proceed further in particular, even if the position of the engagement receiving portions 386 and the position of the locking portions 396 are in the positional relationship shown in FIGS. 19A and 19B, namely a positional relationship in which the position of the engagement receiving portions 386 and the position of the locking portions 396 are not mutually overlapping, there is no separation of the right-handed internally-threaded body 380 and the left-handed internally-threaded body 390.

Although the internally-threaded body among the right-handed internally-threaded body 380 and the left-handed internally-threaded body 390 that is to the rear must be rotated in the direction of unscrewing to separate the right-handed internally-threaded body 380 and the left-handed internally-threaded body 390 on the duplex threaded body 1, either the engagement receiving portions 386 or the locking portions 396 end up contacting or engaging with the other when attempted to be rotated in this manner, and rotational force is applied to that the internally-threaded body in the front is moved forward, it cannot move further forward as a result of being stopped in place, thereby preventing the internally-threaded body located to the rear from being further rotated in the direction of unscrewing.

Naturally, in the case a pair of internally-threaded bodies composed of the right-handed internally-threaded body 380 and the left-handed internally-threaded body 390 are unscrewed from the duplex threaded body 1, unscrewing is achieved by rotating the right-handed internally-threaded body 380 counter-clockwise while simultaneously rotating the left-handed internally-threaded body 390 clockwise. In addition, when the pair of internally-threaded bodies are removed from the duplex externally-threaded body 1, the right-handed internally-threaded body 380 and the left-handed internally-threaded body 390 can be mutually separated and disassembled by suitably rotating the position of the engagement receiving portions 386 of the receiving portion 384 of the right-handed internally-threaded body 380 that composes this internally-threaded body and the position of the locking portions 396 of the inserting portion 394 of the left-handed internally-threaded 390 out of alignment.

In addition, internally-threaded bodies in which removable rotatable retaining means is constituted by an engagement receiving portion having a roughly circular planar shape and a locking portion having a roughly circular planar shape are explained below with reference to the drawings.

Figure 21A:
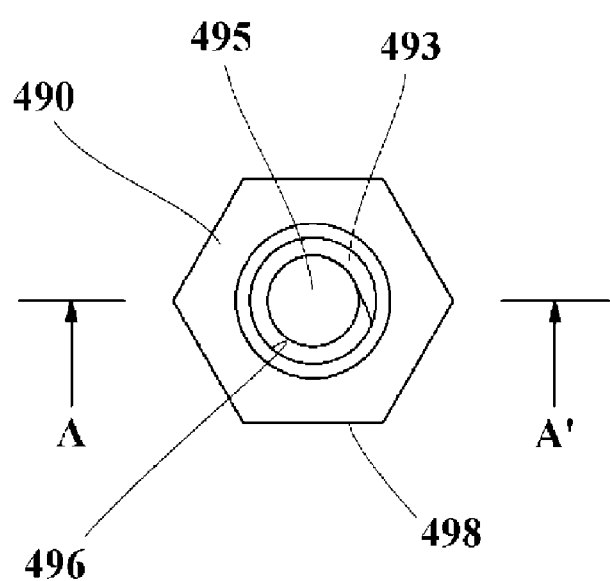
FIG. 21A is an overhead view of a left-handed internally-threaded body that forms a pair with the right-handed internally-threaded body of FIG. 20.
Figure 21B:
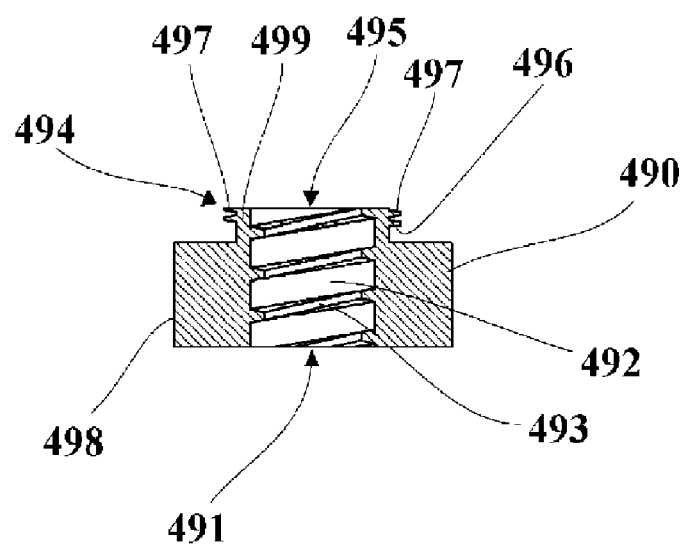
FIG. 21B is a cross-sectional view showing a cross-section taken along line A-A' of FIG. 21A.
Figure 22:
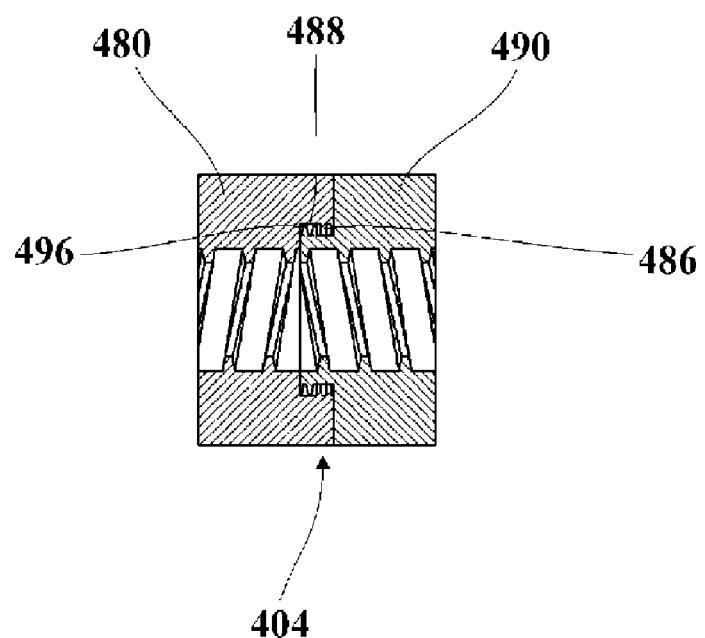
FIG. 22 is a cross-sectional view showing a cross-section of a coupling state between the right-handed internally-threaded body shown in FIG. 20 and the left-handed internally-threaded body shown in FIG. 21.

Coupling means 404 of the embodiments shown in FIGS. 20 to 22 is composed of a receiving portion 484 formed in a right-handed internally-threaded body 480 and an inserting portion 494 formed in a left-handed internally-threaded body 490.

Figure 20A:
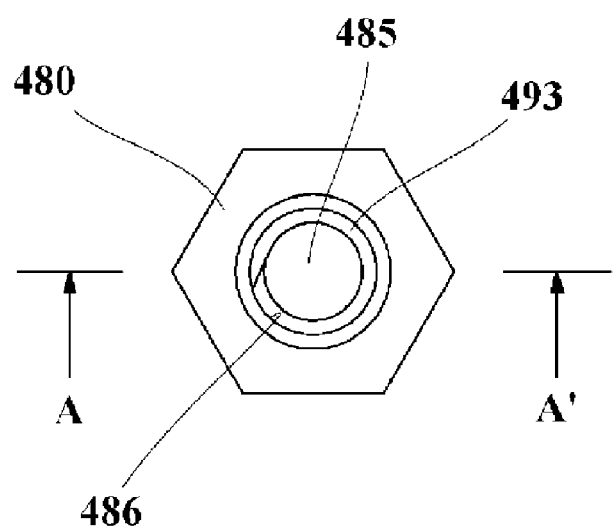
FIG. 20A is an overhead view of a right-handed internally-threaded body in a right-handed internally-threaded body and left-handed internally-threaded body pair provided with coupling means in which rotational coupling is achieved by a different retaining mechanism.
Figure 20B:
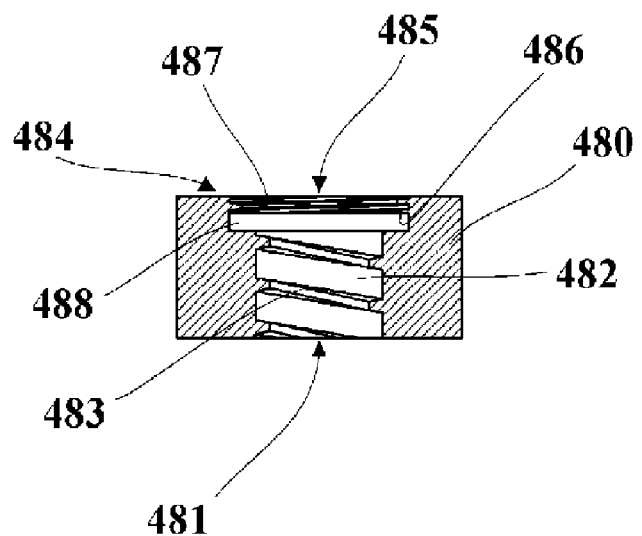
FIG. 20B is a cross-sectional view showing a cross-section taken along line A-A' of FIG. 20A.

The right-handed internally-threaded body 480 is composed of a solid material, and as shown in FIG. 20A, the outer shape thereof has a roughly hexagonal tubular shape, and as shown in FIG. 20B, has a roughly circular through hole 485 penetrating in the axial direction thereof in a central portion. A suitably shaped tapered portion is formed facing from the lower end towards the upper end of the through hole 485, and a threaded hole 481, which is composed of a clockwise spiral groove 482 and a clockwise spiral thread 483, is formed on the inner circumferential surface of the through hole 485 to an intermediate receiving position formed in the left-handed internally-threaded body so as to be able to be screwed onto the right-handed thread 20 of the duplex threaded body 1.

The receiving portion 484 is formed from the upper end of this threaded hole 481 to the upper end of the through hole 485. In the receiving portion 484, a large diameter space 488, which spreads in the form of a large diameter circle from the inner circumferential surface of the through hole 485, and an engagement receiving portion 486, which is formed by a prescribed portion of the upper portion of this large diameter space 488 being formed to a small diameter and cover the entirety of the large diameter space 488, are formed at a suitable height of the portion directly above the through hole 481. A retaining spiral groove 487 having a spiral shape of a pitch that differs from the pitch of the threaded hole 481 formed in the inner circumferential surface of the right-handed internally-threaded body 480, is formed in the inner circumferential surface of this engagement receiving portion 486. Here, although the retaining spiral groove 487 shown in FIG. 20 is set to a counter-clockwise, spiral left-handed thread, it can also be set to a clockwise, spiral right-handed thread, or may be set so that the lead angle of the retaining spiral groove 487 is mutually different from the lead angle of the threaded hole 481 formed in the inner circumferential surface of the right-handed internally-threaded body 480.

The left-handed internally-threaded body 490 of the present embodiment is composed of a solid material, and as shown in FIG. 21A, has a hexagonal tubular portion 498, which extends to a suitable height in the axial direction, and an inserting portion 494, which is formed on the upper end of this hexagonal tubular portion 498. As shown in FIG. 21B, the central portion of the left-handed internally-threaded body 490 has a roughly circular through hole 495 penetrating in the axial direction thereof. A threaded hole 491, which is composed by a counter-clockwise spiral groove 492 and a counter-clockwise spiral thread 493 so as to be able to screw onto the left-handed thread 30 of the duplex threaded body 1, is formed on the inner circumferential surface of the through hole 495.

The inserting portion 494 has an upright portion 499 rising roughly in the shape of a cylinder in which the threaded hole 491 of the hexagonal tubular portion 498 is extending on the inner circumferential surface. A large diameter locking portion 496, which spreads towards the outside in the radial direction, is formed on the upper portion of the outer circumferential surface of the upright portion 499. The locking portion 496 is provided so as to be able to screw onto the retaining spiral groove 487 formed in the engagement receiving portion 486 of the receiving portion 484 of the right-handed internally-threaded body 480, and a spiral retaining spiral thread 497 is formed at a pitch that differs from the pitch of the threaded hole 491 formed in the inner circumferential surface of the left-handed internally-threaded body 490. Here, although the retaining spiral thread 497 shown in FIG. 21 is set to a counter-clockwise, spiral left-handed thread, it can also be set to a clockwise, spiral right-handed thread, or the lead angle of the retaining spiral thread 497 may be set to be mutually different from the lead angle of the threaded hole 491 formed in the inner circumferential surface of the left-handed internally-threaded body 490.

Furthermore, the large diameter space 488 in the receiving portion 484 of the right-handed internally-threaded body 480 is able to precisely house the portion of the retaining spiral thread 497 provided on the distal end of the engaging portion 494 of the left-handed internally-threaded body 490, and when housed, the right-handed internally-threaded body 480 and the left-handed internally-threaded body 490 are composed so as to be able to mutually rotate.

Thus, when screwing the right-handed internally-threaded body 480 and the left-handed internally-threaded body 490 onto the duplex threaded body 1, as shown in FIG. 22, the retaining spiral thread 497 on the end portion of the inserting portion 494 formed on the left-handed internally-threaded body 490 is preliminarily screwed all the way into the retaining spiral groove 487 of the upper half of the receiving portion 484 formed on the right-handed internally-threaded body 480, and the retaining spiral thread 497 is housed in the large diameter space 488, and the right-handed internally-threaded body 480 and the left-handed internally-threaded body 490 are placed in a semi-coupled state while allowing to mutually rotate.

Either the right-handed internally-threaded body 480 or the left-handed internally-threaded body 490 is then first screwed onto the duplex threaded body 1 while in this state. When either internally-threaded body is screwed on, the right-handed internally-threaded body 480 is rotated clockwise at a required angular velocity and screwed onto the duplex threaded body 1 while simultaneously rotating the left-handed internally-threaded body 490 counter-clockwise at a required angular velocity. In the case the right-handed internally-threaded body 480 and the left-handed internally-threaded body 490 are located on the overlapping region 3 of the duplex threaded body 1, they can be fixed in position at an arbitrary position.

When the right-handed internally-threaded body 480 is attempted to be separated from the left-handed internally-threaded body 490 while in the state of being screwed onto the duplex threaded body 1, if the right-handed internally-threaded body 480 is attempted to be regressed by rotating counter-clockwise, it cannot be separated since it attempts to advance since the retaining spiral groove 487 formed in the receiving portion 484 of the right-handed internally-threaded body 480 is a left-handed thread. In addition, when the left-handed internally-threaded body 490 is attempted to be separated form the right-handed internally-threaded body 480 by advancing by rotating counter-clockwise, it ends up stopping and cannot be advanced since the retaining spiral thread 497 formed on the inserting portion 494 of the left-handed internally-threaded body 490 is set to a different pitch than the threaded hole 491, and as a result, the right-handed internally-threaded body 480 and the left-handed internally-threaded body 490 cannot be separated.

Thus, in internally-threaded bodies composed of a pair consisting of the right-handed internally-threaded body 480 and the left-handed internally-threaded body 490 having this coupling means 404, the internally-threaded bodies can be fixed in position without loosening at an arbitrary intermediate position in the state in which they are screwed on at the overlapping region 3 of the duplex threaded body 1.

Naturally, in the case a pair of internally-threaded bodies composed of the right-handed internally-threaded body 480 and the left-handed internally-threaded body 490 are unscrewed from the duplex threaded body 1, unscrewing is achieved by rotating the right-handed internally-threaded body 480 counter-clockwise while simultaneously rotating the left-handed internally-threaded body 490 clockwise. In addition, when the pair of internally-threaded bodies has been removed from the duplex threaded body 1, the right-handed internally-threaded body 480 and the left-handed internally-threaded body 490 can be mutually separated and disassembled by unscrewing the retaining spiral thread 497 of the inserting portion 494 of the left-handed internally-threaded body 490 through the retaining spiral groove 487 of the receiving portion 484 of the right-handed internally-threaded body 480 that composes this internally-threaded body.

As has been explained above, although coupling means for mutually coupling a right-handed internally-threaded body and a left-handed internally-threaded body on a duplex threaded body mutually retained and fastened the right-handed internally-threaded body and the left-handed internally-threaded body in the manner of coupling means 104, coupling means 204, coupling means 304 and coupling means 404, coupling means for coupling in a state in which the internally-threaded bodies are screwed onto the duplex threaded body does not necessary have to by a retaining mechanism.

For example, as shown in FIGS. 23 to 28, rotational coupling of a coupling means may also be by a reverse rotation preventing mechanism that prevents reverse rotation in a prescribed direction of rotation of a right-handed internally-threaded body and a left-handed internally-threaded body on the central axis of a duplex threaded body. The following provides a detailed explanation of examples of coupling means 504 and coupling means 604 that carry out rotational coupling by this reverse rotation preventing mechanism with reference to the drawings.

Figure 23:
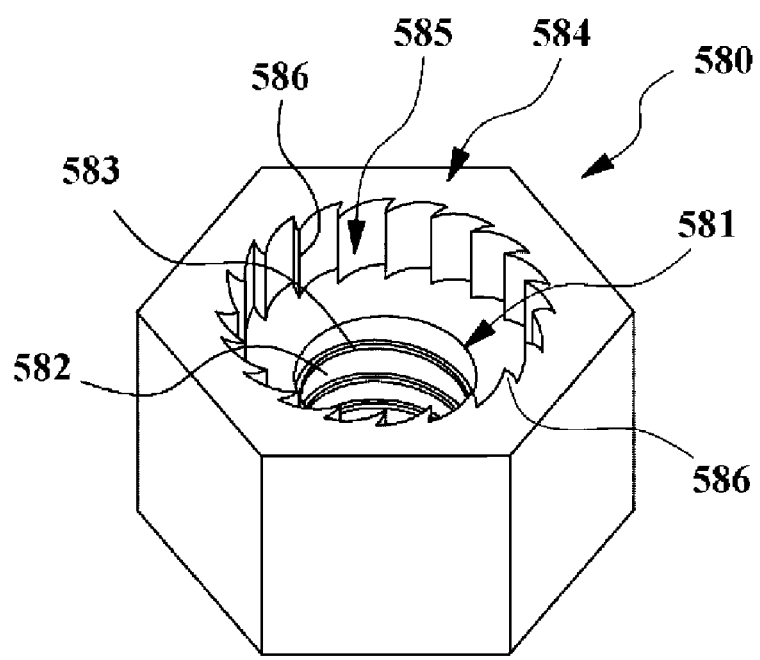
FIG. 23A is a perspective view of a right-handed internally-threaded body in a right-handed internally-threaded body and left-handed internally-threaded body pair provided with coupling means in which rotational coupling is achieved by a reverse rotation preventing mechanism.
FIG. 23B is an overhead view of that right-handed internally-threaded body.
Figure 23:
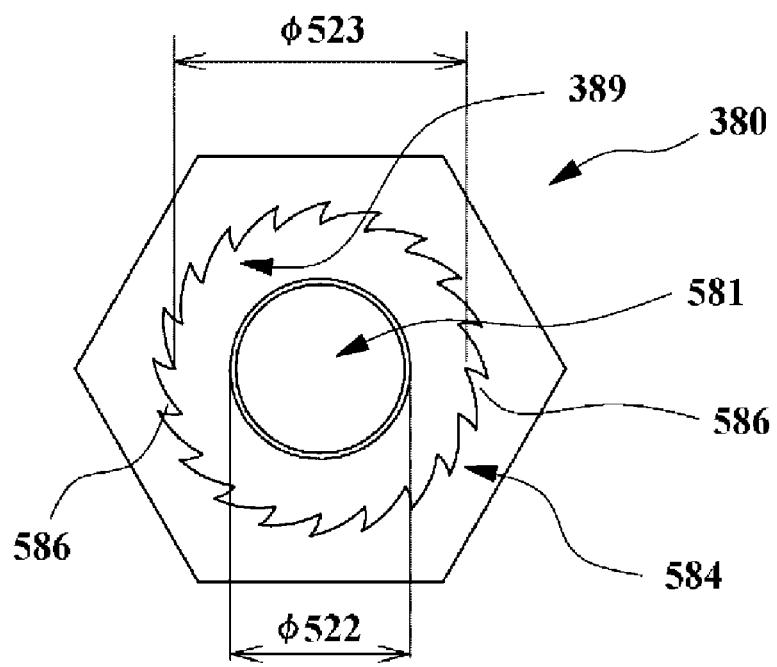
Figure 24A:
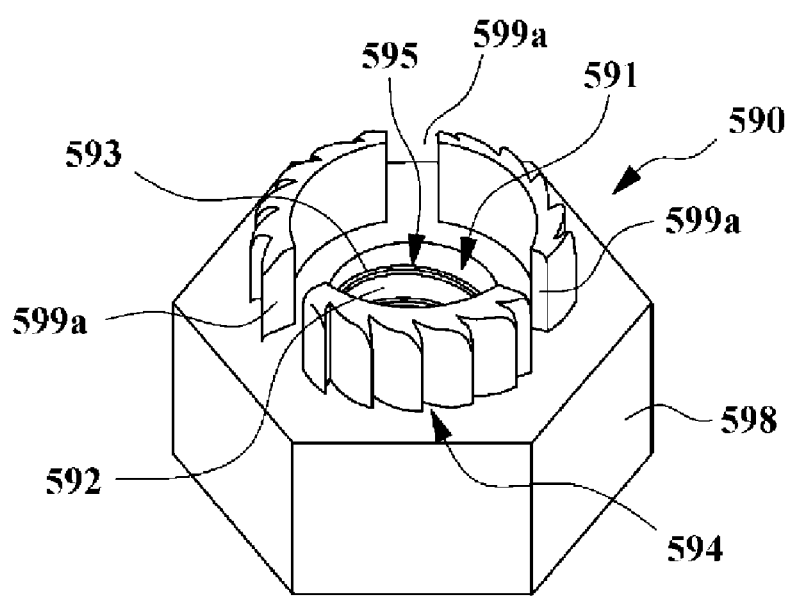
FIG. 24A is a perspective view of a left-handed internally-threaded body that forms a pair with the right-handed internally-threaded body shown in FIG. 23.
Figure 24B:
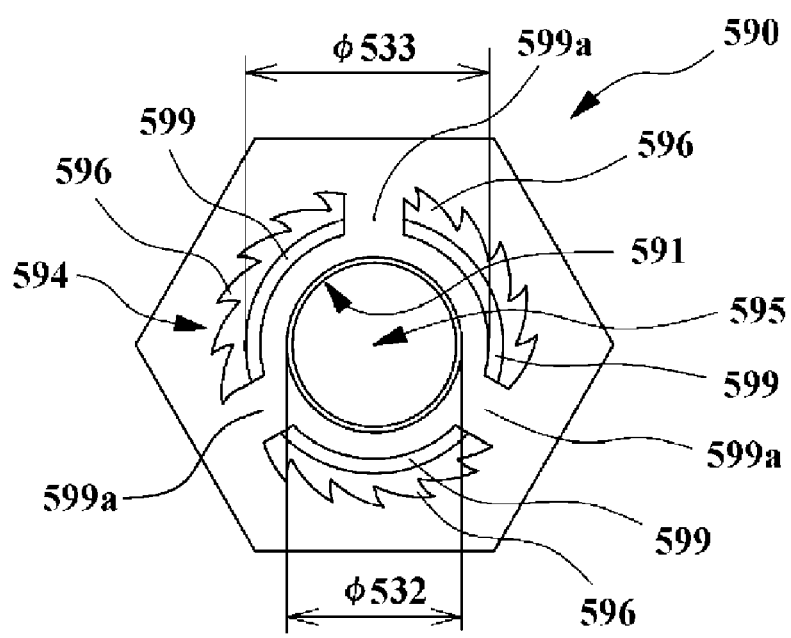
FIG. 24B is an overhead view of that left-handed internally-threaded body.
Figure 25:
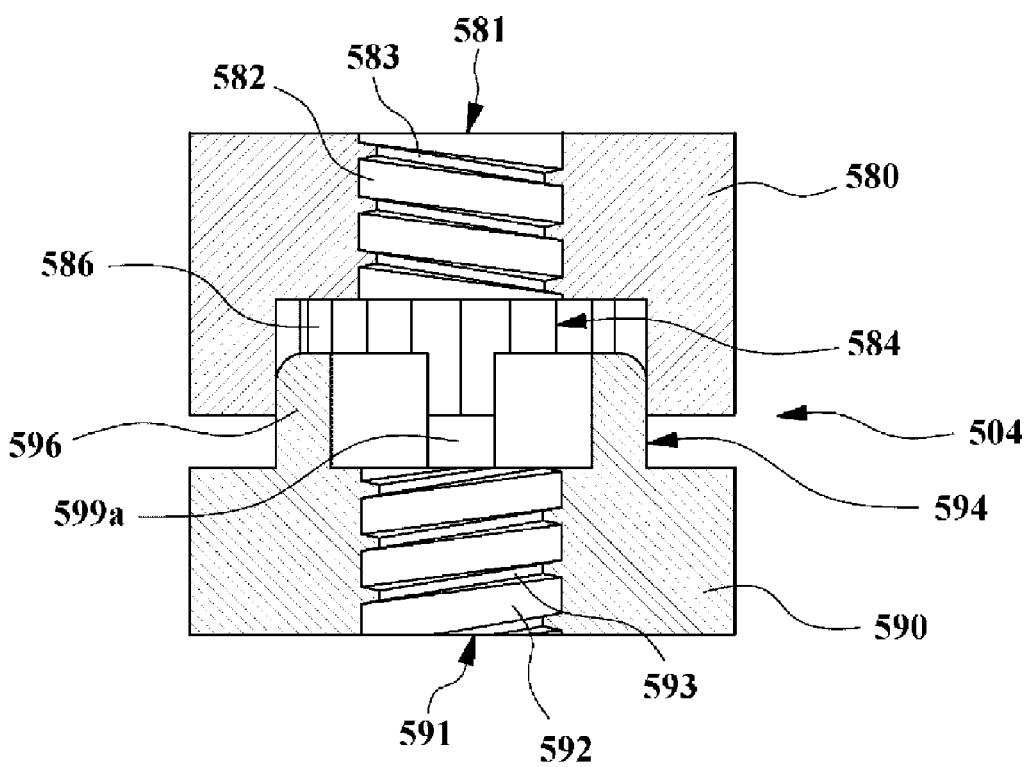
FIG. 25 is a cross-sectional view showing a cross-section of a state of a coupling process in which the right-handed internally-threaded body and left-handed internally-threaded body of FIGS. 23 and 24 are mutually coupled.

The coupling means 504 of the embodiment shown in FIGS. 23 to 25 is composed of a receiving portion 584, which is formed in a right-handed internally-threaded body 580 and an inserting portion 594, which is formed in a left-handed internally-threaded body 590.

The right-handed internally-threaded body 580 is composed of a solid material, and as shown in FIG. 23A, the outer shape thereof has a roughly hexagonal tubular shape, and as shown in FIG. 23B, has a roughly circular through hole 585 penetrating in the axial direction thereof in a central portion. A suitably shaped tapered portion is formed facing from the lower end towards the upper end of the through hole 585, and a threaded hole 581, which is composed of a clockwise spiral groove 582 and a clockwise spiral thread 583, is formed on the inner circumferential surface of the through hole 585 to an intermediate receiving position formed in the left-handed internally-threaded body so as to be able to be screwed onto the right-handed thread 20 of the duplex threaded body 1.

The receiving portion 584 is formed from the upper end of this threaded hole 581 to the upper end of the through hole 585. The receiving portion 584 is roughly in the shape of a hexagonal tube in which the roughly hexagonal tubular shape of the portion of the threaded hole 581 extends in the axial direction, and has a roughly circular serrated hole 589 there within in which an overhead view of a diameter ϕ523 that is larger than a core diameter ϕ522 of the threaded hole 581 is roughly in the form of a circular serrated portion. Namely, a plurality of serrated portions 586, which have a serrated shape and protrude at acute angles towards the inside diagonally in the radial direction, are continuously formed on the inner circumferential surface of the receiving portion 584. Furthermore, although the orientation of the distal ends of the acute angles of these serrated portions 586 is set to be roughly inversely parallel to a tangent (not shown) facing to the right of the corresponding threaded hole 581, the orientation is not limited thereto.

The left-handed internally-threaded body 590 of the present embodiment is composed of a solid material, and as shown in FIG. 24A, has a hexagonal tubular portion 598, which extends to a suitable height in the axial direction, and an inserting portion 594, which is formed on the upper end of this hexagonal tubular portion 598. As shown in FIG. 24B, the central portion of the left-handed internally-threaded body 590 has a roughly circular through hole 595 penetrating in the axial direction thereof. A threaded hole 591, which is composed by a counter-clockwise spiral groove 592 and a counter-clockwise spiral thread 593 so as to be able to screw onto the left-handed thread 30 of the duplex threaded body 1, is formed on the inner circumferential surface of the through hole 595.

The inserting portion 594 is formed on the upper end of the hexagonal tubular portion 598. The inserting portion 594 has an upright portion 599 rising roughly in the shape of circular serrated tube having a circular serrated outer shape at an inner diameter ϕ533 slightly larger than a core diameter ϕ532 of the threaded hole 591 of the hexagonal tubular portion 598. Namely, a plurality of serrated portions 596, having a serrated shape protruding in the form of acute angles towards the outside diagonally in the radial direction, are continuously formed on the outer circumferential surface of the upright portion 599. Furthermore, the orientation of the distal ends of the acute angles of these serrated portions 596 is roughly parallel to a tangent facing to the left of the corresponding threaded hole 591.

This upright portion 599 has three slits 599a at suitable sites formed mutually in parallel at equal intervals from the upper end towards the lower end of the upright portion 599. Naturally, the number of the slits 599a is not necessarily required to be three, but rather may be less than three or more than three, and the intervals between the slits are not required to be equal.

The height from the lower end to the upper end of the upright portion 599 is set to be equal to or less than the depth of the receiving portion 584 of the right-handed internally-threaded body 580. The outside of the upper end of the upright portion 599 has a tapered to rounded shape so as to become thinner moving towards the upper end, and is composed to facilitate insertion into the receiving portion 584 formed in the right-handed internally-threaded body 580.

In the case of rotationally coupling the receiving portion 584 formed in the right-handed internally-threaded body 580 composed in the manner explained above by engaging with the inserting portion 594 formed in the left-handed internally-threaded body 590, the right-handed internally-threaded body 580 is screwed clockwise towards the rear in the direction of advance of the receiving portion 584 to a desired position on the duplex threaded body 1. Next, the left-handed internally-threaded body 590 is screwed on counter-clockwise from the rear of the right-handed internally-threaded body 580 towards the front in the direction of advance of the inserting portion 594 to a position where it couples with the right-handed internally-threaded body 580.

The inserting portion 594 of the left-handed internally-threaded body 590 that has approached the right-handed internally-threaded body 580 is composed so that the left-handed internally-threaded body 590 is further rotated counter-clockwise while holding the right-handed internally-threaded body 580 motionless to contact the serrated portions 586 on the inner circumferential surface of the receiving portion 584, the inserting portion 594 is inserted into the receiving portion 584 while being deflected, and as shown in FIG. 25, the serrated portions 596 on the outer circumferential surface of the inserting portion 594 engage with the serrated portions 586 of the receiving portion 584, and rotation opposite that from the time of insertion is prevented, namely the left-handed internally-threaded body 590 is prevented from rotating clockwise.

In particular, in a state in which a non-fastening member (not shown), which is fastened by the duplex threaded body 1, the right-handed internally-threaded body 580 and the left-handed internally-threaded body 590 of the present embodiment, is located in a state in which it is unable to advance at the front end of the right-handed internally-threaded body 580 and the right-handed internally-threaded body 580 cannot be further rotated clockwise, in the case the left-handed internally-threaded body 590 is coupled while advancing by rotating counter-clockwise while fixing the right-handed internally-threaded body 580 at that position, the serrated portions 586 on the inner circumferential surface of the receiving portion 584 mutually contact the serrated portions 596 on the outer circumferential surface of the inserting portion 594 during the course of engagement, and are more deeply engaged while deflecting the upright portion 599 of the inserting portion 594.

Once the right-handed internally-threaded body 580 and the left-handed internally-threaded body 590 are engaged, the serrated portions 586 on the inner circumferential surface of the receiving portion 584 and the serrated portions 596 on the outer circumferential surface of the inserting portion 594 mutually engage and prevent reverse rotation. In other words, during engagement, although rotation in the direction of mutually approaching is possible, when rotated in the opposite direction of mutual separation, namely that when the left-handed internally-threaded body 590 is attempted to be regressed by rotating clockwise, the serrated portions 596 on the outer circumferential surface of the inserting portion 594 catch on the serrated portions 586 on the inner circumferential surface of the receiving portion 584, and although clockwise rotational force is transmitted to the right-handed internally-threaded body 580, a non-fastening member is present at the front end of the right-handed internally-threaded body 580, and clockwise rotation is inhibited. As a result, in the case the internally-threaded body is screwed onto the duplex threaded body 1 until it stops, clockwise rotation of the left-handed internally-threaded body 590 is prevented and as a result, the right-handed internally-threaded body 580 and the left-handed internally-threaded body 590 cannot be uncoupled or loosened once they are coupled, thereby obtaining a substantial locking effect that does not become structurally loose.

Here, in the coupling means 504 of the present embodiment, although the slits 599a are provided in the upright portion 599 serving as the inserting portion 594, the slits 599a do not necessarily have to be provided on the side of the inserting portion 594 and do not have to be provided in parallel in the axial direction. As shown in FIG. 26, the slits 599a may also be provided on the side of a receiving portion 684, and may be formed perpendicular to the axis. The following provides a detailed explanation of an example of coupling means 604 having a configuration in which such slits 689 are formed perpendicular to the axis on the side of a receiving portion 684.

Figure 27A:
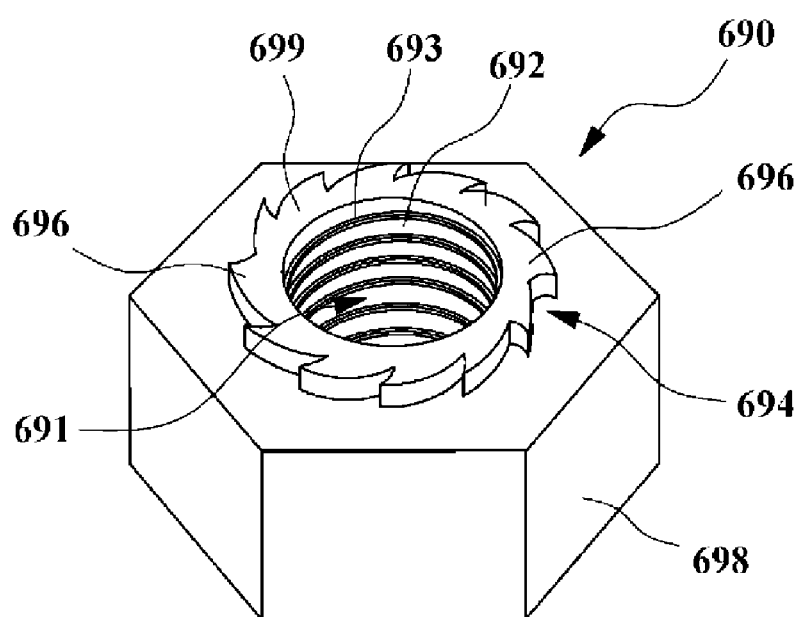
FIG. 27A is a perspective view of a left-handed internally-threaded body that forms a pair with the right-handed internally-threaded body shown in FIG. 26.
Figure 27B:
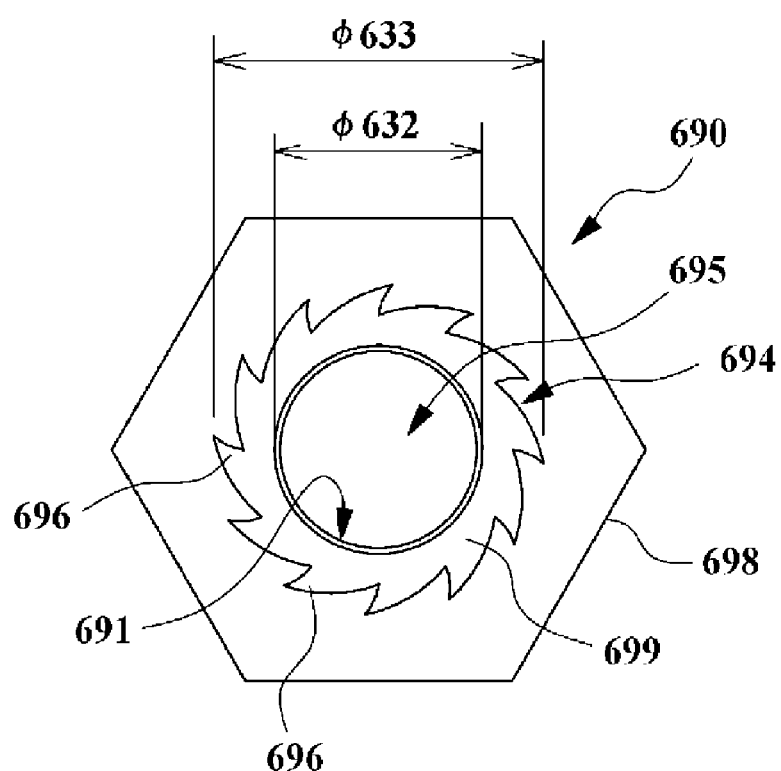
FIG. 27B is an overhead view of that left-handed internally-threaded body.
Figure 28:
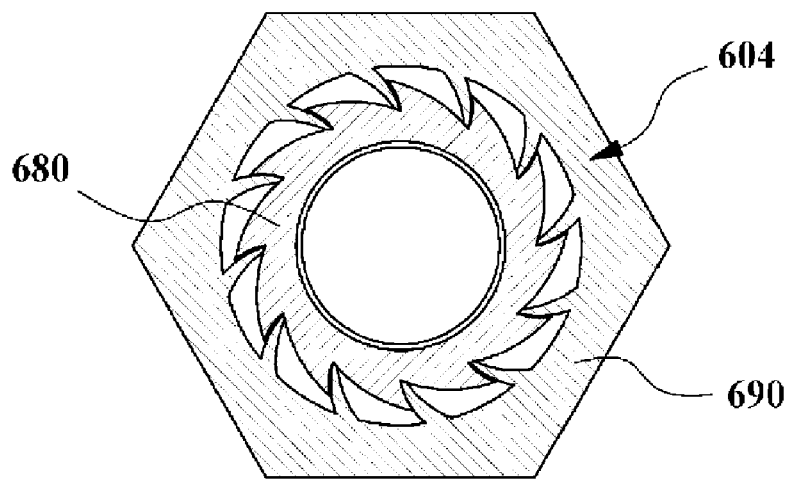
FIG. 28 is a cross-sectional view of a cross-section of a coupling means portion showing a state in which the right-handed internally-threaded body and left-handed internally-threaded body shown in FIGS. 26 and 27 are mutually coupled.

The coupling means 604 of the embodiment shown in FIGS. 26 to 28 is composed of a receiving portion 684, which is formed in a right-handed internally-threaded body 680, and an inserting portion 694, which is formed in a left-handed internally-threaded body 690.

Figure 26A:
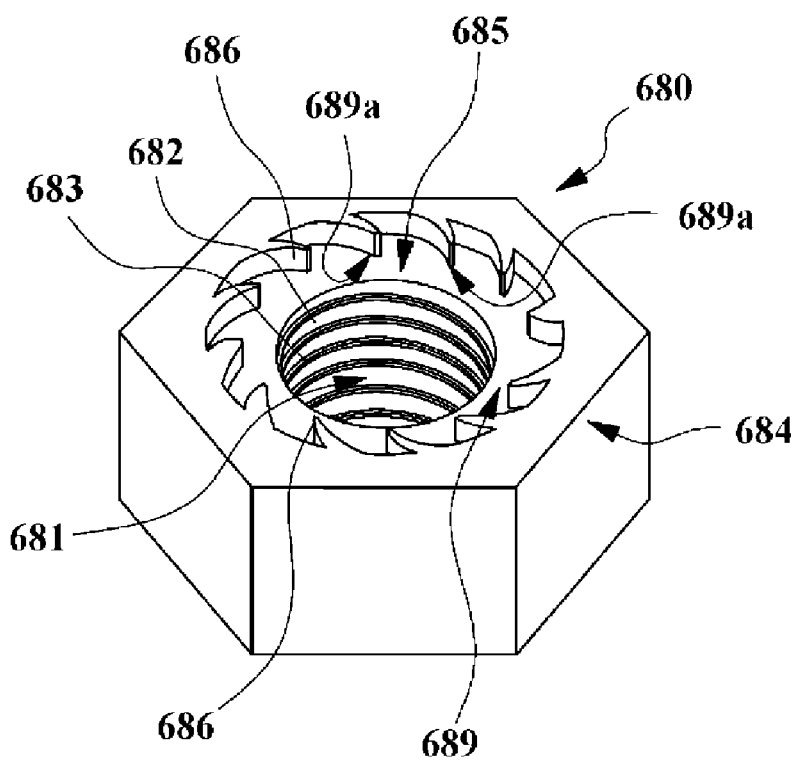
FIG. 26A is a perspective view of a right-handed internally-threaded body in a right-handed internally-threaded body and left-handed internally-threaded body pair provided with different coupling means in which rotational coupling is achieved by a reverse rotation preventing mechanism.
Figure 26B:
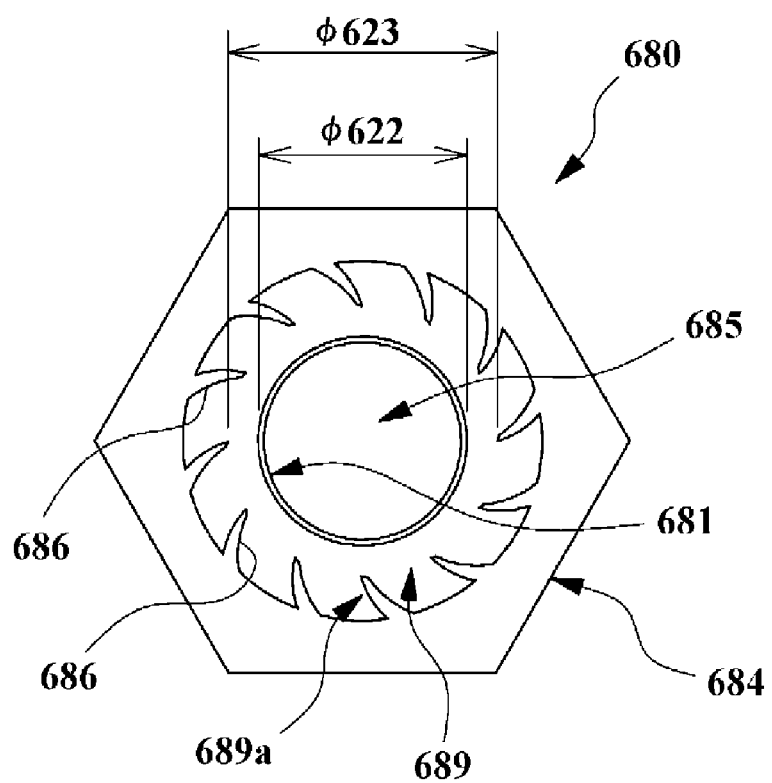
FIG. 26B is an overhead view of that right-handed internally-threaded body.

The right-handed internally-threaded body 680 is composed of a solid material, and as shown in FIG. 26A, the outer shape thereof has a roughly hexagonal tubular shape, and as shown in FIG. 26B, has a roughly circular through hole 685 penetrating in the axial direction thereof in a central portion. A suitably shaped tapered portion is formed facing from the lower end towards the upper end of the through hole 685, and a threaded hole 681, which is composed of a clockwise spiral groove 682 and a clockwise spiral thread 683, is formed on the inner circumferential surface of the through hole 685 to an intermediate receiving position formed in the left-handed internally-threaded body so as to be able to be screwed onto the right-handed thread 20 of the duplex threaded body 1.

The receiving portion 684 is formed from the upper end of this threaded hole 681 to the upper end of the through hole 685. The receiving portion 684 is roughly in the shape of a hexagonal tube in which the roughly hexagonal tubular shape of the portion of the threaded hole 681 extends in the axial direction, and has a roughly circular serrated hole 689 there within in which an overhead view of a diameter ϕ623 that is larger than a core diameter ϕ622 of the threaded hole 681 is roughly in the form of a circular serrated portion. Namely, a plurality of serrated portions 686, which have a serrated shape and protrude at acute angles towards the inside diagonally in the radial direction, are continuously formed on the inner circumferential surface of the receiving portion 684. Furthermore, although the orientation of the distal ends of the acute angles of these serrated portions 686 is set to be roughly inversely parallel to a tangent (not shown) facing to the right of the corresponding threaded hole 681, the orientation is not limited thereto.

The serrated portions 686 are composed such that slits 689*a* perpendicular to the axis are formed on a lower end from distal ends roughly in the shape of acute angles to a proximal end connected to the inner circumferential surface of the receiving portion 684, and are composed so that each serrated portion 686 deflects elastically.

The left-handed internally-threaded body 690 is composed of a solid material, and as shown in FIG. 27A, has a hexagonal tubular portion 698, which extends to a suitable height in the axial direction, and an inserting portion 694, which is formed on the upper end of this hexagonal tubular portion 698. As shown in FIG. 27B, the central portion of the left-handed internally-threaded body 690 has a roughly circular through hole 695 penetrating in the axial direction thereof. A threaded hole 691, which is composed by a counter-clockwise spiral groove 692 and a counter-clockwise spiral thread 693 so as to be able to screw onto the left-handed thread 30 of the duplex threaded body 1, is formed on the inner circumferential surface of the through hole 695.

The inserting portion 694 is formed on the upper end of the hexagonal tubular portion 698. The inserting portion 694 has an upright portion 699 rising roughly in the shape of circular serrated tube having a circular serrated outer shape at an inner diameter ϕ633 slightly larger than a core diameter ϕ632 of the threaded hole 691 of the hexagonal tubular portion 698. Namely, a plurality of serrated portions 696, having a serrated shape protruding in the form of acute angles towards the outside diagonally in the radial direction, are continuously formed on the outer circumferential surface of the upright portion 699. Furthermore, the orientation of the distal ends of the acute angles of these serrated portions 696 is roughly parallel to a tangent facing to the left of the corresponding threaded hole 691.

The height of the upright portion 699 from the lower end to the upper end is set to be equal to or less than the depth of the receiving portion 684 of the right-handed internally-threaded body 680.

In the case of rotationally coupling the receiving portion 684 formed in the right-handed internally-threaded body 680 composed in the manner explained above by engaging with the inserting portion 694 formed in the left-handed internally-threaded body 690, the right-handed internally-threaded body 680 is screwed clockwise towards the rear in the direction of advance of the receiving portion 684 to a desired position on the duplex threaded body 1. Next, the left-handed internally-threaded body 690 is screwed on counter-clockwise from the rear of the right-handed internally-threaded body 680 towards the front in the direction of advance of the inserting portion 694 to a position where it couples with the right-handed internally-threaded body 680.

The inserting portion 694 of the left-handed internally-threaded body 690 that has approached the right-handed internally-threaded body 680 is composed so that the left-handed internally-threaded body 690 is further rotated counter-clockwise while holding the right-handed internally-threaded body 680 motionless to contact the serrated portions 686 on the inner circumferential surface of the receiving portion 684, the inserting portion 694 is inserted into the receiving portion 684 while deflecting the serrated portions 686, and as shown in FIG. 28, the serrated portions 696 on the outer circumferential surface of the inserting portion 694 engage with the serrated portions 686 of the receiving portion 684, and rotation opposite that from the time of insertion is prevented, namely the left-handed internally-threaded body 690 is prevented from rotating clockwise.

In particular, in a state in which a non-fastening member (not shown), which is fastened by the duplex threaded body 1, the right-handed internally-threaded body 680 and the left-handed internally-threaded body 690 of the present embodiment, is located in a state in which it is unable to advance at the front end of the right-handed internally-threaded body 680 and the right-handed internally-threaded body 680 cannot be further rotated clockwise, in the case the left-handed internally-threaded body 690 is coupled while advancing by rotating counter-clockwise while fixing the right-handed internally-threaded body 680 at that position, the serrated portions 686 on the inner circumferential surface of the receiving portion 684 mutually contact the serrated portions 696 on the outer circumferential surface of the inserting portion 694 during the course of engagement, and are more deeply engaged while deflecting the serrated portions 686 of the receiving portion 684.

Once the right-handed internally-threaded body 680 and the left-handed internally-threaded body 690 are engaged, the serrated portions 686 on the inner circumferential surface of the receiving portion 684 and the serrated portions 696 on the outer circumferential surface of the inserting portion 694 mutually engage and prevent reverse rotation. In other words, during engagement, although rotation in the direction of mutually approaching is possible, when rotated in the opposite direction of mutual separation, namely that when the left-handed internally-threaded body 690 is attempted to be regressed by rotating clockwise, the serrated portions 696 on the outer circumferential surface of the inserting portion 694 catch on the serrated portions 686 on the inner circumferential surface of the receiving portion 684, and although clockwise rotational force is transmitted to the right-handed internally-threaded body 680, a non-fastening member is present at the front end of the right-handed internally-threaded body 680, and clockwise rotation is inhibited. As a result, in the case the internally-threaded body is screwed onto the duplex threaded body 1 until it stops, clockwise rotation of the left-handed internally-threaded body 690 is prevented and as a result, the right-handed internally-threaded body 680 and the left-handed internally-threaded body 690 cannot be uncoupled or loosened once they are coupled, thereby obtaining a substantial locking effect that does not become structurally loose.

Figure 29:
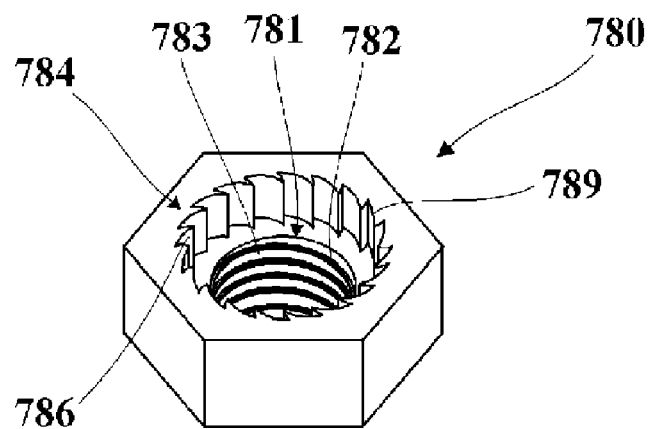
FIG. 29A is a perspective view of a right-handed internally-threaded body in a right-handed internally-threaded body and left-handed internally-threaded body pair provided with different coupling means in which rotational coupling is achieved by a reverse rotation preventing mechanism.
FIG. 29B is an overhead view of that right-handed internally-threaded body.
Figure 29:
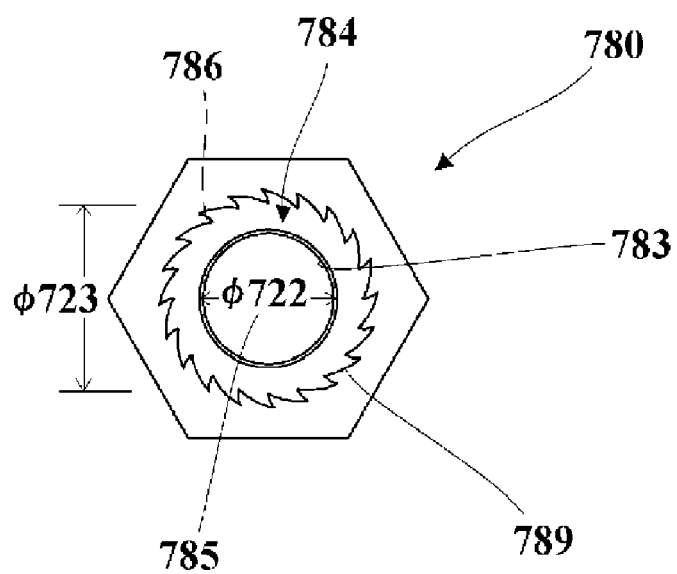
Figure 30A:
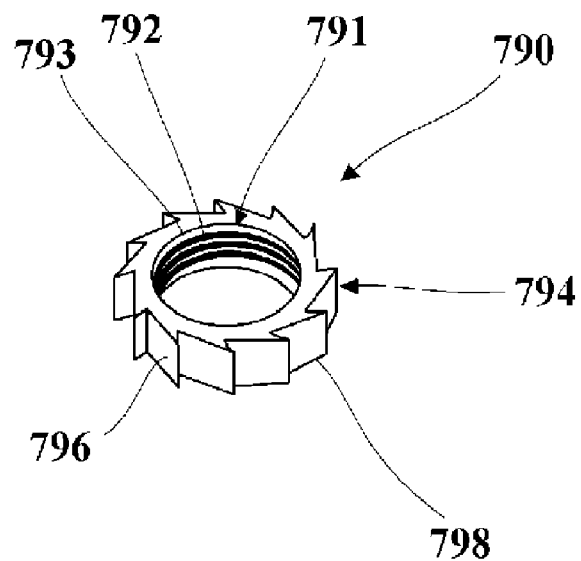
FIG. 30A is a perspective view of a left-handed internally-threaded body that forms a pair with the right-handed internally-threaded body shown in FIG. 29.
Figure 30B:
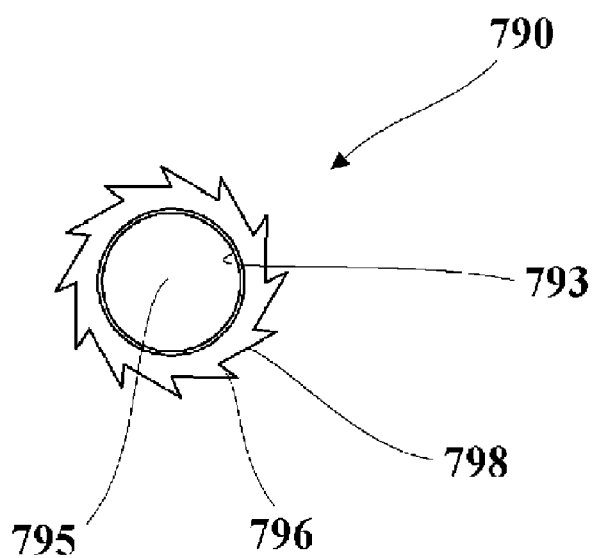
FIG. 30B is an overhead view of that left-handed internally-threaded body.
Figure 31:
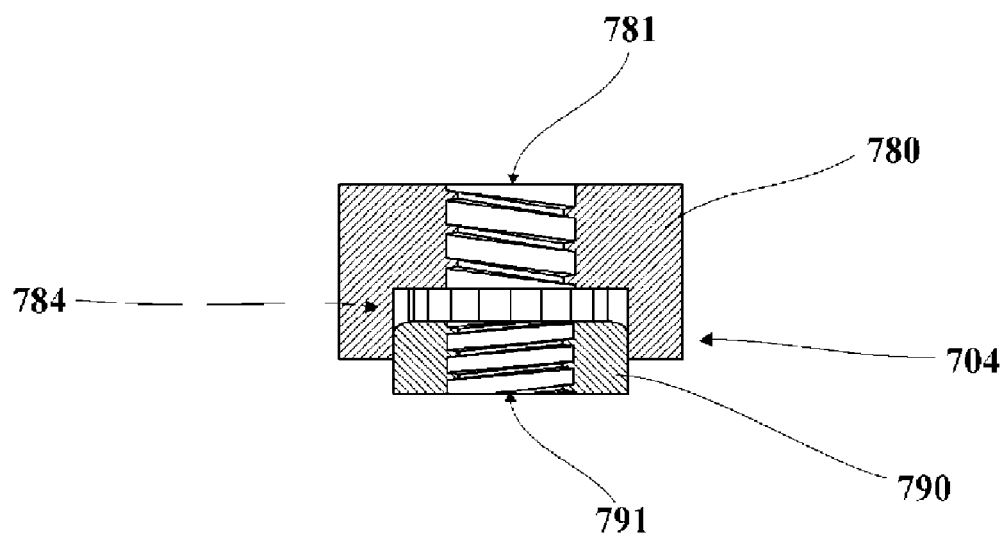
FIG. 31 is a cross-sectional view showing a cross-section of a state in which the right-handed internally-threaded body and left-handed internally-threaded body shown in FIGS. 29 and 30 are mutually coupled.

The coupling means 704 of the embodiment shown in FIGS. 29 to 31 forms serrated portions in the form of serrations on the outer circumference of either a right-handed internally-threaded body or left-handed internally-threaded body, forms a receiving portion having serrated portions on the inner circumferential surface on the end in the axial direction of the other internally-threaded body, and is able to employ a configuration that couples the former and the latter by inserting the former into the latter while screwing onto the duplex threaded body 1 in the manner of an encasement.

For example, a right-handed internally-threaded body 780 having a configuration as described above is composed of a solid material, and as shown in FIG. 29A, the outer shape thereof has a roughly hexagonal tubular shape, and as shown in FIG. 29B, has a roughly circular through hole 785 penetrating in the axial direction thereof in a central portion. A suitably shaped tapered portion is formed facing from the lower end towards the upper end of the through hole 785, and a threaded hole 781, which is composed of a clockwise spiral groove 782 and a clockwise spiral thread 783, is formed on the inner circumferential surface of the through hole 785 to an intermediate receiving position formed in the left-handed internally-threaded body so as to be able to be screwed onto the right-handed thread 20 of the duplex threaded body 1.

A receiving portion 784 is formed from the upper end of this threaded hole 781 to the upper end of the through hole 785. The receiving portion 784 is roughly in the shape of a hexagonal tube in which the roughly hexagonal tubular shape of the portion of the threaded hole 781 extends in the axial direction, and has a roughly circular serrated hole 789 there within in which an overhead view of a diameter ϕ723 that is larger than a core diameter ϕ722 of the threaded hole 781 is roughly in the form of a circular serrated portion. Namely, a plurality of serrated portions 786, which have a serrated shape and protrude at acute angles towards the inside diagonally in the radial direction, are continuously formed on the inner circumferential surface of the receiving portion 784. Furthermore, although the orientation of the distal ends of the acute angles of these serrated portions 786 is set to be roughly inversely parallel to a tangent (not shown) facing to the right of the corresponding threaded hole 781, the orientation is not limited thereto.

A left-handed internally-threaded body 790 is composed of a solid material, and as shown in FIG. 30A, has a round serrated tubular portion 798, which extends to a suitable height in the axial direction, and this round serrated tubular portion 798 itself is composed to fulfill the role of an inserting portion 794. As shown in FIG. 30B, the central portion of the left-handed internally-threaded body 790 has a roughly circular through hole 795 penetrating in the axial direction thereof. A threaded hole 791, which is composed by a counter-clockwise spiral groove 792 and a counter-clockwise spiral thread 793 so as to be able to screw onto the left-handed thread 30 of the duplex threaded body 1, is formed on the inner surface of the through hole 795.

The outer circumference of the round serrated tubular portion 798 is formed as the inserting portion 794, and a plurality of serrated portions 796, having a serrated shape protruding roughly in the form of acute angles towards the outside diagonally in the radial direction having an outer shape in the form of a circular serrated shape, are formed continuously thereon. Furthermore, although the orientation of the distal ends of the roughly acute angles of these serrated portions 796 is set to be roughly parallel to a tangent facing to the left of the corresponding threaded hole 791, the orientation is not limited thereto.

The height from the lower end to the upper end of this round serrated tubular portion 798 is set to about the depth of the receiving portion 784 of the right-handed internally-threaded body 780.

In the case of rotationally coupling the receiving portion 784 formed in the right-handed internally-threaded body 780 composed in the manner explained above by engaging with the inserting portion 794 formed as the outer shape of the left-handed internally-threaded body 790, for example, a so-called spring washer (not shown) is preliminarily placed on the duplex threaded body 1, and the left-handed internally-threaded body is screwed onto the duplex threaded body 1 from the rear thereof until it stops. At this time, the preliminarily placed spring washer is preferably compressed by the left-handed internally-threaded body 790 so that an urging force acts on the left-handed internally-threaded body 790.

Next, the right-handed internally-threaded body 780 is screwed clockwise onto the duplex threaded body 1 with the receiving portion 784 thereof facing forward in the direction of advance, the left-handed internally-threaded body 790 is inserted into the receiving portion 784 from the rear side of the left-handed internally-threaded body 790, and the right-handed internally-threaded body 780 and the left-handed internally-threaded body 790 are screwed on to the position where they join.

At this time, the receiving portion 784 of the right-handed internally-threaded body 780 that has approached the left-handed internally-threaded body 790 is composed so as to receive the left-handed internally-threaded body 790 while deflecting the serrated portions 796 as a result of the serrated portions 786 contacting the serrated portions 796 while holding the left-handed internally-threaded body 790 motionless, and the serrated portions 786 engage with the serrated portions 796 to prevent rotation opposite that from the time of insertion, namely to prevent the right-handed internally-threaded body 780 from rotating counter-clockwise as shown in FIG. 31. As a result, in the case of the internally-threaded body has been screwed onto the duplex threaded body 1 until it stops, the right-handed internally-threaded body 780 is prevented from rotating counter-clockwise, and as a result, once the right-handed internally-threaded body 780 and the left-handed internally-threaded body 790 have been coupled, the right-handed internally-threaded body 780 and the left-handed internally-threaded body 790 cannot be uncoupled or loosened, thereby obtaining a substantial locking effect that does not become structurally loose.

Furthermore, in the case of employing the reverse rotation preventing means 704 in the form of an encasement in this manner, setting the thread pitch of the internally-threaded body 790 on the side of the encasement housed in the receiving portion 784 to be narrower than the thread pitch of the internally-threaded body on the side having the receiving portion 784, and making the thread pitch of either the right-handed thread 20 or the left-handed thread 30 of the duplex threaded body 1 narrower or combining the use of a spring washer and the like in correspondence therewith, are preferable in terms reducing positional shifts caused by return rotation and or return movement on the encasement side during coupling.

A pair of internally-threaded bodies composed of a right-handed internally-threaded body and a left-handed internally-threaded body provided with a reverse rotation preventing coupling means in the manner of the coupling means 504, coupling means 604 and coupling means 704 employing a reverse rotation preventing mechanism as previously explained is composed so that the right-handed internally-threaded body and the left-handed internally-threaded body are coupled as a result of mutual meshing by serrated gear-like serrations having teeth of a serrated shape protruding in a direction roughly perpendicular to respective axial directions on the end surface of the internally-threaded bodies or the outer circumferential surface of an inserting portion extending in the axial direction and on the inner circumferential surface of a receiving portion. However, the right-handed internally-threaded body and the left-handed internally-threaded body can also be mutually rotationally coupled using teeth or irregularities formed so as to have projections in the axial direction of the internally-threaded bodies as reverse rotation preventing coupling means. The following provides a detailed explanation of an internally-threaded body having such a coupling means with reference to the drawings.

Figure 33A:
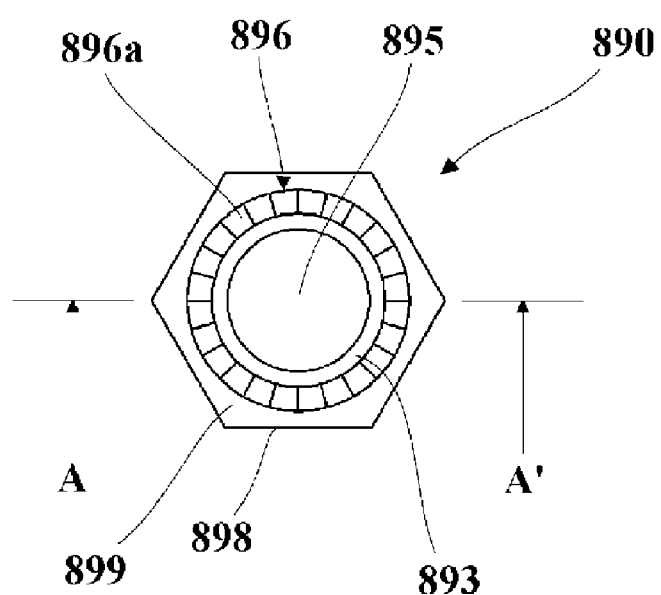
FIG. 33A is an overhead view of a left-handed internally-threaded body that forms a pair with the right-handed internally-threaded body shown in FIG. 32.
Figure 33B:
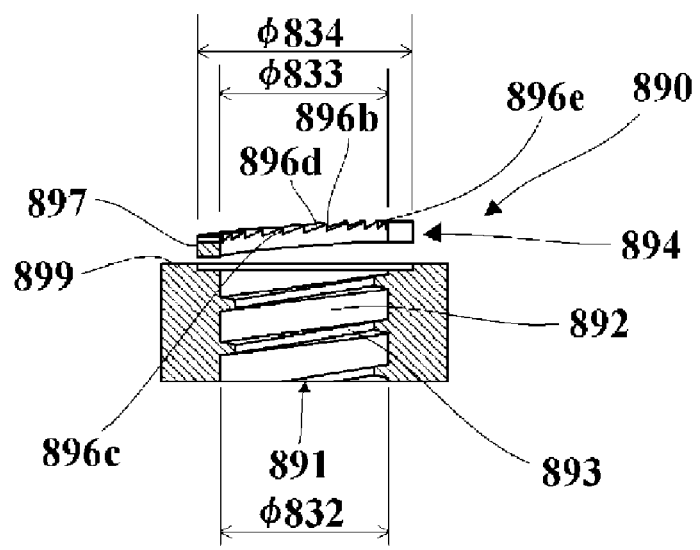
FIG. 33B is a cross-sectional view showing a cross-section taken along line A-A' of FIG. 33A.
Figure 34:
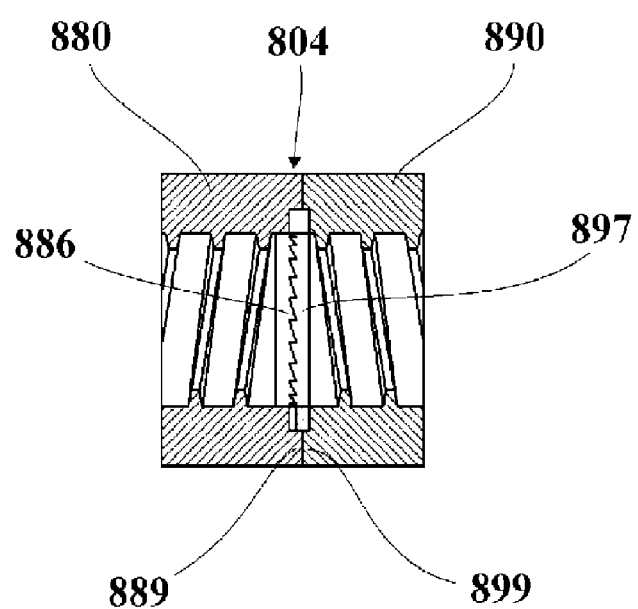
FIG. 34 is a cross-sectional view showing a cross-section of a state in which the right-handed internally-threaded body shown in FIG. 32 and the left-handed internally-threaded body shown in FIG. 33 are mutually coupled.

A coupling means 804 of the embodiment shown in FIGS. 32 to 34 is composed of a receiving portion 884, which is formed in a right-handed internally-threaded body 880, and an inserting portion 894, which is formed in a left-handed internally-threaded body 890.

Figure 32A:
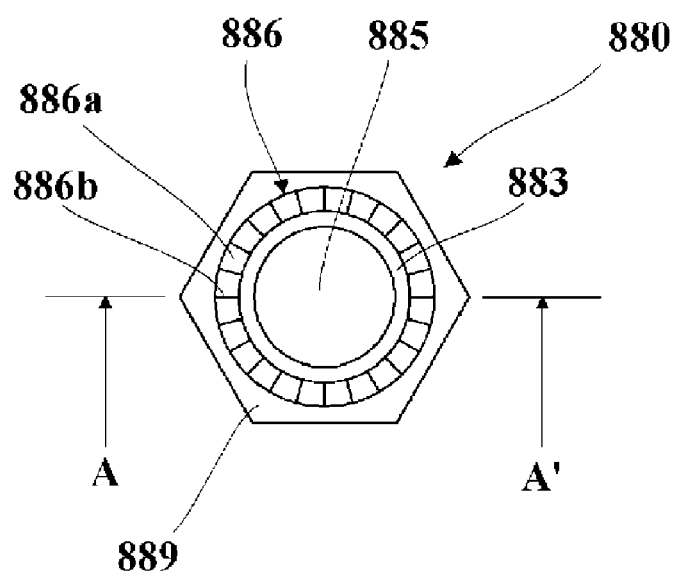
FIG. 32A is an overhead view of a right-handed internally-threaded body in a right-handed internally-threaded body and left-handed internally-threaded body pair provided with different coupling means in which rotational coupling is achieved by a reverse rotation preventing mechanism.
Figure 32B:
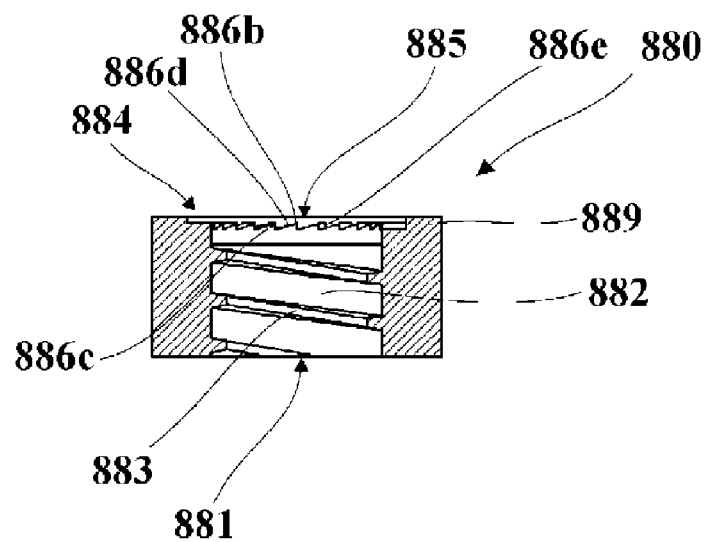
FIG. 32B is a cross-sectional view showing a cross-section taken along line A-A' of FIG. 32A.

The right-handed internally-threaded body 880 is composed of a solid material, and as shown in FIG. 32A, the outer shape thereof has a roughly hexagonal tubular shape, and as shown in FIGS. 32A and 32B, has a roughly circular through hole 885 penetrating in the axial direction thereof in a central portion. A suitably shaped tapered portion is formed facing from the lower end towards the upper end of the through hole 885, and a threaded hole 881, which is composed of a clockwise spiral groove 882 and a clockwise spiral thread 883, is formed on the inner circumferential surface of the through hole 885 to an intermediate receiving position formed in the left-handed internally-threaded body so as to be able to be screwed onto the right-handed thread 20 of the duplex threaded body 1.

The receiving portion 884 is formed from the upper end of this threaded hole 881 to the upper end of the through hole 885. Namely, the receiving portion 884 is formed in an end surface of one end of the right-handed internally-threaded body 880, and is composed of an embankment-shaped embankment portion 889, in which the inside is formed to a circular shape along the peripheral edge of the right-handed internally-threaded body 880 having a roughly hexagonal tubular shape, and a serrated portion 886, which is formed in a ring region on an end surface of the right-handed internally-threaded body 880 to the inside of this embankment portion 889, on the end surface thereof.

The embankment portion 889 has an outer shape of a hexagonal shape when viewed from overhead, the inner shape has a circular shape concentric with this hexagonal shape, and has an embankment shape having a roughly rectangular cross-section rising to a suitable height with respect to the axial direction of the right-handed internally-threaded body 880. The height of the embankment portion 889 is set to be slightly higher than the height of the serrated portion 886 formed on the inside of the embankment portion 889 and having projections in the axial direction.

The serrated portion 886 is formed in a ring region farther to the inside in the radial direction than the embankment portion 889 on one end surface of the right-handed internally-threaded body 880, has projections in the form of irregularities in the axial direction, and is composed by plurality of serrated teeth 886a provided continuously around the circumference thereof. A cross-sectional shape in the axial direction of the teeth 886a that compose the serrated portion 886 has an apex 886b roughly in the shape of an acute angle, the length of two sides that form this apex 886b are set to be mutually different, preferably one side 886c is set to be roughly parallel to the axial direction while the other side is set to be an oblique side 886d, and all of the teeth 886a are formed at the same orientation over the circumference. Furthermore, although the orientation of a vertical plane 886e of the teeth 886a of this serrated portion 886, namely a plane that rises roughly perpendicular to one end surface in the axial direction of the right-handed internally-threaded body 880, is set so as to be respectively continuous in the clockwise direction, the orientation is not limited thereto.

The left-handed internally-threaded body 890 is composed of a solid material, and as shown in FIG. 33A, has a hexagonal tubular portion 898 roughly in the shape of a hexagonal tube, which extends to a suitable height in the axial direction, and an inserting portion 894, which is formed on the upper end of this hexagonal tubular portion 898. As shown in FIGS. 33A and 33B, the central portion of the left-handed internally-threaded body 890 has a roughly circular through hole 895 penetrating in the axial direction thereof. A threaded hole 891, which is composed by a counter-clockwise spiral groove 892 and a counter-clockwise spiral thread 893 so as to be able to screw onto the left-handed thread 30 of the duplex threaded body 1, is formed on the inner circumferential surface of the through hole 895.

The inserting portion 894 has a roughly spring washer-like flexible toothed portion 897, and an embankment portion 899 that continuously encircles the lower half of the outer circumference of this flexible toothed portion 897.

One end of the flexible toothed portion 897 is fixed on one end surface of the left-handed internally-threaded body 890, while the other end is a free end that is able to deflect in the axial direction of the left-handed internally-threaded body 890, has an inner diameter $\phi 833$ that is slightly larger than a core diameter $\phi 832$ of the threaded hole 891 of the hexagonal tubular portion 898, and is composed roughly in the manner of a spring washer in which an outer diameter $\phi 834$ is set to be smaller than a diameter of a hexagonal inscribed circle that constitutes the outer shape of the hexagonal tubular portion 898. In addition, the outer diameter $\phi 834$ of the flexible toothed portion 897 is set to be substantially equal to the diameter on the inside of the embankment 889 of the right-handed internally-threaded body 880. Furthermore, this roughly spring washer-like flexible toothed portion 897 is formed overall so as to be wound once in a counter-clockwise spiral shape.

A serrated portion 896, which has projections in the shape of irregularities in the axial direction and is composed by a plurality of teeth 896a having a serrated shape formed continuously around the circumference thereof, is formed on an outer end surface of the flexible toothed portion 897 in the axial direction of the left-handed internally-threaded body 890. The shape of a cross-section in the axial direction of the teeth 896a that compose this flexible toothed portion 896 has an apex 896b that roughly forms an acute angle, the length of two sides that form this apex 896b are set to be mutually different, preferably one side 896c is set to be roughly parallel to the axial direction while the other side is set to be an oblique side 896d, and all of the teeth 896a are formed at the same orientation over the circumference.

Furthermore, although the orientation of a vertical plane 896e of the teeth 896a of this serrated portion 896, namely a plane that rises roughly perpendicular to one end surface in the axial direction of the left-handed internally-threaded body, is set so as to be respectively continuous in the clockwise direction, the orientation is not limited thereto. In addition, the flexible toothed portion 897 is only required to be composed so as to be able to deflect in the axial direction and mesh with the flexible toothed portion 886 of the right-handed internally-threaded body 880, and is not necessarily required to be continuously formed in the manner of a spring washer making one spiral circumference, but rather, for example, can also be composed by a plurality of spring-like portions each having tooth-like portions.

The embankment portion 899 has an outer shape having a hexagonal shape when viewed from overhead, the inner shape has a circular shape that is concentric with this hexagonal shape and is set to nearly the same diameter as the outer diameter ϕ834 of the flexible toothed portion 897, and has the form of an embankment having a roughly rectangular cross-section that rises to a suitable height in the axial direction of the left-handed internally-threaded body 890. The height of the embankment 899 is set so that roughly the lower half of the flexible toothed portion 897 in the direction of thickness is embedded when in a state in which the flexible toothed portion 897 compresses in the axial direction and contacts one end surface of the left-handed internally-threaded body 890, and so that end surfaces of the embankment 889 and the embankment 899 make contact while the serrated portion 896 of the flexible toothed portion 897 is embedded in the embankment portion 889 of the right-handed internally-threaded body 880 when roughly the upper half meshes with the flexible toothed portion 886 of the right-handed internally-threaded body 880.

In the case of rotationally coupling the receiving portion 884 formed in the right-handed internally-threaded body 880 composed in the manner explained above by engaging the inserting portion 894 formed in the left-handed internally-threaded body 890, the left-handed internally-threaded body 890 is screwed counter-clockwise with the inserting portion 894 facing to the rear in the direction of advance to a desired position on the duplex threaded body 1. Next, the right-handed internally-threaded body 880 is screwed clockwise from the rear of the left-handed internally-threaded body 890 with the receiving portion 884 facing towards the front in the direction of advance to a position where it joins the left-handed internally-threaded body 890.

The receiving portion 884 of the right-handed internally-threaded body 880 that has approached the left-handed internally-threaded body 890 receives the flexible toothed portion 897 as the inserting portion 894 while gradually deflecting and compressing the flexible toothed portion 897 in the axial direction while moving over the flexible toothed portion 897 and while the serrated portion 886 of the right-handed internally-threaded body 880 holds the left-handed internally-threaded body 890 motionless. FIG. 34 shows a state in which the right-handed internally-threaded body 880 and the left-handed internally-threaded body 890 have been rotationally coupled in this manner. Furthermore, the duplex threaded body 1 is not shown in FIG. 34.

In particular, in a state in which a non-fastening member (not shown), which is fastened by the duplex threaded body 1, the right-handed internally-threaded body 880 and the left-handed internally-threaded body 890 of the present embodiment, is located in a state in which it is unable to advance at the front end of the left-handed internally-threaded body 890 and the left-handed internally-threaded body 890 cannot be further rotated counter-clockwise, in the case the right-handed internally-threaded body 880 is coupled while advancing by rotating clockwise while fixing the left-handed internally-threaded body 890 at that position, the serrated portion 886 on the front end surface of the receiving portion 884 mutually contacts the serrated portion 896 on the rear end surface of the inserting portion 894 during the course of engagement, and are more deeply engaged while deflecting the serrated portion 896 of the inserting portion 894.

In this case, once the right-handed internally-threaded body 880 and the left-handed internally-threaded body 890 are engaged, the serrated portion 886 on the front end surface of the receiving portion 884 and the serrated portion 896 on the rear end surface of the inserting portion 894 mutually engage and prevent reverse rotation. In other words, during engagement, although rotation in the direction of mutually approaching is possible, when rotated in the opposite direction of mutual separation, namely that when the right-handed internally-threaded body 880 is attempted to be regressed by rotating counter-clockwise, the serrated portion 896 on the rear end surface of the inserting portion 894 catches on the serrated portion 886 on the front end surface of the receiving portion 884, and although counter-clockwise rotational force is transmitted to the left-handed internally-threaded body 890, a non-fastening member is present at the front end of the left-handed internally-threaded body 890, and counter-clockwise rotation is inhibited. As a result, in the case the internally-threaded body is screwed onto the duplex threaded body 1 until it stops, counter-clockwise rotation of the right-handed internally-threaded body 880 is prevented and as a result, the right-handed internally-threaded body 880 and the left-handed internally-threaded body 890 cannot be uncoupled or loosened once they are coupled, thereby obtaining a substantial locking effect that does not become structurally loose.

Furthermore, although an example has been illustrated of the reverse rotation preventing coupling means 804 in which the flexible tooth portion 897 composed as the inserting portion 894 is composed by fixing on one end surface of the left-handed internally-threaded body 890, the flexible tooth portion does not necessarily have to be integrally fixed to an internally-threaded body, but rather may be an independent single component. The following provides a detailed explanation of the configuration of an internally-threaded body having such a coupling means 904.

The coupling means 904 of embodiment shown in FIGS. 35 to 38 is composed of a receiving portion 984 formed in a right-handed internally-threaded body 980 and an inserting portion 994 formed in a left-handed internally-threaded body 990. This inserting portion is composed by having a flexible tooth member having a tooth portion and a rotation preventing portion and is able to be deflected in the axial direction, and a stoppage receiving portion formed on the left-handed internally-threaded body that is engaged by a rotation stopping portion of this flexible toothed member.

Figure 35A:
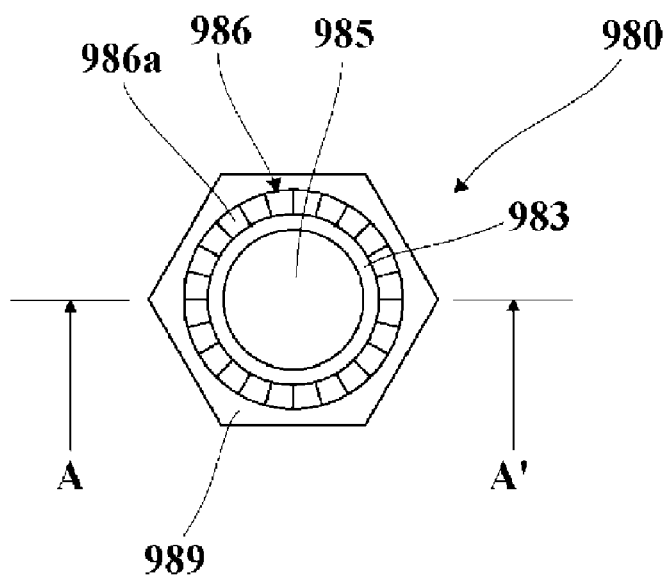
FIG. 35A is an overhead view of a right-handed internally-threaded body in a right-handed internally-threaded body and left-handed internally-threaded body pair provided with different coupling means in which rotational coupling is achieved by a reverse rotation preventing mechanism.
Figure 35B:
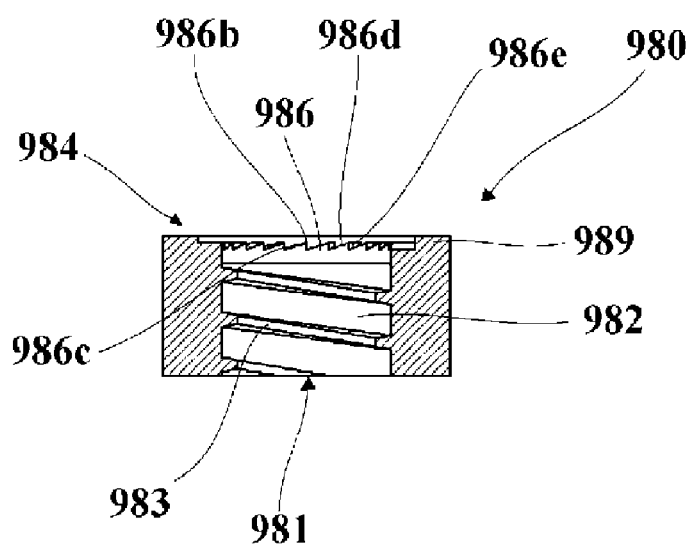
FIG. 35B is a cross-sectional view showing a cross-section taken along line A-A' of FIG. 35A.

The right-handed internally-threaded body 980 is composed of a solid material, and as shown in FIG. 35A, the outer shape thereof has a roughly hexagonal tubular shape, and as shown in FIGS. 35A and 35B, has a roughly circular through hole 985 penetrating in the axial direction thereof in a central portion. A suitably shaped tapered portion is formed facing from the lower end towards the upper end of the through hole 985, and a threaded hole 981, which is composed of a clockwise spiral groove 982 and a clockwise spiral thread 983, is formed on the inner circumferential surface of the through hole 985 to an intermediate receiving position formed in the left-handed internally-threaded body so as to be able to be screwed onto the right-handed thread 20 of the duplex threaded body 1.

The receiving portion 984 is formed from the upper end of this threaded hole 981 to the upper end of the through hole 985. Namely, the receiving portion 984 is formed in an end surface of one end of the right-handed internally-threaded body 980, and is composed of an embankment-shaped embankment portion 989, in which the inside is formed to a circular shape along the peripheral edge of the right-handed internally-threaded body 980 having a roughly hexagonal tubular shape, and a serrated portion 986, which is formed in a ring region on an end surface of the right-handed internally-threaded body 980 to the inside of this embankment portion 989, on the end surface thereof.

The embankment portion 989 has an outer shape of a hexagonal shape when viewed from overhead, the inner shape has a circular shape concentric with this hexagonal shape, and has an embankment shape having a roughly rectangular cross-section rising to a suitable height with respect to the axial direction of the right-handed internally-threaded body 980. The height of the embankment portion 989 is set to be slightly higher than the height of the serrated portion 986 formed on the inside of the embankment portion 989 and having projections in the axial direction.

The serrated portion 986 is formed in a ring region farther to the inside in the radial direction than the embankment portion 989 on one end surface of the right-handed internally-threaded body 980, has projections in the form of irregularities in the axial direction, and is composed by plurality of serrated teeth 986a provided continuously around the circumference thereof. A cross-sectional shape in the axial direction of the teeth 986a that compose the serrated portion 986 has an apex 986b roughly in the shape of an acute angle, the length of two sides that form this apex 986b are set to be mutually different, preferably one side 986c is set to be roughly parallel to the axial direction while the other side is set to be an oblique side 986d, and all of the teeth 986a are formed at the same orientation over the circumference. Furthermore, although the orientation of a vertical plane 986e of the teeth 986a of this serrated portion 986, namely a plane that rises roughly perpendicular to one end surface in the axial direction of the right-handed internally-threaded body 980, is set so as to be respectively continuous in the clockwise direction, the orientation is not limited thereto.

Figure 36A:
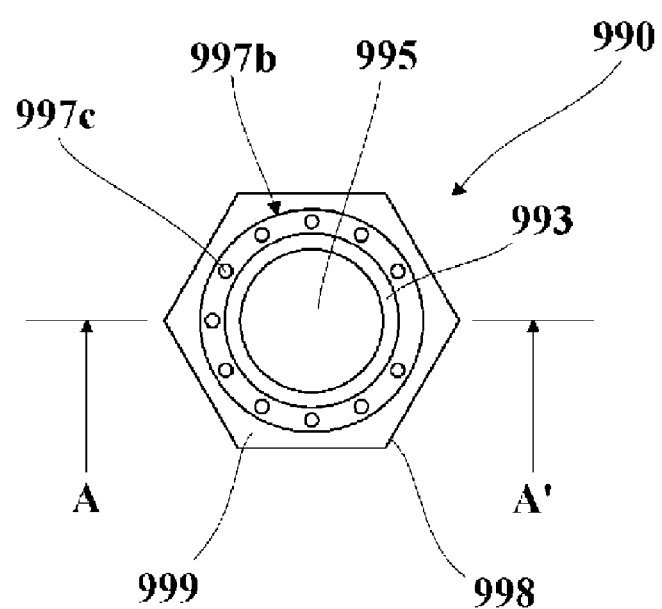
FIG. 36A is an overhead view of a left-handed internally-threaded body that forms a pair with the right-handed internally-threaded body shown in FIG. 35.
Figure 36B:
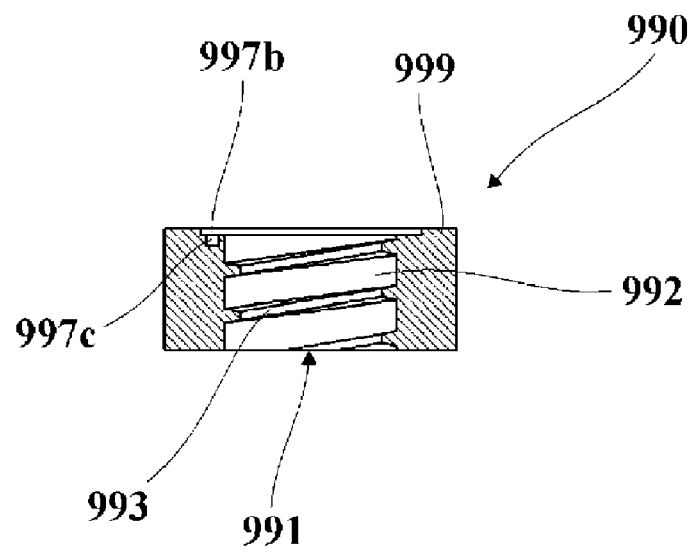
FIG. 36B is a cross-sectional view showing a cross-section taken along line A-A' of FIG. 36A.

The left-handed internally-threaded body 990 is composed of a solid material, and as shown in FIG. 36A, has a hexagonal tubular portion 998 roughly in the shape of a hexagonal tube, which extends to a suitable height in the axial direction, and a stoppage receiving portion 997a, which is formed on the upper end of this hexagonal tubular portion 998. As shown in FIGS. 36A and 36B, the central portion of the left-handed internally-threaded body 990 has a roughly circular through hole 995 penetrating in the axial direction thereof. A threaded hole 991, which is composed by a counter-clockwise spiral groove 992 and a counter-clockwise spiral thread 993 so as to be able to screw onto the left-handed thread 30 of the duplex threaded body 1, is formed on the inner circumferential surface of the through hole 995.

The stoppage receiving portion 997a is formed on an end surface of one end of the left-handed internally-threaded body 990, and is composed of an embankment-shaped embankment portion 999, in which the inside is formed to a circular shape along the peripheral edge of the left-handed internally-threaded body 990 having a roughly hexagonal tubular shape, and a ring region on the end surface of the left-handed internally-threaded body 990 farther to the inside than the embankment portion 999.

The embankment portion 999 has an outer shape having a hexagonal shape when viewed from overhead, the inner shape has a circular shape that is concentric with this hexagonal shape, and is in the form of an embankment having a roughly rectangular cross-section that rises to a suitable height in the axial direction of the left-handed internally-threaded body 990. The height of the embankment 999 is set to roughly half the thickness of a flexible toothed member 997 attached to the inside of the embankment portion 999, and in a state in which the flexible toothed member 997 is compressed in the axial direction and has contacted one end surface of the left-handed internally-threaded body 990, roughly the lower half of the flexible toothed member 997 in the direction of thickness is embedded, and when roughly the upper half meshes with the serrated portion 986 of the right-handed internally-threaded body 980, a serrated portion 996 of the flexible toothed member 997 is embedded in the embankment portion 989 of the right-handed internally-threaded body 980 while the end surfaces of the embankment portion 989 and the embankment portion 999 are set to as to make contact.

The stoppage receiving portion 997a is a ring region on the inside of the embankment portion 999 on one end surface of the left-handed internally-threaded body 990, and is composed by having a circular hole 997c formed to a suitable depth in this ring region. Here, the depth of the hole 997c in the present embodiment is set to nearly the same height as a columnar rotation stopping portion 997a provided protruding from one end surface of the flexible toothed member 997, and although is provided in a circular shape here, the hole 997c formed in this ring region is not necessarily required to be a hole, but rather may be composed by containing projections in the form of irregularities in the axial direction in the ring region, and when the rotation stopping portion 997a formed in the flexible toothed member 997 is attached, sliding and positional shifting of the flexible toothed member 997 on the left-handed internally-threaded body 990 can be prevented.

Figure 37A:
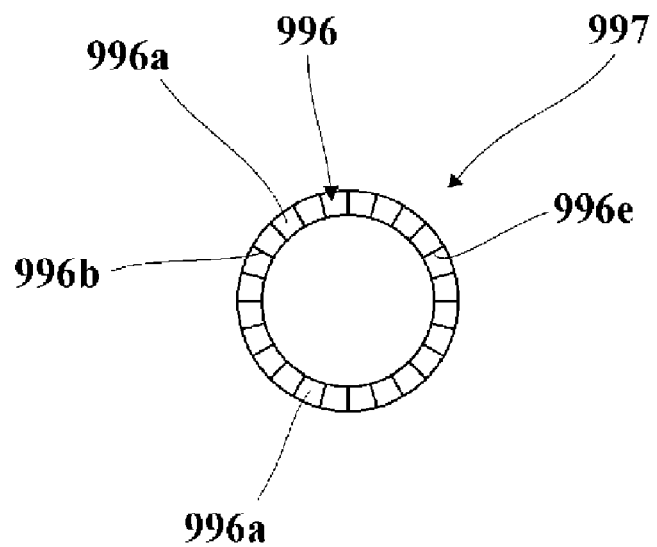
FIG. 37A is an overhead view of a flexible toothed member interposed between the right-handed internally-threaded body shown in FIG. 35 and the left-handed internally-threaded body shown in FIG. 36 that rotationally couples these internally-threaded bodies.
Figure 37B:
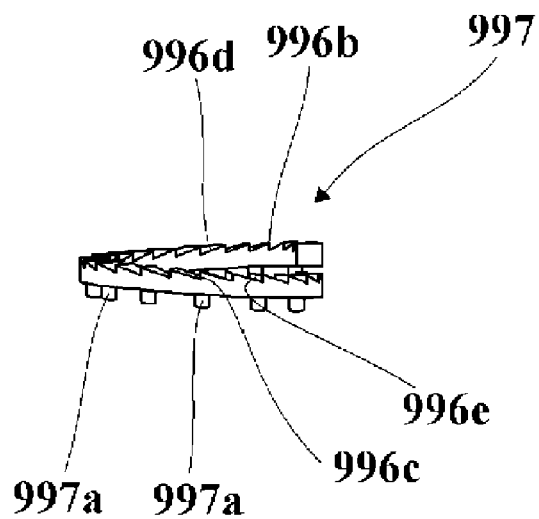
FIG. 37B is a side view when viewed from arrow A.
Figure 37C:
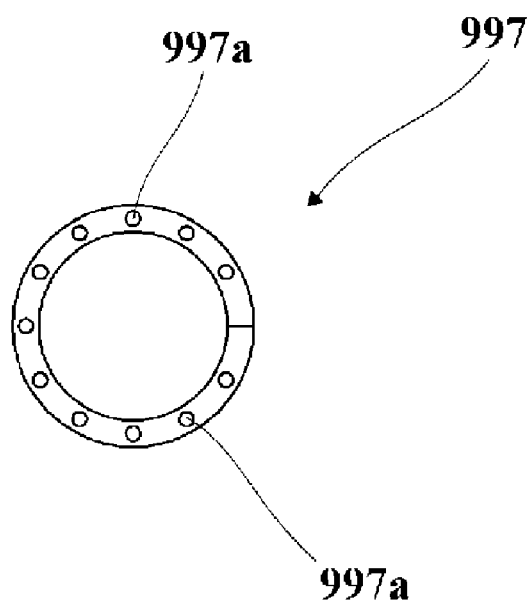
FIG. 37C is a bottom view of FIG. 37A.

As shown in FIG. 37, the flexible toothed member 997 is provided with the rotation stopping portion 997a attached to the stoppage receiving portion 997b on one end surface of the left-handed internally-threaded body 990 on one side thereof, the serrated portion 996 that meshes with the serrated portion 986 of the right-handed internally-threaded body 980 is provided on the other side, and is composed roughly in the manner of a spring washer in which a distal end is a free end and which is wound once in the shape of a counter-clockwise spiral overall that is able to be deflected in the axial direction. The planar outer shape of this flexible toothed member 997 is set to be substantially equal to the planar outer shape of a ring region respectively formed an end surface of the right-handed internally-threaded body 980 and the left-handed internally-threaded body 990.

The serrated portion 996 is formed on one end surface side of the flexible toothed member 997, has projections in the form of irregularities in the axial direction, and is composed by a plurality of teeth 996a having a serrated shape provided continuously around the circumference thereof. The cross-sectional shape in the axial direction of the teeth 996a that compose this serrated portion 996 has an apex 996b that roughly forms an acute angle, the length of two sides that form this apex 996b are set to be mutually different, preferably one side 996c is set to be roughly parallel to the axial direction while the other side is set to be an oblique side 996d, and all of the teeth 996a are formed at the same orientation over the circumference. Naturally, the serrated portion 996 is set so as to be able to mesh with the serrated portion 986 of the right-handed internally-threaded body 980.

Furthermore, although the orientation of a vertical plane 996e of the teeth 996a of this serrated portion 996, namely a plane that rises roughly perpendicular to one end surface in the axial direction of the flexible toothed member 997, is set so as to be respectively continuous in the clockwise direction, the orientation is not limited thereto. In addition, the flexible toothed member 997 is only required to be composed so as to be able to deflect in the axial direction and mesh with the serrated portion 986 of the right-handed internally-threaded body 980, and is not necessarily required to be continuously formed in the manner of a spring washer making one spiral circumference, but rather, for example, can also be composed by a plurality of spring-like portions each having tooth-like portions.

The rotation stopping portion 997*a* is formed on one end surface side of the flexible toothed member 997, and is composed by a plurality of columnar projections provided rising upright at suitable intervals from this end surface. The height, quantity and formed locations of the rotation stopping portion 997 are set to be roughly the same as the depth, quantity and formed locations of the hole 997*c* provided in the stoppage receiving portion 997*b* of the left-handed internally-threaded body 990, and is composed such that the left-handed internally-threaded body 990 and the flexible toothed member 997 can be integrated into a single unit by engaging the rotation stopping portion 997*a* with the stoppage receiving portion 997*b*.

In the case of rotationally coupling the receiving portion 984 formed in the right-handed internally-threaded body 980 composed in the manner explained above by engaging the inserting portion 994 provided in the left-handed internally-threaded body 990, the rotation stopping portion 997*a* of the flexible toothed member 997 is first engaged and preliminarily integrated into a single unit with the stopping receiving portion 997*b* of the left-handed internally-threaded body 990. While in this state, the left-handed internally-threaded body 990 is screwed counter-clockwise onto a desired position of the duplex threaded body 1 with the inserting portion 994 composed of the stopping receiving portion 997*b* and the flexible toothed member 997 facing to the rear in the direction of advance. Next, the right-handed internally-threaded body 980 is screwed clockwise from the rear of the left-handed internally-threaded body 990 with the receiving portion 984 facing towards the front in the direction of advance to a position where it joins the left-handed internally-threaded body 990.

Figure 38:
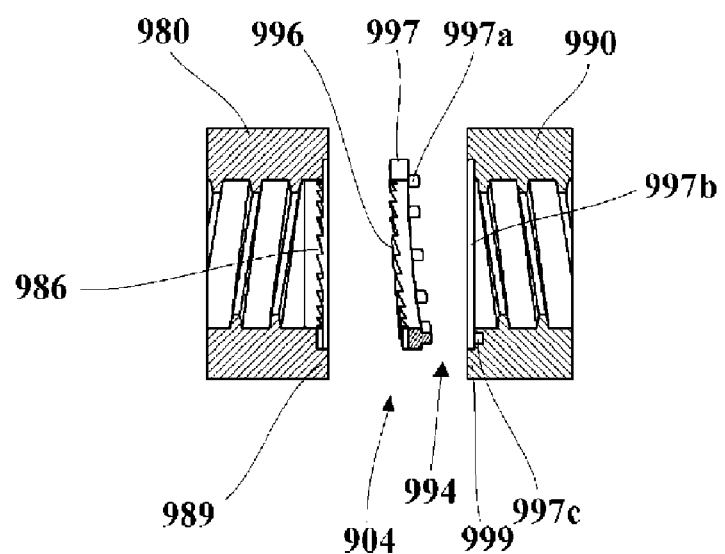
FIG. 38 is a schematic cross-sectional view showing a state prior to coupling by interposing the flexible toothed member shown in FIG. 37 between the right-handed internally-threaded body shown in FIG. 35 and the left-handed internally-threaded body shown in FIG. 36.

The receiving portion 984 of the right-handed internally-threaded body 980 that has approached the left-handed internally-threaded body 990 receives the flexible toothed member 997 as the inserting portion 994 while gradually deflecting and compressing the flexible toothed member 997 in the axial direction while moving over the serrated portion 996 of the flexible toothed member 997 and while the serrated portion 986 of the right-handed internally-threaded body 980 holds the left-handed internally-threaded body 990 motionless. FIG. 38B shows a state in which the right-handed internally-threaded body 980 and the left-handed internally-threaded body 990 have been rotationally coupled in this manner. Furthermore, the duplex threaded body 1 is not shown in FIG. 38.

In particular, in a state in which a non-fastening member (not shown), which is fastened by the duplex threaded body 1, the right-handed internally-threaded body 980 and the left-handed internally-threaded body 990 of the present embodiment, is located in a state in which it is unable to advance at the front end of the left-handed internally-threaded body 990 and the left-handed internally-threaded body 990 cannot be further rotated counter-clockwise, in the case the right-handed internally-threaded body 980 is engaged by advancing by rotating clockwise while fixing the left-handed internally-threaded body 990 at that position, the serrated portion 986 on the front end surface of the receiving portion 984 mutually contacts the serrated portion 996 on the rear end surface of the inserting portion 994 during the course of engagement, and is more deeply engaged while deflecting the serrated portion 996 of the inserting portion 994.

In this case, once the right-handed internally-threaded body 980 and the left-handed internally-threaded body 990 are engaged, the serrated portion 986 on the front end surface of the receiving portion 984 and the serrated portion 996 on the rear end surface of the inserting portion 994 mutually engage and prevent reverse rotation. In other words, during engagement, although rotation in the direction of mutually approaching is possible, when rotated in the opposite direction of mutual separation, namely that when the right-handed internally-threaded body 980 is attempted to be regressed by rotating counter-clockwise, the serrated portion 996 on the rear end surface of the inserting portion 994 catches on the serrated portion 986 on the front end surface of the receiving portion 984, and although counter-clockwise rotational force is transmitted to the left-handed internally-threaded body 990, a non-fastening member is present at the front end of the left-handed internally-threaded body 990, and counter-clockwise rotation is inhibited. As a result, in the case the internally-threaded body is screwed onto the duplex threaded body 1 until it stops, counter-clockwise rotation of the right-handed internally-threaded body 980 is prevented and as a result, the right-handed internally-threaded body 980 and the left-handed internally-threaded body 990 cannot be uncoupled or loosened once they are coupled, thereby obtaining a substantial locking effect that does not become structurally loose.

In an internally-threaded body composed of a right-handed internally-threaded body and a left-handed internally-threaded body that are screwed onto a duplex threaded body as explained above, since a mechanism provided as a coupling means demonstrates each of the effects described above even if the left-handed internally-threaded body and the right-handed internally-threaded body are interchanged, a configuration can be employed in which the mechanism portion is interchanged between the right-handed internally-threaded body and the left-handed internally-threaded body.

Figure 39A:
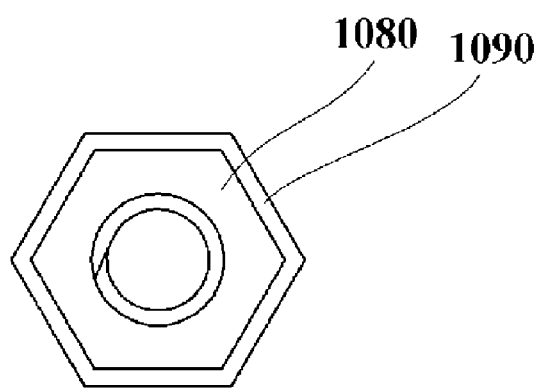
FIG. 39A is an overhead view of a right-handed internally-threaded body of a pair of a right-handed internally-threaded body and left-handed internally-threaded body having a hexagonal tubular shape and mutually different outer diameters.
Figure 39B:
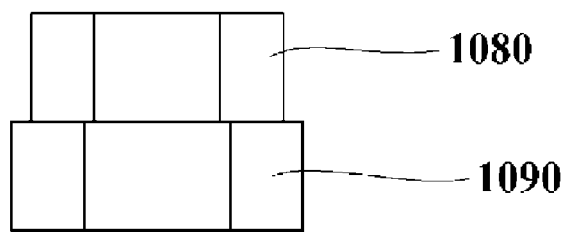
FIG. 39B is a side view of a state in which the positions of the maximum diameters of the right-handed internally-threaded body and the left-handed internally-threaded body are aligned when viewed from the direction of the short diameter.
Figure 40A:
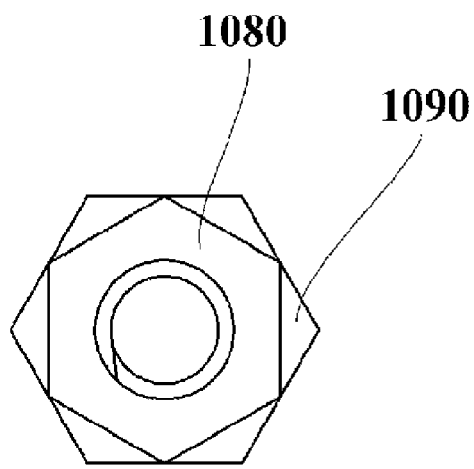
FIG. 40A is an overhead view of a state in which the positions of the minimum outer diameter portion of an internally-threaded body of a larger diameter and the maximum outer diameter portion of an internally-threaded body of a smaller diameter are aligned.
Figure 40B:
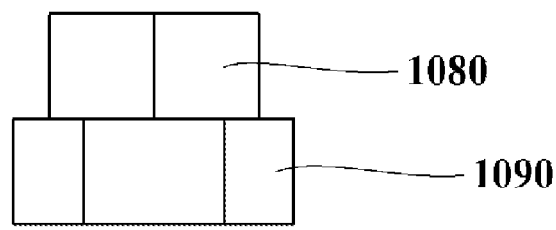
FIG. 40B is a side view when viewed from arrow A of FIG. 40A.

In addition, as shown in FIGS. 39 and 40, in an internally-threaded body composed of a pair of a right-handed internally threaded body 1080 and a left-handed internally-threaded body 1090, one can be set to a maximum outer diameter while the other can be set to a minimum outer diameter or less. Naturally, either the right-handed internally-threaded body 1080 or the left-handed internally-threaded body 1090 may be larger with respect to the size relationship between the right-handed internally-threaded body 1080 and the left-handed internally-threaded body 1090, and either one can be set to have a larger outer diameter than the other as desired. In the case of screwing an internally-threaded body composed in this manner onto a duplex threaded body 1, if the internally-threaded body is screwed on by positioning the large diameter side to the front and the small diameter side to the rear, the effect is obtained of being able to easily attach and remove a tool for screwing on the internally-threaded body and the like.

Although the internally-threaded body screwed onto a duplex externally threaded body explained above was of a so-called double-nut type composed of a right-handed internally-threaded body and a left-handed internally-threaded body, a plurality of two or more of the internally-threaded bodies is not necessarily required to be used, but rather a single internally-threaded body may also be used. The following indicates a configuration of an internally-threaded body for a duplex externally-threaded body capable of obtained a locking effect by using a combination of only a single internally-threaded body with a single duplex externally threaded body.

A duplex externally-threaded body 1101 and an internally-threaded body of the present embodiment shown in FIGS. 41 to 44 are composed of the single duplex externally-threaded body 1101 and a single right-handed internally-threaded body 1180 capable of screwing onto the duplex externally-threaded body 1101.

Figure 41A:
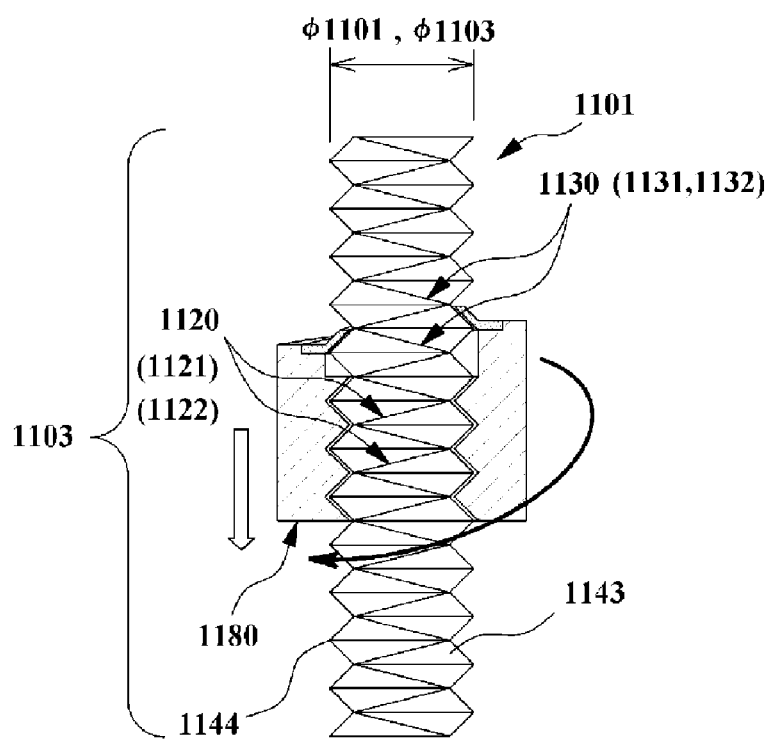
FIG. 41A is a partial cross-sectional view showing a state in which a right-handed internally-threaded body is screwed onto an overlapping region of a duplex externally-threaded body in which both the right-handed thread and the left-handed thread are triangular threads.
Figure 41B:
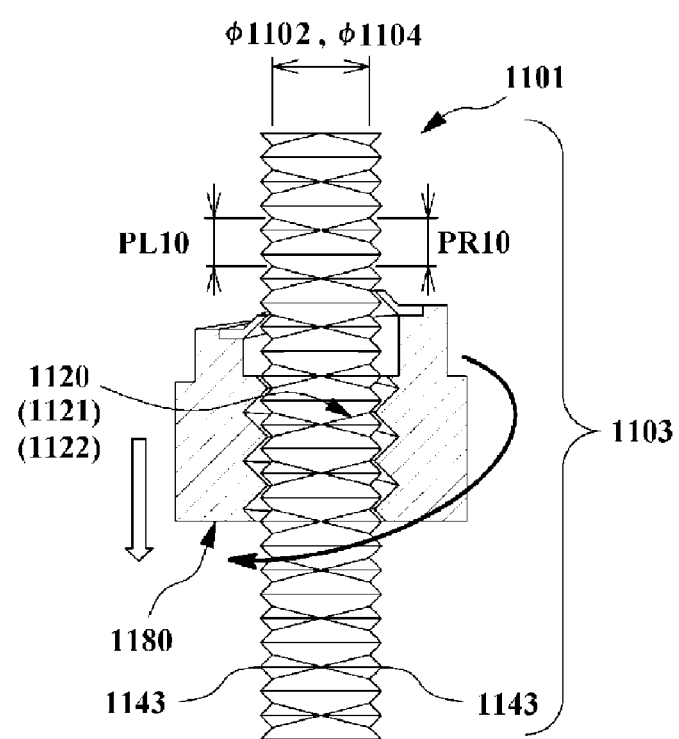
FIG. 41B is a partial cross-sectional view showing a cross-section that differs by a right angle from the cross-section of FIG. 41A.

As shown in FIGS. 41A and 41B, the duplex externally-threaded body 1101 has an overlapping region 1103, in which a right-handed threaded portion 1121 comprising the formation of a right-handed thread 1120 and left-handed threaded portion 1131 comprising the formation of a left-handed thread 1130 are provided overlapping, on the outer circumferential surface of a rod-like member having a columnar or cylindrical shape.

The right-handed thread 1120 is a helical spiral groove 1122 formed by extending clockwise in the positive axial direction of the rod-like member, and is a triangular thread in which the thread ridges between the grooves have a triangular shape. The left-handed thread 1130 is a helical spiral groove 1132 formed by extending counter-clockwise in a positive axial direction of the rod-like member, and is a triangular thread in which the thread ridges between the grooves have a triangular shape in the same manner as the right-handed thread 1120. A pitch PR10 of the right-handed thread 1120 and the pitch PL10 of the left-handed thread 1130 are set to be mutually equal.

The ridge portion of the thread formed on the outer circumferential surface of the rod-like member is composed of a right-handed ridge portion 1143, having a roughly rhomboid shape when viewed from a side of the rod-shaped member and which covers one circumferential surface of the rod-like member primarily consisting of a half circumferential surface of one half in a direction perpendicular to the axis, and a left-handed ridge portion 1144, which appears to have a rhomboid shape when viewed from a side of the rod-like member and which covers one circumferential surface of the rod-like member consisting mainly of a half circumferential surface on the opposite side from the right-handed ridge portion 1143, and the right-handed ridge portion 1143 and the left-handed ridge portion 1144 are composed by being positioned continuously, alternately and in a row.

Figure 42A:
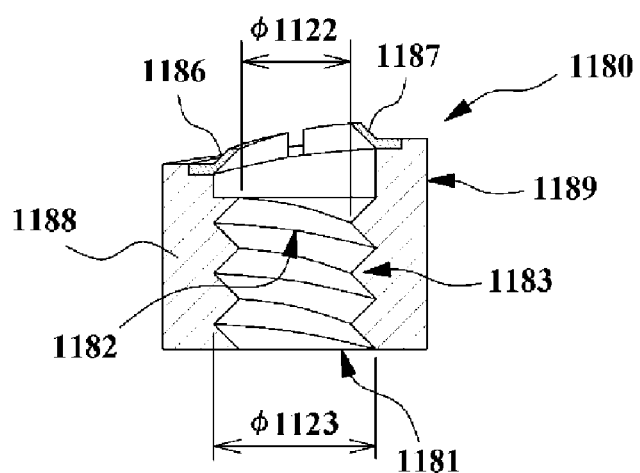
FIG. 42A is a cross-sectional view of a cross-section taken along line A-A' of FIG. 43 that shows a cross-section of the right-handed internally-threaded body of FIG. 41.
Figure 42B:
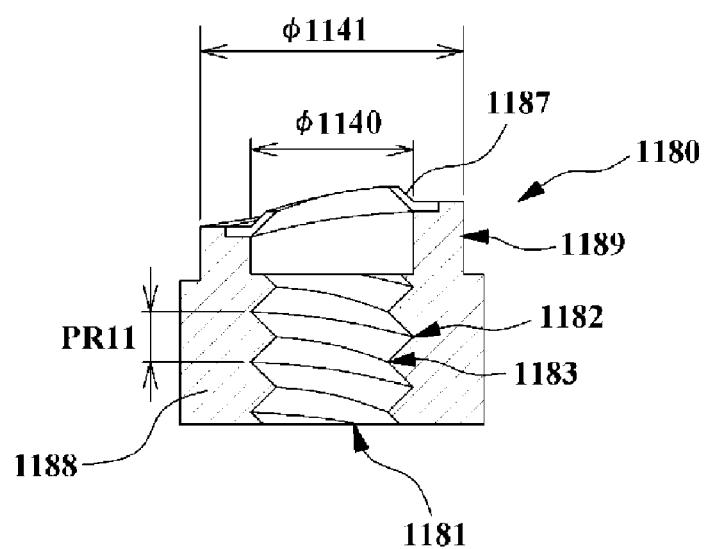
FIG. 42B is a cross-sectional view of a cross-section taken along line B-B' of FIG. 43, and is a cross-sectional view showing a cross-section that differs by a right angle from the cross-section of FIG. 42A.
Figure 43:
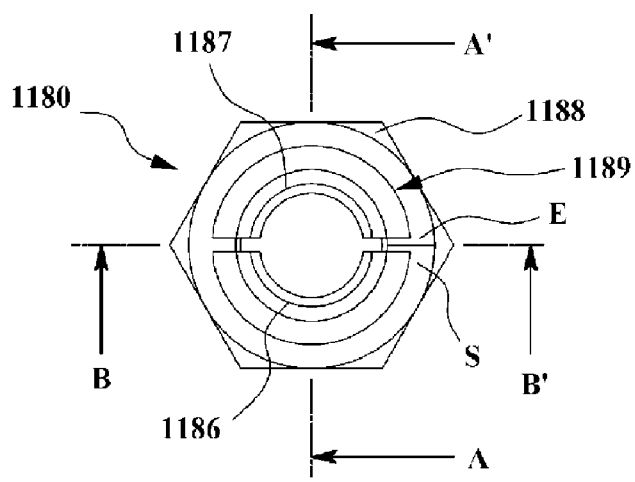
FIG. 43 is an overhead view of the right-handed internally-threaded body shown in FIG. 42.

As shown in FIGS. 42A, 42B and 43, the right-handed externally-threaded body 1180 has an outer shape in the form of a rectangular tube, has a roughly circular threaded hole 1181 penetrating in the axial direction thereof in a central portion, and has a roughly tubular shape overall. A clockwise spiral groove 1182 and a clockwise spiral thread 1183 are formed on the inner circumferential surface of the threaded hole 1181. The clockwise spiral groove 1182 is formed so that a pitch PR11, inner diameter φ1122 and a core diameter φ1123 respectively match a pitch PR10, core diameter φ1102 and outer diameter φ1101 of the right-handed thread 1120 of the duplex externally-threaded body 1101. However, although the spiral groove 1182 formed on the inner circumferential surface of the threaded hole 1181 is set to be a clockwise spiral groove, it can also be a counter-clockwise spiral groove.

An upright portion 1189 of a constant width of which the height becomes higher during clockwise rotation centering about the axis of rotation of the right-handed internally-threaded body 1180 is formed on one end side of the right-handed internally-threaded body 1180 over one circumference to as to have a circumferential shape. A starting end S having the lowest height of the upright portion 1189 and an ending end E having the highest height are formed at different levels. A diameter φ1140 of the inner circumferential surface of this upright portion 1189 is set to be substantially equal to a core diameter φ1123 of the threaded hole 1181. A diameter φ1141 of the outer circumferential surface of the upright portion 1189 is set to be substantially equal to the diameter of an inscribed circle of the hexagonal shape of a hexagonal tubular portion 1188 roughly in the shape of a hexagonal tube.

Two elastic plate pieces 1186 and 1187 having roughly arc-shaped end portions centering about the axis of rotation of the right-handed internally-threaded body 1180 are arranged on the upper end portion of the upright portion 1189, with the arc-shaped end portions protruding towards the center from the inner circumferential surface of the right-handed internally-threaded body 1180 in mutual opposition. Furthermore, although the number of the plate pieces 1186 and 1187 arranged here is set to two, the number thereof may be one or three or more. In addition, the arrangement of the plate pieces 1186 and 1187 with respect to the right-handed internally-threaded body 1180 is composed such that outside portions in the radial direction of the plate pieces 1186 and 1187 are fixed to the right-handed internally-threaded body 1180, inside portions in the radial direction of the plate pieces 1186 and 1187 are in the form of free ends, and the free end sides only deflect from their normal positions towards the outside of the right-handed internally-threaded body 1180.

The width, disposed inclination angle and disposed position of two plate pieces 1186 and 1187 are set so as to respectively match a pitch PL10, outer diameter φ1103 and core diameter φ1104 of the left-handed thread 1130 formed on the outer circumferential surface of the duplex externally-threaded body 1101 screwed into the right-handed internally-threaded body 1180, and the shape of the distal ends of the plate pieces 1186 and 1187 are formed into the shape of arcs having a counter-clockwise spiral shape. Namely, the width of the plate pieces 1186 and 1187 is set to the difference between the outer diameter φ1103 and the core diameter φ1104 of the left-handed thread 1130 of the duplex externally-threaded body 1101. The disposed inclination angle is set corresponding to the ratio of the pitch PL10 to the outer diameter φ1103 in the left-handed thread 1130 of the duplex externally-threaded body 1101. Here, although the outer diameter φ1101 of the right-handed thread 1120 and the outer diameter φ1103 of the left-handed thread 1130 and the core diameter φ1102 of the right-handed thread 1120 and the core diameter φ1104 of the left-handed thread 1130 of the duplex externally-threaded body 1101 are respectively set to be equal, they can also be set to be different.

In other words, the inclination in the moving radial direction of the plate pieces 1186 and 1187 from a plane perpendicular to the axis of the right-handed internally-threaded body 1180 is set so that T≈tan θ when the inclination angle from a plane perpendicular to the axis of the right-handed internally-threaded body 1180 is defined as θ, and the ratio of the pitch PL to the outer diameter φ1103 in the left-handed thread 1130 of the duplex externally-threaded body 1101 is defined as T. In other words, when the lead angle of the spiral thread 1183 on the inner circumferential surface of the right-handed internally-threaded body 1180 is taken to be α, the inclination angle is set to about θ=(180−2α)°±15°. In addition, the disposed position of each piece plate 1186 and 1187 is set to have a positional relationship in which each plate piece 1186 and 1187 meshes with the left-handed thread 1130 corresponding to the pitch PL10 of the left-handed thread 1130 of the duplex externally-threaded body 1101. Furthermore, in the case a plurality of plate pieces 1186 and 1187 are arranged at this time, they can be arranged to have a mutual level difference.

However, the arrangement of the plate pieces 1186 and 1187 with respect to the internally-threaded bodies does not necessarily have to be aligned with the left-handed thread 1130 of the duplex externally-threaded body 1101, but is required to be aligned so as to mesh with the counterclockwise spiral groove 1122 (not shown) of the duplex externally-threaded body 1101 formed in the reverse direction of rotation of the direction of rotation of a spiral groove formed in the inner circumferential surface of the internally-threaded bodies. Furthermore, in terms of the arrangement thereof, the disposed plane of the plate pieces with respect to the right-handed internally-threaded body 1180 is preferably formed into the shape of a counter-clockwise spiral slope centering about the axis of rotation of the right-handed internally-threaded body 1180.

The duplex externally-threaded body 1101 and the right-handed internally-threaded body 1180 of the present embodiment are composed in the manner explained above, in the case of using these as a pair, the right-handed internally-threaded body 1180 is screwed onto the duplex externally-threaded body 1101 from the one end side on which the right-handed thread 1120 of the duplex externally-threaded body 1101 is formed, and is moved to a prescribed position of the overlapping region 1103 formed as a result of the right-handed thread 1120 and the left-handed thread 1130 overlapping on the duplex externally-threaded body 1101.

When moving by screwing on the right-handed internally-threaded body 1180, the free end on the central side of each radial direction of each plate piece 1186 and 1187 provided on the right-handed internally-threaded body 1180 is deflected and spread open towards the rear in the direction of advance of the right-handed internally-threaded body 1180, or is pushed closed by an elastic restoring force, accompanying this movement.

Each plate piece 1186 and 1187 of the right-handed internally-threaded body 1180 that has been screwed onto a prescribed position within the overlapping region 1103 returns to its original position due that elastic restoring force and meshes with the left-handed thread 1130 of the duplex externally-threaded body 1101, and each plate piece 1186 and 1187 is mutually aligned with the left-handed thread 1130. Each plate piece 1186 and 1187 that has aligned with the left-handed thread 1130 of the duplex externally-threaded body 1101 does not deflect in the direction of advance when the right-handed internally-threaded body 1180 is screwed on.

Figure 44A:
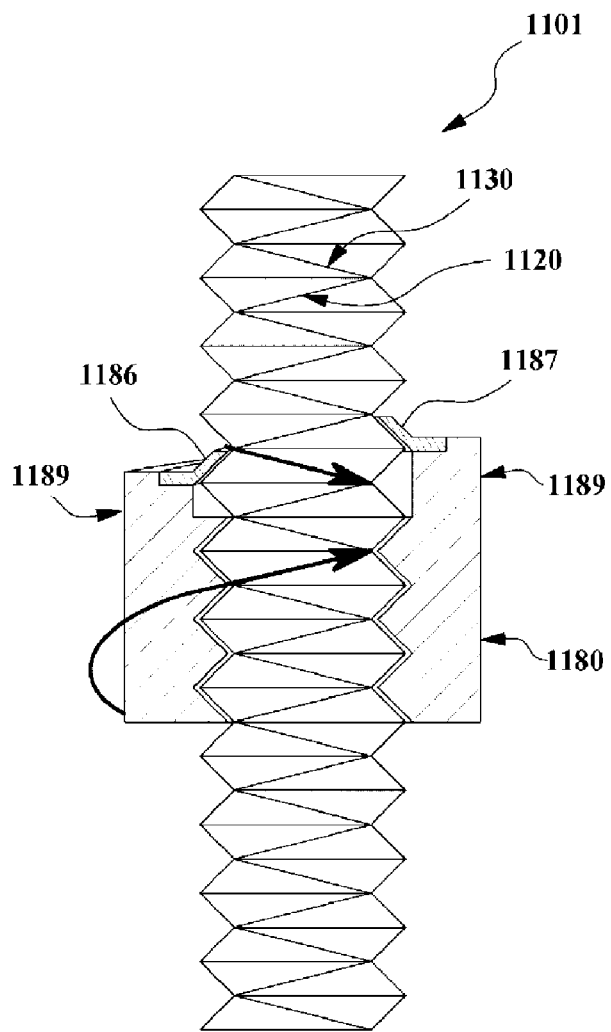
FIG. 44A is a partial cross-sectional view showing a state in which a right-handed internally-threaded body is attempted to be rotated clockwise from the state of FIG. 41 by applying rotational force in the direction of clockwise rotation.
Figure 44B:
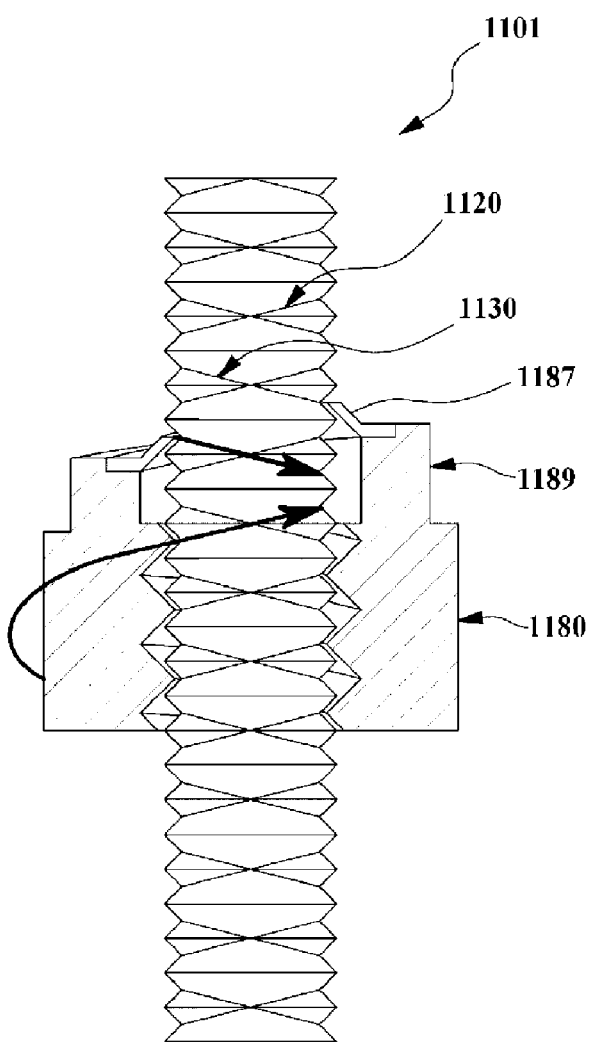
FIG. 44B is a different cross-sectional view of FIG. 42A.

Thus, in the case of applying counter-clockwise rotational force to the right-handed internally-threaded body 1180, as shown in FIGS. 44A and 44B, although force acts that causes the right-handed internally-threaded body 1180 itself to attempt to advance in the reverse direction from the direction of advance when screwed on, since the plate pieces 1186 and 1187 are aligned with the left-handed thread 1130 of the duplex externally-threaded body 1101 and do not deflect in the opposite direction in response thereto, force acts on each plate piece 1186 and 1187 to which counter-clockwise rotational force has been applied that causes them to attempt to advance in the direction of advance of the left-handed thread, namely the direction of advance when the right-handed internally-threaded body is screwed on.

In other words, a force that attempts to regress the clockwise spiral groove 1120 formed in the inner circumferential surface of the right-handed internally-threaded body 180 that acts thereon, and a force that attempts to advance each plate piece 1186 and 1187 fixed to the right-handed internally-threaded body 1180 that acts thereon are mutually antagonistic, and as a result thereof, the right-handed internally-threaded body 1180 stops at a given fixed position on the overlapping region 1103 of the duplex externally-threaded body 1101. Namely, in the combination of the right-handed internally-threaded body 1180 screwing onto the duplex externally-threaded body 1101 of the present invention, the right-handed internally-threaded body 1180 either advances or stops but does not regress. Thus, in the case of fastening a non-fastening body (not shown) with this pair, the single duplex externally-threaded body 1101 and the single right-handed internally-threaded body 1180 are able to obtain a locking effect that substantially prevents loosening instead of inhibiting loosening.

As has been explained above, although the duplex threaded body of the present invention provides a right-handed internally-threaded body and a left-handed internally-threaded body on the outer circumferential surface of a rod-like solid member by overlapping within the same region, the present invention is not limited thereto, but rather a duplex threaded body having a solid shape may also be composed by being provided with an overlapping region in which a right-handed internally-threaded body, which comprises the formation of a clockwise spiral groove or spiral thread, and a left-handed internally-threaded body, which comprises a counter-clockwise spiral groove or spiral thread, are formed within the same region on the inner circumferential surface of a hole formed in a portion of that solid member, and can be carried out in various forms within a range that does not deviate from the gist thereof. In addition, the internally-threaded body of the present invention has one or more clockwise or counter-clockwise spiral threads formed intermittently or continuously on an inner circumferential surface of a tubular solid member, is composed by forming a pair consisting of this spiral thread and a spiral thread of the opposite direction of rotation, may be composed so as to allowing the obtaining of a locking effect or reverse rotation preventing effect by screwing these spiral threads having mutually different directions of rotation onto a duplex threaded body, and for example, the internally-threaded body is not necessarily required to have a hexagonal tubular shape, but rather have a rectangular tubular shape or other shape. In addition, a clockwise spiral groove and a counter-clockwise spiral groove may also be formed on the same region on the inner circumferential surface of a duplex threaded body.

The invention claimed is:

1. An internally-threaded body configured to receive a duplex externally-threaded body, the internally-threaded body comprising:
   a tubular portion;
   an upright portion coupled to one end of the tubular portion in an axial direction;
   an inner circumferential surface defining a roughly circular hole penetrating the tubular portion and the upright portion in the axial direction;
   an intermittent or continuous clockwise or counter-clockwise spiral thread formed on the inner circumferential surface of the tubular portion; and
   reverse rotation preventing means coupled to an end portion of the upright portion for preventing reverse rotation relative to a direction of rotation when screwed onto the duplex externally-threaded body, wherein the reverse rotation preventing means includes:

a first plate piece protruding inward towards an axis of rotation from the inner circumferential surface, the first plate piece having a first end portion; and a second plate piece protruding inward towards the axis of rotation diametrically opposite the first plate piece, the second plate piece having a second end portion, wherein the first end portion and the second end portion serve as a clockwise or counter-clockwise spiral thread having a finite inclination angle relative to a lead angle formed by one of a first portion and a second portion of the duplex externally-threaded body, the first portion defined as an intermittent or continuous clockwise spiral thread formed on an outer circumferential surface and the second portion defined as an intermittent or continuous counter-clockwise spiral thread formed on the outer circumferential surface, the first portion and the second portion being intertwined;

wherein the clockwise or counter-clockwise spiral thread having the finite inclination angle is opposite the clockwise or counter-clockwise spiral thread formed on the inner circumferential surface of the tubular portion.

2. The internally-threaded body of claim 1, wherein the tubular portion and the upright portion are integrated.

3. The internally-threaded body of claim 1, wherein the upright portion has a constant width and a varying height such that the first plate piece and the second plate piece are offset in the axial direction.

4. An internally-threaded body configured to receive a duplex externally-threaded body, the internally-threaded body comprising:

a tubular portion;

an inner circumferential surface defining a roughly circular hole penetrating the tubular portion in the axial direction;

an intermittent or continuous clockwise or counter-clockwise spiral thread formed on the inner circumferential surface of the tubular portion; and reverse rotation preventing means fixed to an end portion of the tubular portion for preventing reverse rotation relative to a direction of rotation when screwed onto the duplex externally-threaded body, wherein the reverse rotation preventing means includes one or more plate pieces having elasticity and protruding inward towards an axis of rotation from the inner circumferential surface, the one or more plate pieces having one or more end portions, wherein the one or more end portions serve as a clockwise or counter-clockwise spiral thread having a finite inclination angle relative to a lead angle formed by one of a clockwise spiral groove formed on an outer circumferential surface of the duplex externally-threaded body and a continuous counter-clockwise spiral groove formed on the outer circumferential surface of the duplex externally-threaded body, the clockwise spiral groove and the counter-clockwise spiral groove being intertwined;

wherein the clockwise or counter-clockwise spiral thread having the finite inclination angle of the one or more end portions of the one or more plate pieces is opposite the clockwise or counter-clockwise spiral thread formed on the inner circumferential surface of the tubular portion.

5. The internally-threaded body of claim 4, further comprising:

an upright portion coupled to one end of the tubular portion in an axial direction.

6. The internally-threaded body of claim 5, wherein the upright portion has a varying height such that the one or more plate pieces are offset in the axial direction.

* * * * *